United States Patent
Miyasaka

(10) Patent No.: US 9,052,512 B2
(45) Date of Patent: Jun. 9, 2015

(54) DIFFRACTIVE OPTICAL ELEMENT AND MEASURING APPARATUS

(75) Inventor: Koji Miyasaka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 610 days.

(21) Appl. No.: 13/407,108

(22) Filed: Feb. 28, 2012

(65) Prior Publication Data

US 2012/0223218 A1 Sep. 6, 2012

(30) Foreign Application Priority Data

Mar. 3, 2011 (JP) ................. 2011-046803
Jun. 28, 2011 (JP) ................. 2011-142818
Feb. 23, 2012 (JP) ................. 2012-037972
Feb. 23, 2012 (JP) ................. 2012-037974

(51) Int. Cl.
G02B 27/42 (2006.01)
G02B 27/09 (2006.01)

(52) U.S. Cl.
CPC ........ *G02B 27/0944* (2013.01); *G02B 27/4266* (2013.01)

(58) Field of Classification Search
CPC ..................... G02B 27/0944; G02B 27/4266
USPC ................... 250/216; 359/558; 356/601–623; 382/106, 154
See application file for complete search history.

(56) References Cited

U.S. PATENT DOCUMENTS

| 7,377,653 | B2 * | 5/2008 | Yang et al. ....................... 353/31 |
| 8,130,250 | B2 * | 3/2012 | Suzuki et al. .................. 347/233 |
| 8,599,484 | B2 * | 12/2013 | Miyasaka et al. ............. 359/569 |
| 2008/0151339 | A1 * | 6/2008 | Oouchida et al. ............... 359/15 |
| 2012/0038934 | A1 | 2/2012 | Miyasaka et al. |
| 2012/0105855 | A1 | 5/2012 | Miyasaka et al. |

FOREIGN PATENT DOCUMENTS

| WO | WO 2007/105205 A2 | 9/2007 |
| WO | WO 2007/105215 A2 | 9/2007 |
| WO | WO 2009/093228 A2 | 7/2009 |

OTHER PUBLICATIONS

U.S. Appl. No. 13/760,831, filed Feb. 6, 2013, Miyasaka, et al.

* cited by examiner

*Primary Examiner* — Seung C Sohn
(74) *Attorney, Agent, or Firm* — Oblon, McClelland, Maier & Neustadt, L.L.P.

(57) ABSTRACT

A diffractive optical element includes first and second diffractive optical parts to generate diffracted lights two-dimensionally with respect to incident light. The diffracted lights generated by inputting the incident light to the first diffractive optical part are input to the second diffractive optical part in order to generate the diffracted lights from the second diffractive optical part, wherein $\theta_1 \geq \theta_2$ and $k_1 \geq k_2$ stand or, $\theta_1 \leq \theta_2$ and $k_1 \leq k_2$ stand among $\theta_1$ and $\theta_2$ denote diffraction angles of the first and second diffractive optical parts, and $k_1$ and $k_2$ denote numbers of light spots of the diffracted lights generated by the first and second diffractive optical parts.

14 Claims, 52 Drawing Sheets

FIG.16

| | NUMBER OF SPOTS $n_i$ | ORDER OF DIFFRACTION | | | | PITCH OF BASIC UNIT [μm] | | DIFFRACTION ANGLE [°] | | | REFRACTIVE INDEX OF MEDIUM | NUMBER OF STEPS OF DIFFRACTION PART | HEIGHT OF 1 STEP [nm] |
|---|---|---|---|---|---|---|---|---|---|---|---|---|---|
| | | MAXIMUM IN X-DIRECTION | MINIMUM IN X-DIRECTION | MAXIMUM IN Y-DIRECTION | MINIMUM IN Y-DIRECTION | $P_x$ | $P_y$ | ON X AXIS | ON Y AXIS | $\theta_i$ | | | |
| EXAMPLE 1 | 2300 | 106 | -106 | 79 | -79 | 531.2 | 471.3 | 9.5 | 8.0 | 12.5 | 1.454 | 8 | 228.6 |
| EXAMPLE 2 | 2300 | 106 | -106 | 79 | -79 | 374.3 | 346.0 | 13.6 | 10.9 | 17.6 | 1.454 | 8 | 228.6 |
| EXAMPLE 3 | 2300 | 106 | -106 | 79 | -79 | 374.3 | 346.0 | 13.6 | 10.9 | 17.6 | 1.454 | 8 | 228.6 |
| EXAMPLE 4 | 9 | 1 | -1 | 1 | -1 | 2.5 | 2.9 | 19.5 | 16.4 | 25.9 | 1.454 | 8 | 228.6 |
| EXAMPLE 5 | 9 | 1 | -1 | 1 | -1 | 1.7 | 2.2 | 28.3 | 22.6 | 37.6 | 1.454 | 8 | 228.6 |
| EXAMPLE 6 | 9 | 20 | -20 | 18 | -18 | 531.2 | 471.3 | 1.8 | 1.8 | 2.6 | 1.454 | 8 | 228.6 |
| EXAMPLE 7 | 9 | 20 | -20 | 18 | -18 | 531.2 | 471.3 | 1.8 | 1.8 | 2.6 | 1.454 | 2 | 914.2 |
| EXAMPLE 8 | 9 | 20 | -20 | 18 | -18 | 374.3 | 346.0 | 2.5 | 2.5 | 3.5 | 1.454 | 8 | 228.6 |
| EXAMPLE 9 | 9 | 1 | -1 | 1 | -1 | 2.5 | 2.9 | 19.5 | 16.4 | 25.9 | 1.454 | 8 | 228.6 |
| EXAMPLE 10 | 9 | 1 | -1 | 1 | -1 | 1.7 | 2.2 | 28.3 | 22.6 | 37.6 | 1.454 | 8 | 228.6 |

FIG.17

| | NUMBER OF SPOTS $n_2$ | ORDER OF DIFFRACTION | | | | PITCH OF BASIC UNIT [μm] | | DIFFRACTION ANGLE [°] | | | REFRAC-TIVE INDEX OF MEDIUM | NUMBER OF STEPS OF DIFFRAC-TION PART | HEIGHT OF 1 STEP [nm] | DESIGN INCIDENT ANGLE $\phi$ [°] | $1/\cos\phi_{avg}$ | $1/\cos\phi_{avg} \cdot \lambda \cdot \cos\phi_{avg}$ |
|---|---|---|---|---|---|---|---|---|---|---|---|---|---|---|---|---|
| | | MAXIMUM IN X-DIRECTION | MINIMUM IN X-DIRECTION | MAXIMUM IN Y-DIRECTION | MINIMUM IN Y-DIRECTION | $P_x$ | $P_y$ | ON X AXIS | ON Y AXIS | $\theta_2$ | | | | | | |
| EXAMPLE 1 | 9 | 1 | -1 | 1 | -1 | 2.5 | 2.9 | 19.5 | 16.4 | 25.9 | 1.454 | 8 | 228.6 | 0.0 | 1.00 | 0.830 |
| EXAMPLE 2 | 9 | 1 | -1 | 1 | -1 | 1.7 | 2.2 | 28.3 | 22.6 | 37.6 | 1.454 | 8 | 228.6 | 0.0 | 1.00 | 0.830 |
| EXAMPLE 3 | 9 | 1 | -1 | 1 | -1 | 1.7 | 2.2 | 28.3 | 22.6 | 37.6 | 1.454 | 8 | 223.1 | 12.5 | 1.02 | 0.816 |
| EXAMPLE 4 | 2300 | 106 | -106 | 79 | -79 | 531.2 | 471.3 | 9.5 | 8.0 | 12.5 | 1.454 | 8 | 216.7 | 18.5 | 1.04 | 0.800 |
| EXAMPLE 5 | 2300 | 106 | -106 | 79 | -79 | 374.3 | 346.0 | 13.6 | 10.9 | 17.6 | 1.454 | 8 | 203.3 | 27.2 | 1.08 | 0.765 |
| EXAMPLE 6 | 2301 | 320 | -320 | 240 | -240 | 531.2 | 471.3 | 30.0 | 25.0 | 40.9 | 1.454 | 8 | 228.6 | 0.0 | 1.00 | 0.830 |
| EXAMPLE 7 | 2301 | 320 | -320 | 240 | -240 | 531.2 | 471.3 | 30.0 | 25.0 | 40.9 | 1.454 | 2 | 914.2 | 0.0 | 1.00 | 0.830 |
| EXAMPLE 8 | 2301 | 320 | -320 | 240 | -240 | 374.3 | 346.0 | 45.2 | 35.1 | 66.0 | 1.454 | 8 | 228.6 | 0.0 | 1.00 | 0.830 |
| EXAMPLE 9 | 2300 | 106 | -106 | 79 | -79 | 531.2 | 471.3 | 9.5 | 8.0 | 12.5 | 1.454 | 8 | 228.6 | 0.0 | 1.00 | 0.830 |
| EXAMPLE 10 | 2300 | 106 | -106 | 79 | -79 | 374.3 | 346.0 | 13.6 | 10.9 | 17.6 | 1.454 | 8 | 228.6 | 0.0 | 1.00 | 0.830 |

FIG.18

|  | DIFFRACTION ANGLE[°] | | |
|---|---|---|---|
|  | ON X AXIS | ON Y AXIS | $\theta$ |
| EXAMPLE 1 | 30.0 | 24.9 | 40.8 |
| EXAMPLE 2 | 45.2 | 35.0 | 65.8 |
| EXAMPLE 3 | 45.2 | 35.0 | 65.8 |
| EXAMPLE 4 | 30.0 | 24.9 | 40.8 |
| EXAMPLE 5 | 45.2 | 35.0 | 65.8 |
| EXAMPLE 6 | 32.1 | 27.0 | 37.1 |
| EXAMPLE 7 | 32.1 | 27.0 | 37.1 |
| EXAMPLE 8 | 48.9 | 38.2 | 52.6 |
| EXAMPLE 9 | 30.0 | 24.9 | 40.8 |
| EXAMPLE 10 | 45.2 | 35.0 | 65.8 |

FIG.19

| | | | EXAMPLE 1 | | EXAMPLE 4 | | EXAMPLE 6 | | EXAMPLE 7 | | EXAMPLE 9 | |
|---|---|---|---|---|---|---|---|---|---|---|---|---|
| 1ST DIFFRACTION OPTICAL ELEMENT | $\mu_1$ | | 2.96E-04 | | 9.91E-02 | | 8.67E-02 | | 7.28E-02 | | 9.91E-02 | |
| | $\sigma_1$ | | 1.53E-05 | | 4.12E-04 | | 4.42E-04 | | 3.80E-04 | | 4.12E-04 | |
| | $\sigma_1/\mu_1$ | | 5.2% | | 0.4% | | 0.5% | | 0.5% | | 0.4% | |
| | EFFICIENCY OF ZERO ORDER DIFFRACTION | | 0.00% | | 10.0% | | 8.6% | | 7.2% | | 10.0% | |
| 2ND DIFFRACTION OPTICAL ELEMENT | INCIDENT ANGLE [°] | | 0 | 6.25 | 12.5 | 0 | 18.5 | 25.9 | 0 | 1.3 | 2.6 | 0 | 1.3 | 2.6 | 0 | 18.5 | 25.9 |
| | $\mu_2$ | | 9.91E-02 | 9.92E-02 | 9.94E-02 | 2.94E-04 | 2.96E-04 | 2.94E-04 | 2.78E-04 | 2.78E-04 | 2.78E-04 | 2.78E-04 | 2.78E-04 | 2.78E-04 | 2.94E-04 | 2.96E-04 | 2.91E-04 |
| | $\sigma_2$ | | 4.12E-04 | 1.27E-03 | 3.92E-03 | 1.76E-05 | 1.53E-05 | 1.80E-05 | 8.41E-06 | 8.41E-06 | 8.41E-06 | 1.61E-05 | 1.61E-05 | 1.61E-05 | 1.82E-05 | 1.53E-05 | 2.42E-05 |
| | $\sigma_2/\mu_2$ | | 0.4% | 1.3% | 3.9% | 6.0% | 5.2% | 6.1% | 3.0% | 3.0% | 3.1% | 5.8% | 5.8% | 5.8% | 6.2% | 5.2% | 8.3% |
| | EFFICIENCY OF ZERO ORDER DIFFRACTION | | 10.0% | 10.2% | 10.9% | 0.15% | 0.00% | 0.13% | 0.03% | 0.03% | 0.03% | 0.03% | 0.03% | 0.03% | 0.14% | 0.00% | 0.52% |
| DIFFRACTION OPTICAL ELEMENT | $\sigma$ | | 5.2% | 5.3% | 6.5% | 6.0% | 5.2% | 6.1% | 3.0% | 3.0% | 3.1% | 5.8% | 5.8% | 5.8% | 6.2% | 5.2% | 8.3% |
| NUMBER OF SPOTS MEASURING CONDITION | MEASURING POSITION [mm] | | | | | | | | 554.3 | | | | | | | | |
| | MEASURING RANGE [mm] | | | | | | | | (−320, −260) ~ (320, 260) | | | | | | | | |
| | MEASURING RANGE DIAGONAL ANGLE [°] | | | | | | | | 36.6 | | | | | | | | |
| | NUMBER OF DIVISIONS IN X-AXIS DIRECTION | | | | | | | | 9 | | | | | | | | |
| | NUMBER OF DIVISIONS IN Y-AXIS DIRECTION | | | | | | | | 9 | | | | | | | | |
| NUMBER OF SPOTS | CENTER REGION | | 314 | | 314 | | 263 | | 263 | | 314 | |
| | AVERAGE OF PERIPHERAL REGION | | 169 | | 169 | | 202 | | 202 | | 169 | |
| | | MAXIMUM | 320 | | 320 | | 295 | | 295 | | 320 | |
| | | MINIMUM | 157 | | 157 | | 186 | | 186 | | 157 | |
| | (AVERAGE OF PERIPHERAL REGION) / (CENTER REGION) | | 0.538 | | 0.538 | | 0.768 | | 0.768 | | 0.538 | |
| | MINIMUM/MAXIMUM | | 0.491 | | 0.491 | | 0.631 | | 0.631 | | 0.491 | |

FIG.20

| | | | EXAMPLE 2 | | EXAMPLE 3 | | EXAMPLE 5 | | EXAMPLE 8 | | EXAMPLE 10 | |
|---|---|---|---|---|---|---|---|---|---|---|---|---|
| 1ST DIFFRACTION OPTICAL ELEMENT | $\mu_1$ | | 2.96E-04 | | 9.96E-04 | | 9.91E-02 | | 7.28E-02 | | 9.91E-02 | |
| | $\sigma_1$ | | 1.53E-05 | | 1.53E-05 | | 4.12E-04 | | 3.80E-04 | | 4.12E-04 | |
| | $\sigma_1/\mu_1$ | | 5.2% | | 5.2% | | 0.4% | | 0.5% | | 0.4% | |
| | EFFICIENCY OF ZERO ORDER DIFFRACTION | | 0.0% | | 0.0% | | 10.0% | | 8.6% | | 10.0% | |
| 2ND DIFFRACTION OPTICAL ELEMENT | INCIDENT ANGLE [°] | | 0 | 8.8 | 0 | 12.5 | 0 | 27.2 | 0 | 1.75 | 0 | 27.2 |
| | | | | 17.6 | | 17.6 | | 37.2 | | 3.5 | | 37.6 |
| | $\mu_2$ | | 9.91E-02 | 9.93E-02 | 9.88E-02 | 9.91E-02 | 2.90E-04 | 2.96E-04 | 2.66E-04 | 2.66E-04 | 2.96E-04 | 2.90E-04 |
| | | | | 9.95E-02 | | 9.94E-02 | -04 | -04 | -04 | 2.66E-04 | -04 | 2.72E-04 |
| | $\sigma_2$ | | 4.12E-04 | 2.13E-03 | 2.96E-03 | 3.87E-03 | 2.44E-05 | 1.53E-05 | 6.53E-06 | 6.54E-06 | 1.53E-05 | 2.57E-05 |
| | | | | 7.52E-03 | | 4.12E-03 | | 2.46E-05 | | 6.56E-06 | | 4.06E-05 |
| | $\sigma_2/\mu_2$ | | 0.4% | 2.1% | 3.0% | 3.9% | 8.4% | 5.2% | 2.5% | 2.5% | 5.2% | 8.9% |
| | | | | 7.6% | | 10.9% | | 8.5% | | 2.5% | | 14.9% |
| | EFFICIENCY OF ZERO ORDER DIFFRACTION | | 10.0% | 11.9% | 9.1% | 10.0% | 0.72% | 0.00% | 0.03% | 0.03% | 0.00% | 0.63% |
| | | | | 10.5% | | 0.55% | | | | | | 2.03% |
| DIFFRACTION OPTICAL ELEMENT | $\sigma$ | | 5.2% | 9.2% | 6.0% | 6.5% | 8.4% | 5.2% | 2.5% | 2.5% | 5.2% | 8.9% |
| | | | | 5.6% | | 5.2% | | 8.5% | | 2.5% | | 14.9% |
| NUMBER OF SPOTS MEASURING CONDITION | MEASURING POSITION [mm] | | | | | | 342.8 | | | | | |
| | MEASURING RANGE [mm] | | | | | | $(-342.8, -240) \sim (342.8, 240)$ | | | | | |
| | MEASURING DIAGONAL ANGLE [°] | | | | | | 50.7 | | | | | |
| | NUMBER OF DIVISIONS IN X-AXIS DIRECTION | | | | | | 9 | | | | | |
| | NUMBER OF DIVISIONS IN Y-AXIS DIRECTION | | | | | | 9 | | | | | |
| NUMBER OF SPOTS | CENTER REGION | | 432 | | 432 | | 432 | | 289 | | 432 | |
| | AVERAGE OF PERIPHERAL REGION | | 93 | | 93 | | 93 | | 168 | | 93 | |
| | MAXIMUM | | 432 | | 432 | | 432 | | 296 | | 432 | |
| | MINIMUM | | 91 | | 91 | | 91 | | 165 | | 91 | |
| | (AVERAGE OF PERIPHERAL REGION)/(CENTER REGION) | | 0.215 | | 0.215 | | 0.215 | | 0.581 | | 0.215 | |
| | MINIMUM/MAXIMUM | | 0.211 | | 0.211 | | 0.211 | | 0.557 | | 0.211 | |

FIG.21

| | EXAMPLE 3 | | EXAMPLE 4 | | | EXAMPLE 5 | | |
|---|---|---|---|---|---|---|---|---|
| WAVELENGTH [μm] | 0.830 | 0.816 | 0.803 | 0.830 | 0.800 | 0.773 | 0.830 | 0.765 | 0.714 |
| $\mu_2$ | 9.88E-02 | 9.91E-02 | 9.94E-02 | 2.94E-04 | 2.96E-04 | 2.94E-04 | 2.90E-04 | 2.96E-04 | 2.90E-04 |
| $\sigma_2$ | 2.96E-03 | 4.12E-04 | 3.87E-03 | 1.76E-05 | 1.53E-05 | 1.80E-05 | 2.44E-05 | 1.53E-05 | 2.46E-05 |
| EFFICIENCY OF ZERO ORDER DIFFRACTION | 9.1% | 10.0% | 10.9% | 0.15% | 0.00% | 0.13% | 0.72% | 0.00% | 0.55% |

FIG.39
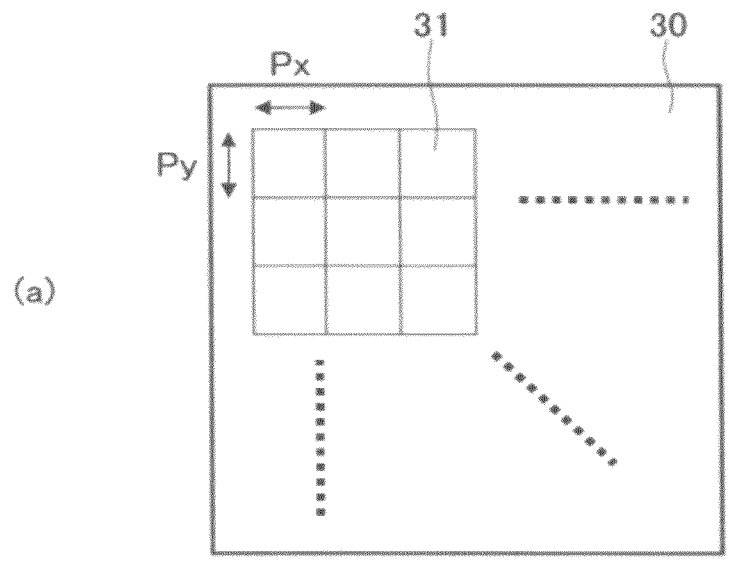
(a)
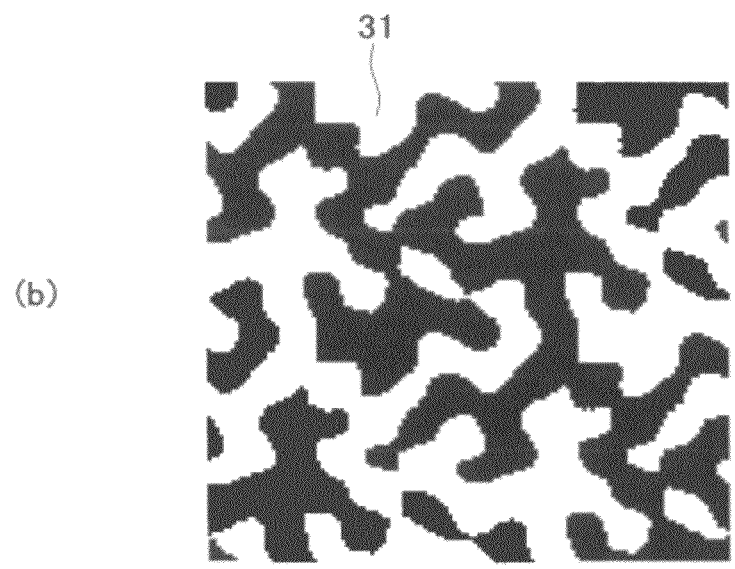
(b)

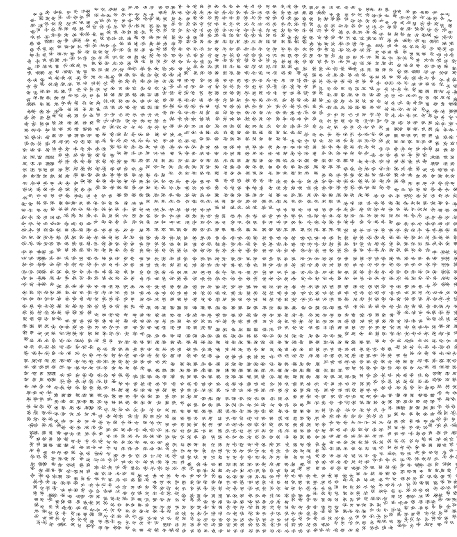
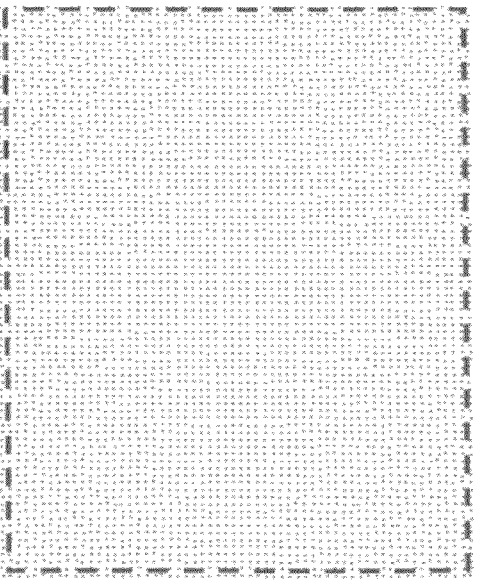
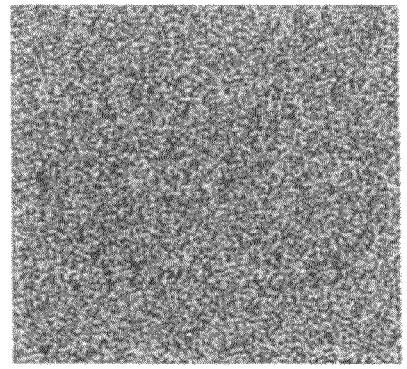
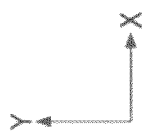
FIG. 41

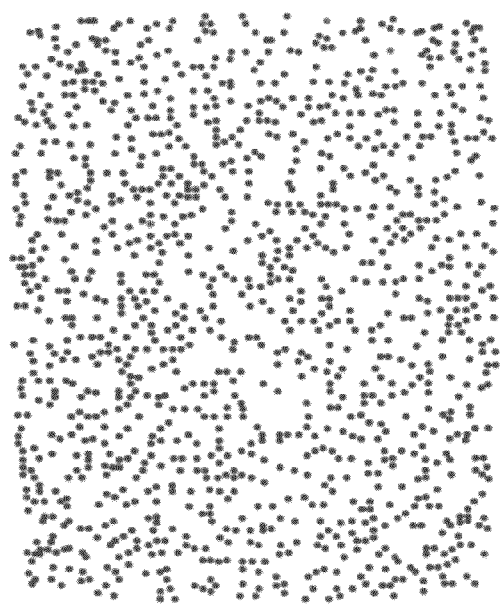
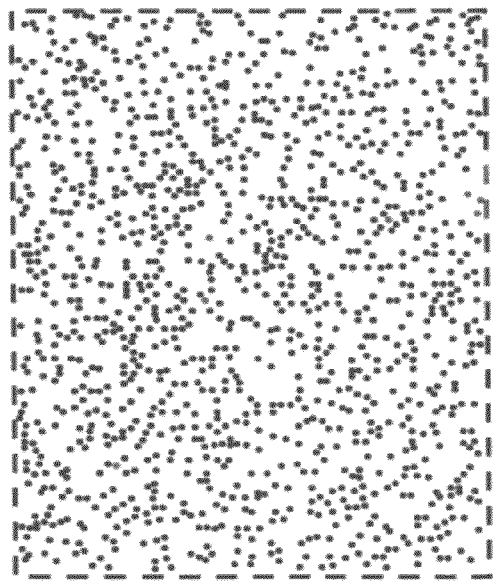
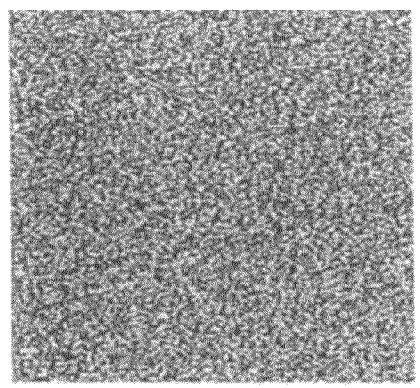
FIG.42

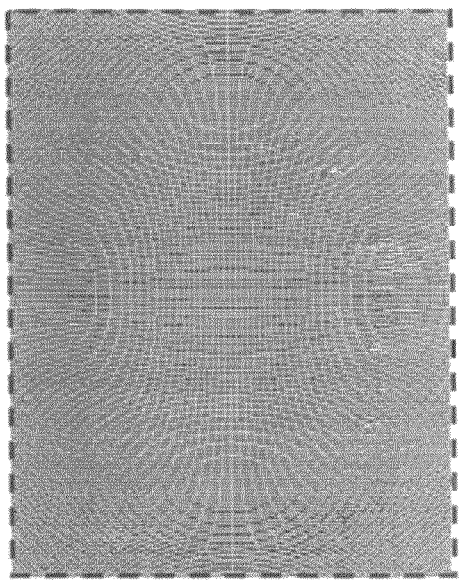
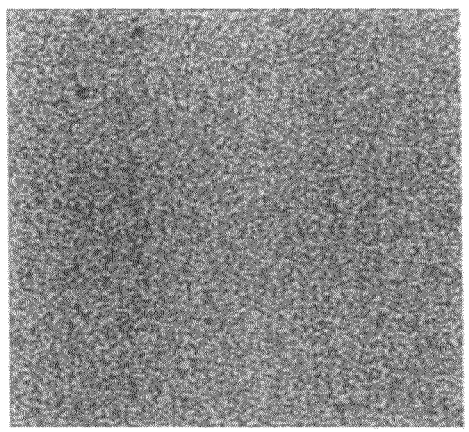
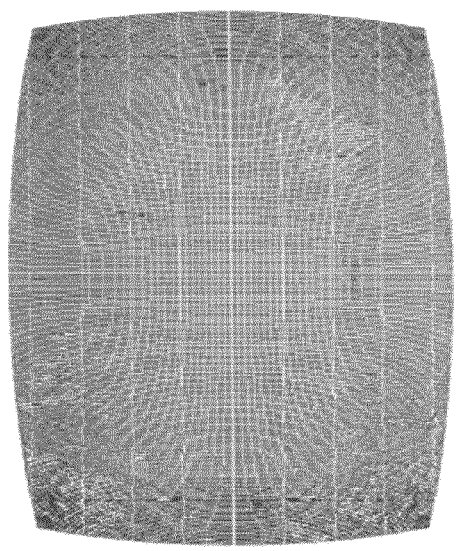
FIG. 43

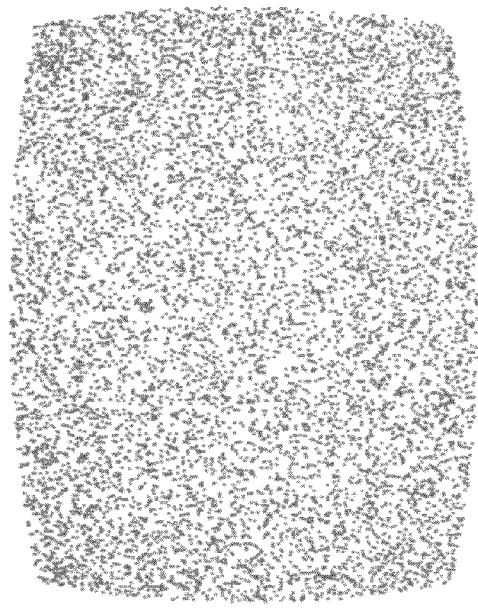
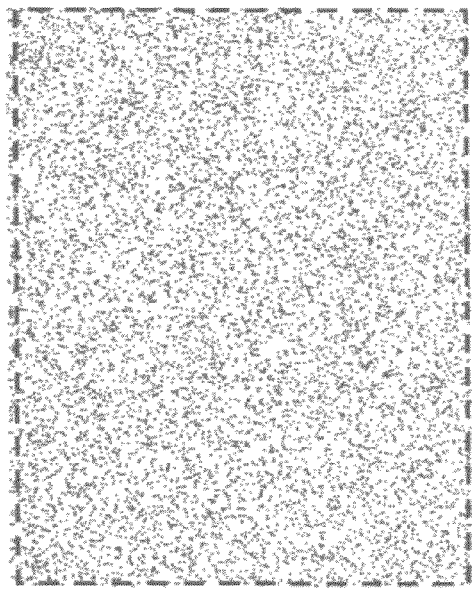
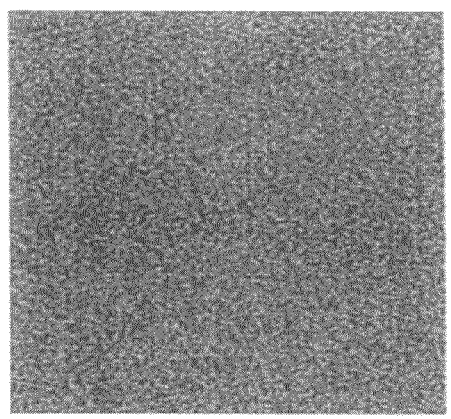
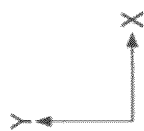
FIG. 44

FIG.47

|  | PITCH Px IN X-AXIS DIRECTION (μm) | PITCH Py IN Y-AXIS DIRECTION (μm) |
|---|---|---|
| COMPARISON EXAMPLE 3 | 368.5 | 366.1 |
| COMPARISON EXAMPLE 4 | 187.1 | 181.1 |
| COMPARISON EXAMPLE 5 | 128.0 | 119.8 |
| COMPARISON EXAMPLE 6 | 99.6 | 89.9 |

FIG.48

|  | MINIMUM VALUE IN X-AXIS DIRECTION (mm) | MAXIMUM VALUE IN X-AXIS DIRECTION (mm) | MINIMUM VALUE IN Y-AXIS DIRECTION (mm) | MAXIMUM VALUE IN Y-AXIS DIRECTION (mm) | MAXIMUM DIFFRACTION ANGLE IN X-AXIS DIRECTION (deg) | MAXIMUM DIFFRACTION ANGLE IN Y-AXIS DIRECTION (deg) | ANGLE IN DIAGONAL DIRECTION (deg) |
|---|---|---|---|---|---|---|---|
| COMPARISON EXAMPLE 3 | -176 | 176 | -131 | 131 | 10.0 | 7.5 | 12.4 |
| COMPARISON EXAMPLE 4 | -363 | 363 | -273 | 273 | 20.0 | 15.3 | 24.5 |
| COMPARISON EXAMPLE 5 | -577 | 577 | -433 | 433 | 30.0 | 23.5 | 35.9 |
| COMPARISON EXAMPLE 6 | -839 | 839 | -627 | 627 | 40.0 | 32.1 | 46.3 |

FIG.49

|  | $M_c$ | $M_o$ | $M_{max}$ | $M_{min}$ | $M_o/M_c$ | $M_{min}/M_{max}$ |
|---|---|---|---|---|---|---|
| COMPARISON EXAMPLE 3 | 49 | 48 | 63 | 48 | 0.98 | 0.762 |
| COMPARISON EXAMPLE 4 | 61 | 46 | 70 | 46 | 0.754 | 0.657 |
| COMPARISON EXAMPLE 5 | 81 | 35 | 81 | 35 | 0.432 | 0.432 |
| COMPARISON EXAMPLE 6 | 97 | 25 | 97 | 25 | 0.258 | 0.258 |

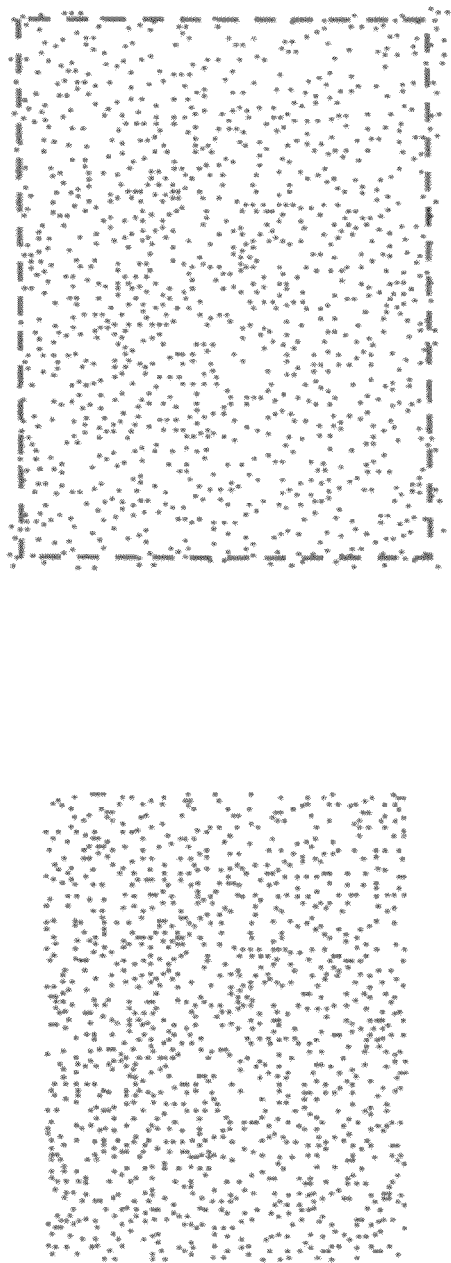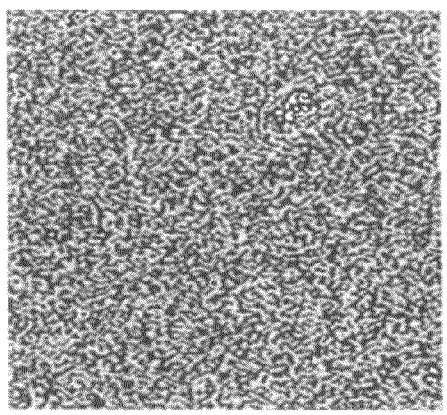
FIG.50

FIG.52

|  | PITCH Px IN X-AXIS DIRECTION (μm) | PITCH Py IN Y-AXIS DIRECTION (μm) |
|---|---|---|
| COMPARISON EXAMPLE 8 | 951.2 | 947.5 |
| COMPARISON EXAMPLE 9 | 482.9 | 468.7 |
| COMPARISON EXAMPLE 10 | 330.3 | 310.1 |
| COMPARISON EXAMPLE 11 | 257.0 | 232.7 |

FIG.53

| | MINIMUM VALUE IN X-AXIS DIRECTION (mm) | MAXIMUM VALUE IN X-AXIS DIRECTION (mm) | MINIMUM VALUE IN Y-AXIS DIRECTION (mm) | MAXIMUM VALUE IN Y-AXIS DIRECTION (mm) | MAXIMUM DIFFRACTION ANGLE IN X-AXIS DIRECTION (deg) | MAXIMUM DIFFRACTION ANGLE IN Y-AXIS DIRECTION (deg) | ANGLE IN DIAGONAL DIRECTION (deg) |
|---|---|---|---|---|---|---|---|
| COMPARISON EXAMPLE 8 | −176 | 176 | −131 | 131 | 10.0 | 7.5 | 12.4 |
| COMPARISON EXAMPLE 9 | −363 | 363 | −273 | 273 | 20.0 | 15.3 | 24.5 |
| COMPARISON EXAMPLE 10 | −577 | 577 | −433 | 433 | 30.0 | 23.5 | 35.9 |
| COMPARISON EXAMPLE 11 | −839 | 839 | −627 | 627 | 40.0 | 32.1 | 46.3 |

FIG.54

| | $M_c$ | $M_o$ | $M_{max}$ | $M_{min}$ | $M_o/M_c$ | $M_{min}/M_{max}$ |
|---|---|---|---|---|---|---|
| COMPARISON EXAMPLE 8 | 353 | 352 | 391 | 336 | 0.997 | 0.859 |
| COMPARISON EXAMPLE 9 | 433 | 297 | 433 | 297 | 0.686 | 0.686 |
| COMPARISON EXAMPLE 10 | 469 | 229 | 469 | 229 | 0.488 | 0.488 |
| COMPARISON EXAMPLE 11 | 561 | 163 | 561 | 163 | 0.291 | 0.291 |

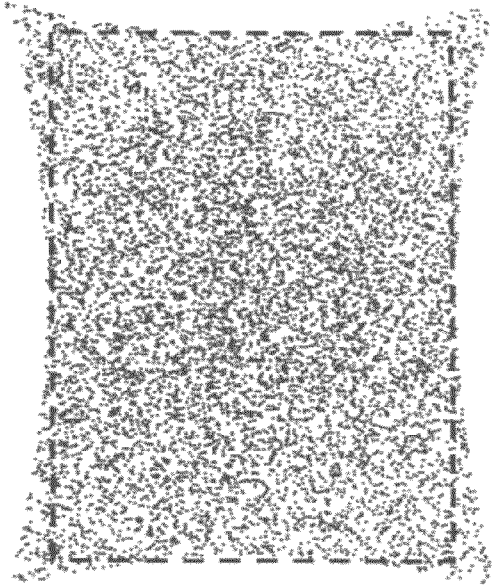
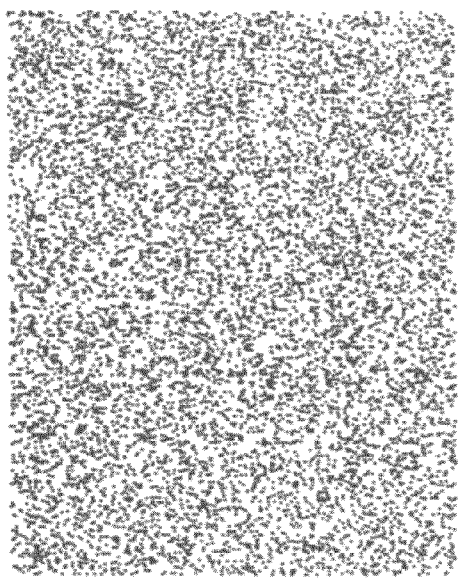
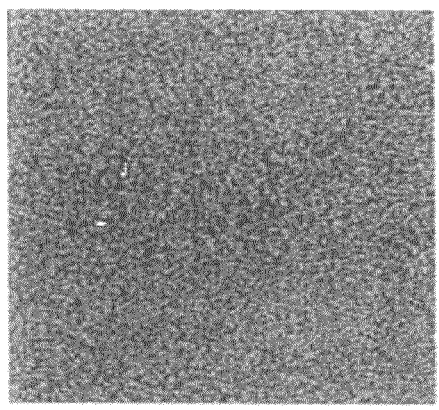
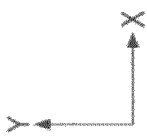
FIG. 55

DIFFRACTIVE OPTICAL ELEMENT AND MEASURING APPARATUS

CROSS-REFERENCE TO RELATED APPLICATIONS

This application is based upon and claims the benefit of priority of the prior Japanese Patent Applications No. 2011-046803 filed on Mar. 3, 2011 and No. 2011-142818 filed on Jun. 28, 2011, the entire contents of which are incorporated herein by reference.

BACKGROUND OF THE INVENTION

1. Field of the Invention

The present invention relates to an diffractive optical element, and to a measuring apparatus using the diffractive optical element.

2. Description of the Related Art

A diffractive optical element that diffracts at least a part of incident light is used in various optical equipments, optical apparatuses, and the like. For example, an optical coordinate measuring apparatus may irradiate light having a predetermined projection pattern on a measuring target, and acquire an image of the measuring target irradiated by the projection pattern of the predetermined light, in order to perform a three-dimensional measurement. In such a coordinate measuring apparatus, a diffractive optical element is used to generate the projection pattern of the predetermined light.

In the coordinate measuring apparatus, there is a demand to project the light over a wide range. For this reason, a diffraction angle of the diffractive optical element becomes large, and there is a tendency for a luminous energy (or quantity of light) of zero order diffracted light, that is, the diffracted light directly transmitted through the diffractive optical element, to become large. When the luminous energy of the zero order diffracted light becomes high compared to the luminous energy of other diffracted lights, blurring and the like may occur in the image obtained by the imaging of the coordinate measuring apparatus in a periphery of the zero order diffracted light and deteriorate the image. Accordingly, it is desirable for the luminous energy of the zero order diffracted light to be low.

An International Publication Number WO2007/105215 A2 and an International Publication Number WO2007/105205 A2 disclose methods of irradiating a speckle pattern generated by the diffractive optical element, as the projection pattern to be irradiated on the measuring target. In addition, an International Publication Number WO2009/093228 A2 discloses a method of reducing the luminous energy of the zero order diffracted light by using two diffractive optical elements.

The method disclosed in the International Publication Number WO2009/093228 A2 inputs light to a first diffractive optical element, and inputs light diffracted by the first diffractive optical element to a second diffractive optical element. Hence, a rectangular diffracted light pattern may be distributed two-dimensionally.

As described above, when the diffractive optical element is used in the coordinate measuring apparatus or the like, there is a demand to distribute the light over a wide range as described above. When two diffractive optical elements are used, a sum of the diffraction angle of the first diffractive optical element and the diffraction angle of the second diffractive optical element becomes the total diffraction angle. Hence, the total diffraction angle becomes wide, and the diffracted light may be distributed over the wide range.

Normally, the diffracted light generated from the diffractive optical element is emitted at a predetermined angle from the diffractive optical element according to a diffraction grating formula. For this reason, light spots of the diffracted light emitted from the diffractive optical element may have a uniform distribution with respect to a spherical surface having the diffractive optical element at an approximate center thereof. However, when the diffracted light emitted from the diffractive optical element is projected on a plane or a flat surface, an interval (or spacing) of the light spots of the diffracted light becomes longer as the diffraction angle of the diffracted light becomes larger. When such a diffractive optical element is used in the coordinate measuring apparatus or the like, the diffraction angle of the diffracted light becomes large, and a detection sensitivity deteriorates in a region where the interval of the light spots is long, that is, in the region where a density of the light spots of the diffracted light is coarse, to thereby make an accurate three-dimensional measurement difficult. In the present specification, "approximately" refers to such a state that is observed by the naked eye or by an optical microscope including a stereomicroscope and the like.

On the other hand, when the diffracted light is projected onto the plane or the flat surface using the diffractive optical element, corner portions of a projection region of the diffracted light stretch when the diffracted light is distributed so that the projection region becomes an approximately rectangular shape, and the so-called pincushion distortion occurs.

SUMMARY OF THE INVENTION

The present invention is conceived in view of the above problems of the prior art, and one object is to provide a diffractive optical element that may make the density of light spots of the diffracted light in a projection region approximately uniform, and to provide a measuring apparatus that may perform an accurate measurement.

According to one aspect of the present invention, a diffractive optical element may include a first diffractive optical part configured to generate diffracted lights two-dimensionally with respect to incident light; and a second diffractive optical part configured to generate diffracted lights two-dimensionally with respect to incident light; wherein the diffracted lights generated by inputting the incident light to the first diffractive optical part are input to the second diffractive optical part in order to generate the diffracted lights from the second diffractive optical part, and wherein $\theta_1 \geq \theta_2$ and $k_1 \geq k_2$ stand or, $\theta_1 \leq \theta_2$ and $k_1 \leq k_2$ stand, where $\theta_1$ denotes a diffraction angle of the first diffractive optical part, $k_1$ denotes a number of light spots of the diffracted lights generated by the first diffractive optical part, $\theta_2$ denotes a diffraction angle of the second diffractive optical part, and $k_2$ denotes a number of light spots of the diffracted lights generated by the second diffractive optical part.

In the diffractive optical element in accordance with one aspect of the present invention, a projection region of the diffractive optical element may be formed by overlapping a projection region of the light spots of the diffracted lights generated by the first diffractive optical part with the second diffractive optical part, or the projection region of the diffractive optical element may be formed by overlapping a projection region of the light spots of the diffracted lights generated by the second diffractive optical part with the first diffractive optical part.

In the diffractive optical element in accordance with one aspect of the present invention, at least one of the first diffractive optical part and the second diffractive optical part may include a plurality of basic units that are arranged two-dimensionally.

The diffractive optical element in accordance with one aspect of the present invention may further include a first transparent substrate on which the first diffractive optical part is formed; and a second transparent substrate on which the second diffractive optical part is formed.

In the diffractive optical element in accordance with one aspect of the present invention, the first transparent substrate and the second transparent substrate may be bonded together.

The diffractive optical element in accordance with one aspect of the present invention may further include a transparent substrate having a first surface on which the first diffractive optical part is formed, and a second surface, opposite to the first surface, on which the second diffractive optical part is formed.

According to another aspect of the present invention, a diffractive optical element may include a plurality of basic units arranged two-dimensionally, and configured to generate diffracted lights two-dimensionally with respect to incident light, wherein the diffracted lights are projected on a plane in order to generate a plurality of light spots within a predetermined range on the plane, and wherein the predetermined range has a rectangular shape and relationships $$15° \leq \theta_d$$
$$M_o/M_c > -0.02173\theta_d + 1.314$$

stand, where $M_c$ denotes a number of light spots in a center region amongst $N_x \times N_y$ or more regions having approximately same shapes and equally dividing the predetermined range, $M_o$ denotes an average number of light spots in four corner regions of the predetermined range, $\theta_d$ denotes a maximum diffraction angle at which the predetermined range is irradiated, and $N_x$ and $N_y$ are both odd numbers greater than or equal to 3.

According to another aspect of the present invention, a diffractive optical element may include a plurality of basic units arranged two-dimensionally, and configured to generate diffracted lights two-dimensionally with respect to incident light, wherein the diffracted lights are projected on a plane in order to generate a plurality of light spots within a predetermined range on the plane, and wherein the predetermined range has a rectangular shape and relationships $$15° \leq \theta_d$$
$$0.8 \leq M_o/M_c \leq 1.2$$

stand, where $M_c$ denotes a number of light spots in a center region amongst $N_x \times N_y$ or more regions having approximately same shapes and equally dividing the predetermined range, $M_o$ denotes an average number of light spots in four corner regions of the predetermined range, $\theta_d$ denotes a maximum diffraction angle at which the predetermined range is irradiated, and $N_x$ and $N_y$ are both odd numbers greater than or equal to 3.

According to another aspect of the present invention, a diffractive optical element may include a plurality of basic units arranged two-dimensionally, and configured to generate diffracted lights two-dimensionally with respect to incident light, wherein the diffracted lights are projected on a plane in order to generate a plurality of light spots within a predetermined range on the plane, and wherein the predetermined range has a rectangular shape and relationships $$15° \leq \theta_d$$
$$M_{min}/M_{max} > -0.01729\theta_d + 1.108$$

stand, where $M_{max}$ denotes a maximum number of light spots in $N_x \times N_y$ or more regions having approximately same shapes and equally dividing the predetermined range, $M_{min}$ denotes a minimum number of light spots in the $N_x \times N_y$ or more regions, $\theta_d$ denotes a maximum diffraction angle at which the predetermined range is irradiated, and $N_x$ and $N_y$ are both odd numbers greater than or equal to 3.

According to another aspect of the present invention, a diffractive optical element may include a plurality of basic units arranged two-dimensionally, and configured to generate diffracted lights two-dimensionally with respect to incident light, wherein the diffracted lights are projected on a plane in order to generate a plurality of light spots within a predetermined range on the plane, and wherein the predetermined range has a rectangular shape and relationships $$30° \leq \theta_d$$
$$0.6 \leq M_{min}/M_{max} \leq 1.4$$

stand, where $M_{max}$ denotes a maximum number of light spots in $N_x \times N_y$ or more regions having approximately same shapes and equally dividing the predetermined range, $M_{min}$ denotes a minimum number of light spots in the $N_x \times N_y$ or more regions, $\theta_d$ denotes a maximum diffraction angle at which the predetermined range is irradiated, and $N_x$ and $N_y$ are both odd numbers greater than or equal to 3.

According to another aspect of the present invention, a diffractive optical element may include a plurality of basic units arranged two-dimensionally, and configured to generate diffracted lights two-dimensionally with respect to incident light, wherein the diffracted light are projected on a plane in order to generate a plurality of light spots within a predetermined range on the plane, and wherein the predetermined range has a rectangular shape and relationships $$15° \leq \theta_d$$
$$0.7 \leq M_{min}/M_{max} \leq 1.3$$

stand, where $M_{max}$ denotes a maximum number of light spots in $N_x \times N_y$ or more regions having approximately same shapes and equally dividing the predetermined range, $M_{min}$ denotes a minimum number of light spots in the $N_x \times N_y$ or more regions, $\theta_d$ denotes a maximum diffraction angle at which the predetermined range is irradiated, and $N_x$ and $N_y$ are both odd numbers greater than or equal to 3.

According to another aspect of the present invention, a diffractive optical element may include a plurality of basic units arranged two-dimensionally, and configured to generate diffracted lights two-dimensionally with respect to incident light, wherein the plurality of basic units are formed by performing a Fourier transform or an inverse Fourier transform of a predetermined pattern of the diffracted lights generated by design, and wherein the predetermined pattern of the diffracted lights generated by design has a light intensity higher in a peripheral region compared to a center region thereof.

According to another aspect of the present invention, a diffractive optical element may include a plurality of basic units arranged two-dimensionally, and configured to generate diffracted lights two-dimensionally with respect to incident light, wherein a plurality of light spots are generated within a predetermined region on a plane by projecting the diffracted lights on the plane, and wherein the predetermined range has a rectangular shape, $N_x \times N_y$ or more regions having approximately same shapes and equally dividing the predetermined range include a peripheral region in which the diffracted light has a diffraction angle of 15° or greater, and a light intensity in the peripheral region is 0.4 or greater with respect to a light intensity 1 in a center region of the predetermined range amongst the $N_x \times N_y$ or more regions.

According to another aspect of the present invention, a measuring apparatus may include a light source configured to emit light; a diffractive optical element described above and configured to emit diffracted lights with respect to the light from the light source; and an imaging device configured to pick up an image of a measuring target that is irradiated with the diffracted lights.

BRIEF DESCRIPTION OF THE DRAWINGS

FIG. 16 illustrates a table indicating parameters of a first diffractive optical part;

FIG. 17 illustrates a table indicating parameters of a second diffractive optical part;

FIG. 18 illustrates a table indicating a diffraction angle and the like of two diffraction parts;

FIG. 19 illustrates a table summarizing characteristic values of the diffractive optical elements in examples 1, 4, 6, 7 and 9;

FIG. 20 illustrates a table summarizing characteristic values of the diffractive optical elements in examples 2, 3, 5, 8 and 10;

FIG. 21 illustrates a table indicating an average value $\mu_2$ and a standard deviation $\sigma_2$ of the intensity of the diffracted light and the like for the examples 3 through 5;

FIG. 39 is a diagram for explaining the diffractive optical element in the third embodiment;

FIG. 41 is a diagram for explaining the diffractive optical element in a tenth example embodiment;

FIG. 42 is a diagram for explaining the diffractive optical element in an eleventh example embodiment;

FIG. 43 is a diagram for explaining the diffractive optical element in a twelfth example embodiment;

FIG. 44 is a diagram for explaining the diffractive optical element in a thirteenth example embodiment;

FIG. 47 illustrates a table of pitches in X-axis and Y-axis directions of a basic unit of the diffractive optical element in comparison examples 3 through 6;

FIG. 48 illustrates a table of minimum and maximum values of a projection range in the X-axis and Y-axis directions and the like for the comparison examples 3 through 6;

FIG. 49 illustrates a table of values of $M_c$, $M_o$, $M_{max}$, $M_{min}$, $M_o/M_c$ and $M_{min}/M_{max}$ of the diffractive optical element in each of the comparison examples 3 through 6;

FIG. 50 is a diagram for explaining the diffractive optical element in a seventh comparison example;

FIG. 52 illustrates a table of the pitches in the X-axis and Y-axis directions of the basic unit of the diffractive optical element in each of the comparison examples 8 through 11;

FIG. 53 illustrates a table of minimum and maximum values of the projection range and the like for the comparison examples 8 through 11;

FIG. 54 illustrates a table of the values of $M_c$, $M_o$, $M_{max}$, $M_{min}$, $M_o/M_c$ and $M_{min}/M_{max}$ of the diffractive optical element in each of the comparison examples 8 through 11;

FIG. 55 is a diagram for explaining the diffractive optical element in a twelfth comparison example;

DESCRIPTION OF THE PREFERRED EMBODIMENTS

Figure 1:
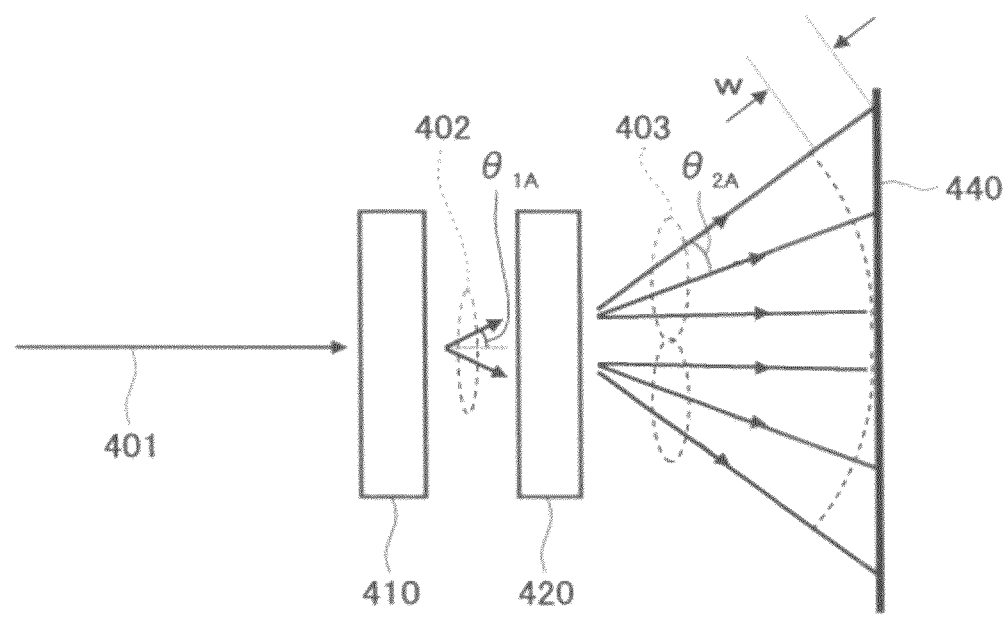
FIG. 1 is a diagram for explaining diffracted light from a diffractive optical element according to related art.

A description will be given of embodiments of the present invention, by referring to the figures. Throughout the figures, those parts that are the same are designated by the same reference numerals, and a description thereof will be omitted.

[First Embodiment]
(Pincushion Distortion)

As described above, when diffracted light is projected onto a plane or a flat surface using a diffractive optical element, corner portions of a projection region of the diffracted light stretch when the diffracted light is distributed so that the projection region becomes an approximately rectangular shape, and the so-called pincushion distortion occurs. Particularly in a case in which two diffractive optical elements are used in order to obtain a wide diffraction angle, the tendency of the pincushion distortion becomes conspicuous. When the pincushion distortion occurs, a density of light spots of the diffracted light decreases towards the four corner portions from a center portion of the projection region of the diffracted light. In other words, the density of the light spots of the diffracted light in vicinities of the four corner portions of the projection region of the diffracted light becomes low compared to the density of the light spots of the diffracted light in a vicinity of the center portion of the projection region of the diffracted light. Accordingly, when the diffractive optical element that generates such a pincushion distortion is used in a measuring apparatus or the like, a measuring sensitivity may deteriorate because the density of the light spots of the diffracted light in a peripheral portion (or perimeter) of the projection region of the diffracted light becomes low.

Figure 2:
FIG. 2 is a diagram for explaining a light spot distribution of the diffractive optical element according to related art.

First, a description will be given of a cause of the pincushion distortion that occurs. When the light is diffracted using two diffractive optical elements 410 and 420 as illustrated in FIG. 1, diffracted light 402 is generated by inputting incident light 401 to the first diffractive optical element 410. The diffracted light 402 from the diffractive optical element 410 has a diffraction angle $\theta_{1A}$, and a distribution of light spots of the diffracted light 402 generated by the diffractive optical element 410 is illustrated in FIG. 2(a). Next, the diffracted light 402 is input to the second diffractive optical element 420 in order to generate diffracted light 403. The diffracted light 403 from the diffractive optical element 420 has a diffraction angle $\theta_{2A}$, and a distribution of light spots of the diffracted light 403 generated by the diffractive optical element 420 is illustrated in FIG. 2(c). FIG. 2(b) illustrates a distribution of light spots of the diffracted light for a case in which the incident light is input perpendicularly to the diffractive optical element 420. When the diffracted light 403 is irradiated on a flat projection surface 440, the four corner portions of a projection region 441 of the light spots of the diffracted light become stretched as illustrated in FIG. 2(c), that is, the projection is made in a state in which the so-called pincushion distortion occurs.

In the International Publication No. WO2007/105205 A2, the projection region 441 on the projection surface 440 is divided (or segmented) into a plurality of regions, and each of the divided regions is projected with a distribution corresponding to the distribution of the light spots illustrated in FIG. 2(b). More particularly, a region of light spots 442 indicated by white circular marks in FIG. 2(c) is obtained by generating the diffracted light 403 by inputting the diffracted light 402 that becomes light spots 411 indicated by white circular marks in FIG. 2(a) to the diffractive optical element 420, and projecting the light spots of the diffracted light 403 onto the projection surface 440. Hence, the light spots corresponding to the distribution of the light spots of the diffracted light illustrated in FIG. 2(b) are generated by each of the four diffracted lights from the diffractive optical element 410, and the projection region 441 is formed in which the distributions of the light spots generated by each of the four diffracted lights are joined.

Therefore, the diffracted light 402 input to the diffractive optical element 420 has been diffracted by the diffractive optical element 410, but in order to widen the projection region 441, the diffraction angle of the diffracted light 402 generated by the direction optical element 410 is desirably wide.

However, the pincushion type blurring is caused by a difference between optical path lengths (or optical distances) of the diffracted light forming the optical spots at the center portion of the projection region 441 and the diffracted light forming the light spots in the peripheral portion of the projection region 441, included in the diffracted light generated by the diffractive optical element 420. The difference between the optical path lengths of the diffracted light forming the optical spots at the center portion of the projection region 441 and the diffracted light forming the light spots in the peripheral portion of the projection region 441 will hereinafter be denoted by a distance w. In other words, the diffracted light forming the optical spots at the peripheral portion of the projection region 441 propagates the distance w longer than the diffracted light forming the light spots in the center portion of the projection region 441, and is thus projected in a spread manner compared to a case in which the diffracted light is projected on a spherical surface having the diffraction part at a center thereof. This tendency becomes conspicuous particularly at the four corners of the projection region 441 where the optical path becomes the longest, and the pincushion distortion in which the four corners stretch occurs. In addition, the interval (or spacing) of the diffracted lights becomes longer as the optical path of the diffracted lights becomes longer. Thus, particularly at the four corners of the projection region 441 where the optical path becomes the longest, the interval of the light spots of the diffracted light becomes long, and the density of the light spots becomes coarse. The same holds true in a case in which the positions where the diffractive optical element 410 and the diffractive optical element 420 are arranged are interchanged.

Figure 3:
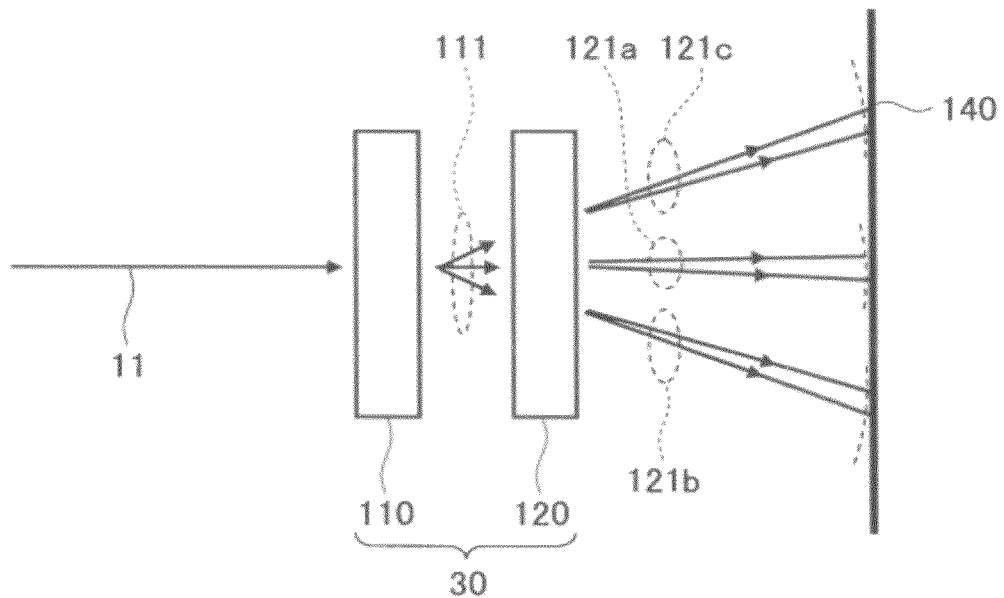
FIG. 3 is a diagram for explaining diffracted light from a diffractive optical element in a first embodiment.
Figure 4:
FIG. 4 is a diagram for explaining a light spot distribution of the diffractive optical element in the first embodiment.

A description will be given of the diffractive optical element in an embodiment, based on FIGS. 3 and 4. A diffractive optical element 30 in this embodiment includes a first diffractive optical part 110 and a second diffractive optical part 120 corresponding to two diffractive optical elements, as will be described later. In the diffractive optical element of this embodiment, the first diffractive optical part 110 has a diffraction angle $\theta_1$, and $k_1$ denotes a number of light spots of the diffracted light generated thereby. The second diffractive optical part 120 has a diffraction angle $\theta_2$, and $k_2$ denotes a number of light spots of the diffracted light generated thereby. A light beam 11 is input to the first diffractive optical part 110 as incident light, and a diffracted light group 111 is generated thereby. The diffracted light group 111 is input to the second diffractive optical part 120, and diffracted light groups 121a, 121b, 121c, . . . are generated thereby, to form a projection region 141 on a projection surface 140 by the light spots of the diffracted light.

In the diffractive optical element of this embodiment, $\theta_1 \geq \theta_2$ and $k_1 \geq k_2$, so that the distribution (projection region) of the light spots of the diffracted light generated by the first diffractive optical part 110 and illustrated in FIG. 4(a) is overlapped and projected on the projection surface 140 in a state in which the distribution of the light spots is positionally shifted by the second diffractive optical part 120, in order to form the projection region 141. By overlapping the distribution of the light spots generated by the first diffractive optical part 110 on the projection surface 140, the density of the light spots in the peripheral portion at the four corners of the projection region 141 may be made approximately the same as the density of the light spots in the center portion of the projection region 141, in order to distribute the light spots in an approximately uniform manner in the projection region 141. FIG. 4(c) illustrates the projection region 141 of the light spots projected on the projection surface 140, and FIG. 4(b) illustrates the distribution of the light spots of the diffracted light for a case in which the incident light is input perpendicularly to the second diffractive optical part 120. In this embodiment, the region in which the light spots generated by the first diffractive optical part 110 are distributed is referred to as the projection region of the light spots generated by the first diffractive optical part 110, and the region in which the light spots generated by the second diffractive optical part 120 are distributed is referred to as the projection region of the light spots generated by the second diffractive optical part 120. In addition, four light spots 142 indicated by white circular marks in FIG. 4(c) correspond to light spot 112 of the diffracted light indicated by white circular marks in FIG. 4(a), diffracted by the second diffractive optical part 120 and projected on the projection surface 140.

The same as the above holds true also when $\theta_1 \leq \theta_2$ and $k_1 \leq k_2$. Accordingly, similar effects may be obtained when the condition $\theta_1 \geq \theta_2$ and $k_1 \geq k_2$ or, the condition $\theta_1 \leq \theta_2$ and $k_1 \leq k_2$ is satisfied.

In this embodiment, the pincushion distortion may be suppressed as described above. When the diffractive optical element 30 is used in the measuring apparatus or the like, more light spots may be generated at the peripheral portion than at the center portion in the distribution of the light spots illustrated in FIG. 4(a), for example, in order to more uniformly distribute the light spots in the center portion and the peripheral portion at the four corners of the projection region 141.

Next, a more detailed description will be given of the embodiment.

(Measuring Apparatus)

Figure 5:
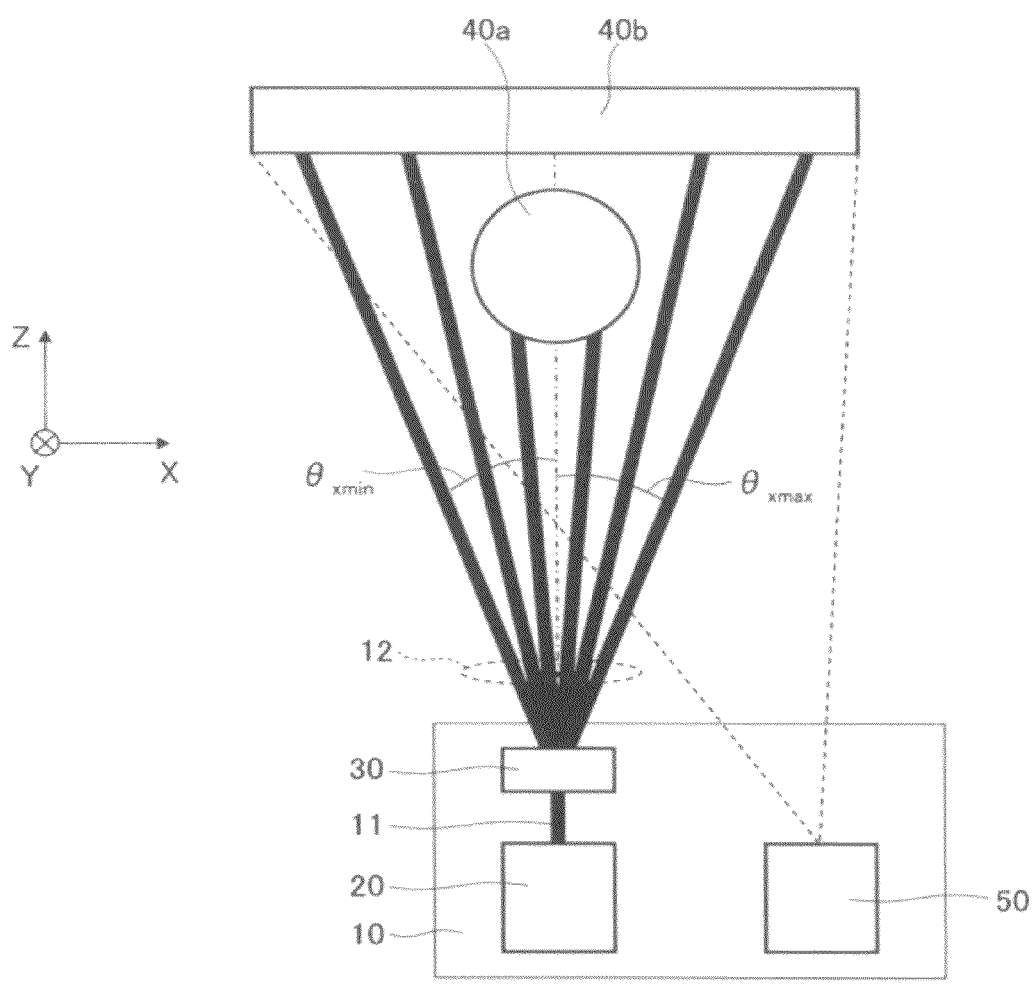
FIG. 5 is a structural diagram illustrating an example of a measuring apparatus in the first embodiment.

A description will be given of a measuring apparatus in this embodiment, based on FIG. 5. FIG. 5 illustrates an example of the structure of the measuring apparatus in this embodiment. A measuring apparatus 10 in this embodiment includes a light source 20, a diffractive optical element 30, and an image sensor 50. The diffractive optical element 30 forms a diffractive optical element in accordance with this embodiment as will be described later, and generates diffracted lights 12 when a light beam (incident light) 11 from the light source 20 is input to the diffractive optical element 30. The image sensor 50 picks up an image of measuring target 40a and 40b irradiated with a projection pattern of light spots formed by the diffracted lights 12.

The diffractive optical element 30 generates a plurality of diffracted lights 12, and a desired projection pattern is framed by the light spots formed by the plurality of diffracted lights 12. Hence, when this projection pattern is irradiated on the measuring targets 40a and 40b and the image of the measuring targets 40a and 40b in the state irradiated with the projection pattern is picked up by the image sensor 50, information related to a three-dimensional shape and the like of the measuring targets 40a and 40b may be acquired. In order to perform the three-dimensional measurement, the number of light spots is preferably 100 or greater, and the diffractive optical element 30 is preferably configured to have maximum diffraction angles $\theta_{xmin}$ and $\theta_{xmax}$ greater than or equal to 30°, that is, configured to generate the diffracted light with a diffraction angle greater than or equal to 30°.

(Diffractive Optical Element)

Figure 6:
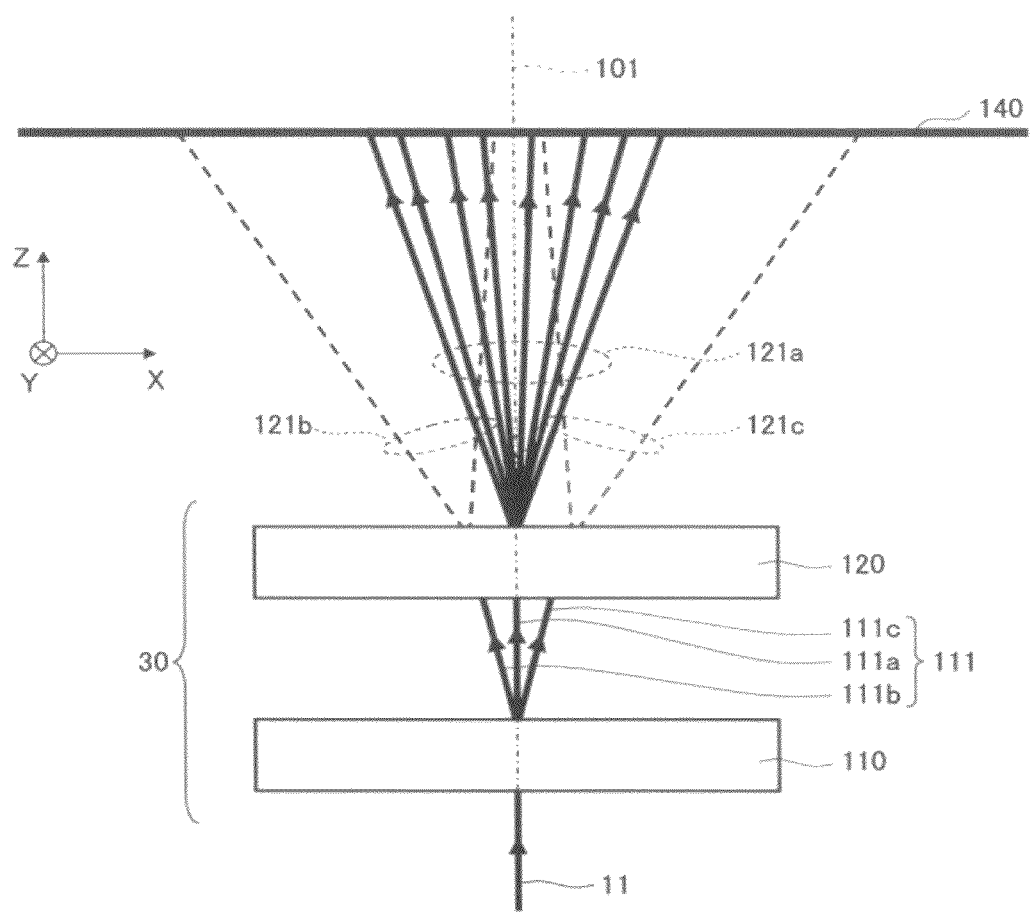
FIG. 6 is a structural diagram illustrating an example of the diffractive optical element in the first embodiment.

Next, a description will be given of the diffractive optical element 30 in this embodiment. As illustrated in FIG. 6, the diffractive optical element 30 of this embodiment includes the first diffractive optical part 110 and the second diffractive optical part 120. The first diffractive optical part 110 may be formed by a diffractive optical element that generates $n_1$ diffracted light groups 111 of diffracted lights 111a, 111b, 111c, . . . when the light beam 11 is input thereto. The second diffractive optical part 120 may be formed by a diffractive optical element that generates $n_2$ diffracted light groups 121a, 121b, 121c, . . . when the $n_1$ diffracted light groups 111 of the diffracted lights 111a, 111b, 111c, . . . is input thereto. Hence, the number of diffracted lights may be increased, and diffracted light with a large diffraction angle may be generated. Accordingly, the light spots of the diffracted light may be distributed in a wide range of the projection surface 140. In this embodiment, it is assumed for the sake of convenience that a Z axis indicates a direction of an optical axis 101 of the light beam 11 that becomes the incident light, and an X axis and a Y axis indicate directions perpendicular to the optical axis 101 of the light beam 11, where the X axis and the Y axis are perpendicular to each other.

Each of the first diffractive optical part 110 and the second diffractive optical part 120 forming the diffractive optical element of this embodiment generates the diffracted light and are similar in this respect. Next, a description will be given of a diffractive optical element 230 forming the first diffractive optical part 110 and the second diffractive optical part 120.

Figure 7:
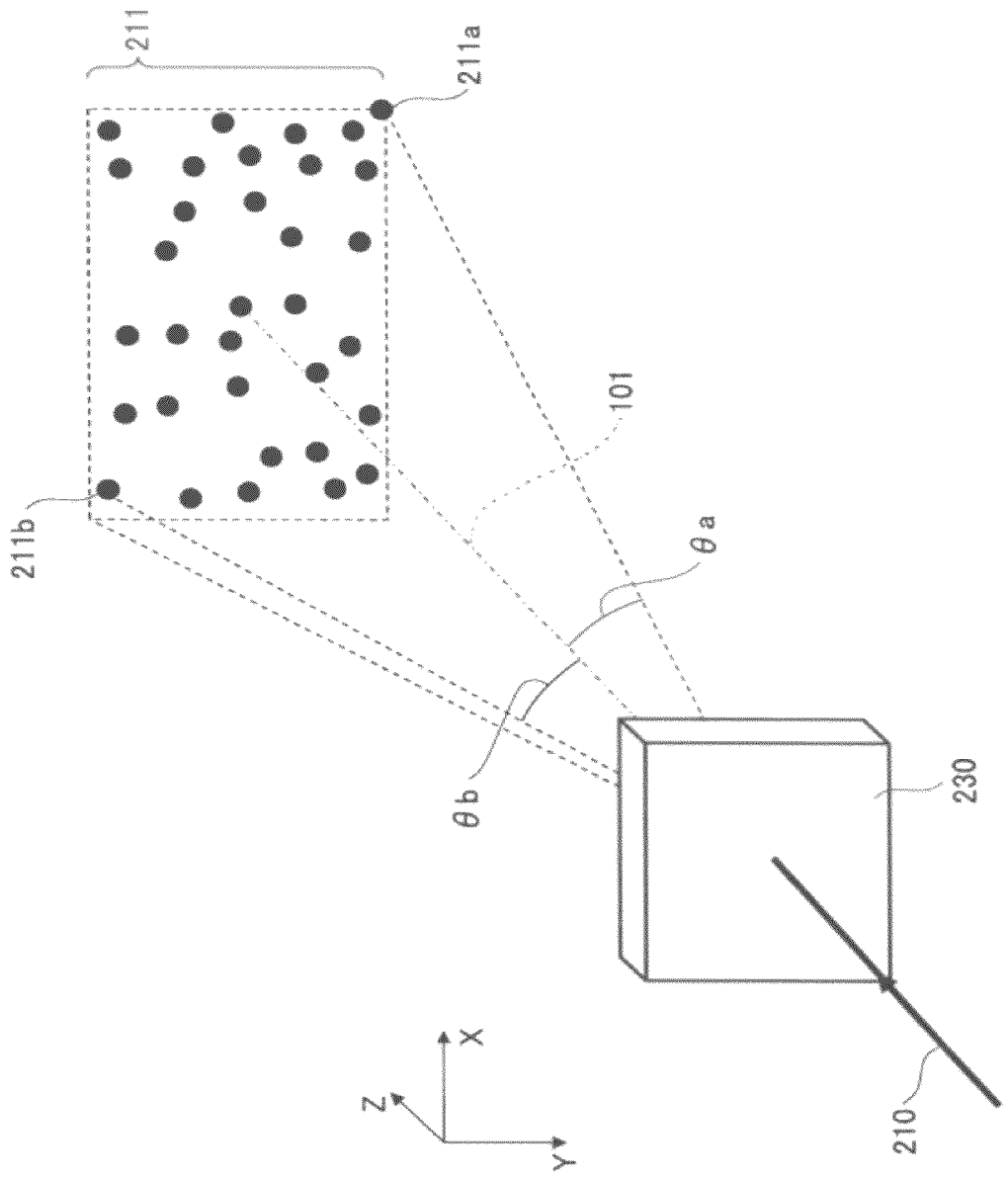
FIG. 7 is a diagram for explaining light spots generated by the diffractive optical element.

As illustrated in FIG. 7, a diffracted light group 211 is generated when a light beam 210 is input to the diffractive optical element 230 as incident light. In the diffracted light group 211, diffracted light 211a has a largest diffraction angle, $\theta_a$, with respect to the optical axis 101, and this diffraction angle $\theta_a$ is used as a diffraction angle range $\theta_x$. In addition, an angle (center angle) $\theta_0$ of a center of the diffraction range with respect to the optical axis 101 is 0°. Diffracted light 211b having a diffraction angle $\theta_b$ is generated in a vicinity of the position opposite the diffracted light 211a with respect to the optical axis 101. When a difference between the diffraction angles $\theta_a$ and $\theta_b$ is 3° or greater, for example, and is relatively large, the diffraction angle range ex may be set to $\theta_x=(\theta_a+\theta_b)/2$, and the center angle $\theta_0$ may be set to $\theta_0=(\theta_a-\theta_b)/2$.

In addition, the diffracted light may not be generated on the opposite side of the diffracted light 211a with respect to the optical axis 101, that is, the diffracted light group may only be generated on the side where the diffracted light 211a is generated with respect to the optical axis 101. In such a case, when a diffraction angle of the diffracted light closest to the optical axis 101 is denoted by $\theta_c$, the diffraction angle range ex may be set to $\theta_x=(\theta_a-\theta_c)/2$, and the center angle $\theta_0$ may be set to $\theta_0=(\theta_a+\theta_c)/2$.

In this embodiment, the angle that results in the diffraction angle range $\theta_x$ is regarded as being the diffraction angle as described above, and the diffraction angle in the first diffractive optical part 110 is denoted by $\theta_1$, the diffraction angle in the second diffractive optical part 120 is denoted by $\theta_2$, and the diffraction angle in the diffractive optical element 30 of this embodiment is denoted by $\theta$.

Next, a more detailed description will be given of the diffractive optical element 230. The diffracted light 211 is generated by inputting the light beam 210 to the diffractive optical element 230 as the incident light. This diffracted light 211 is light diffracted by an angle $\theta_x$ in the X-axis direction and by an angle $\theta_y$ in the Y-axis direction with reference to the Z-axis direction in the following diffraction grating formulas (1). In the diffraction grating formulas (1), $m_x$ denotes an order of diffraction in the X-axis direction, $m_y$ denotes an order of diffraction in the Y-axis direction, and $\lambda$ denotes a wavelength of the light beam 210. In addition, $P_x$ and $P_y$ denote pitches of basic units of the diffractive optical element which will be described later in the X-axis direction and the Y-axis direction, respectively. When the diffracted light 211 is irradiated on a projection surface such as a screen or a measuring target, a plurality of light spots are generated in the irradiated region.

$$\sin\theta_x = m_x\lambda/P_x$$
$$\sin\theta_y = m_y\lambda/P_y \quad (1)$$

The diffraction grating formulas (1) are for a case in which the incident light is input perpendicularly to the diffractive optical element. FIG. 6 illustrates a state in which the incident light 11 is input perpendicularly with respect to the diffractive optical element 30, but when the light source is a laser light source or the like, the incident light 11 may be input to the diffractive optical element 30 in a direction inclined from the direction perpendicular to the diffractive optical element 30, in order to prevent light reflected from the diffractive optical element 30 from being optically fed back to the laser light source or the like. This is because the optical feedback to the laser light source or the like may cause unstable laser oscillation due to effects of interference.

The diffractive optical element 30 described above may be formed by a diffractive optical element that is designed by an iterative Fourier transform method or the like. The diffractive optical element refers to an element in which basic units that generate predetermined phase distributions are arranged periodically, that is, two-dimensionally, for example. In such a diffractive optical element, the distribution of the order of diffraction of the far diffracted light may be obtained by a Fourier transform in the basic units, as has been explained by the scalar diffraction theory. An electromagnetic field is a vector quantity but may be represented by a scalar quantity within an isotropic medium, and a scalar function $u(A, t_m)$ at a time $t_m$ and a point A may be represented by the following formula (2).

$$u(A,t_m)=Re[U(A)exp(-i\omega t_m)] \quad (2)$$

The formula (2) indicates a case in which the incident light is monochromatic light, where U(A) denotes a complex amplitude and $\omega$ denotes an angular frequency. The scalar function represented by the formula (2) satisfies the following wave equation (3) in all space.

$$\nabla^2 u - \frac{1}{c^2}\frac{\partial^2 u}{\partial t^2} = 0 \quad (3)$$

When the formula (2) is substituted into the wave equation (3), the following Helmholtz equation (4) may be obtained.

$$(\nabla^2+k^2)u=0 \quad (4)$$

In the Helmholtz equation (4), k denotes a wavenumber, and $k=2\pi/\lambda$. By solving the wave equation (3), a scalar function distribution in space may be computed. In addition, when a sufficiently thin flat screen that gives a certain phase distribution is denoted by $\Sigma$, a point on the screen $\Sigma$ is denoted by $A_1$, and the scalar function at the point $A_0$ for a case in which a plane wave is transmitted through the screen $\Sigma$ is computed from the Helmholtz equation (4) using the Kirchhoff's boundary condition, the following formula (5) may be obtained, where $r_{01}$ denotes a distance between the points $A_0$ and $A_1$.

$$u(A_0) \propto \int\int_\Sigma u(A_1)\frac{e^{ikr_{01}}}{r_{01}}dS \quad (5)$$

Furthermore, when a coordinate at the point $A_0$ is denoted by $(x_0, y_0, 0)$, a coordinate at the $A_1$ is denoted by $(x_1, y_1, z)$, and z is a value sufficiently larger than $|x_0-x_1|, |y_0-y_1|$, the Fraunhofer approximation represented by the following formula (6) may be obtained by expanding $r_{01}$.

$$u(x_0,y_0) \propto \iint_\Sigma u(x_1,y_1)e^{-i(k/z)(x_0x_1+y_0y_1)}dS \quad (6)$$

The formula (6) corresponds to a Fourier transform of the phase distribution given by the screen. Particularly in a case in which the phase distribution $u(A_1)$ subsequent to the screen has a periodicity of the pitch $P_x$ in the X-axis direction and the pitch $P_y$ in the Y-axis direction, diffracted light having an order (m, n) of diffraction is generated in u(A0) as may be seen from the following formulas (7).

$$\sin\theta x_{out}=\sin\theta x_{in}+m\times\lambda/P_x$$
$$\sin\theta y_{out}=\sin\theta y_{in}+n\times\lambda/P_y \quad (7)$$

In this case, a diffraction efficiency $\eta_{mn}$ of the (m, n) order diffracted light may be represented by the following formula (8), using a phase distribution $u'(x_1, y_1)$ of the periodic basic units, where m and n denote integers, $\theta x_{in}$ and $\theta y_{in}$ respectively denote angles of the incident light in the X-axis direction and the Y-axis direction with respect to the Z-axis, and $\theta x_{out}$ and $\theta y_{pit}$ respectively denote angles of emitted (or output) light in the X-axis direction and the Y-axis direction with respect to the Z-axis.

$$\eta_{mn} \propto |\int_0^{P_x}\int_0^{P_y}u'(x_1,y_1)e^{-i(2\pi mx/P_x+2\pi ny/P_y)}dS|^2 \quad (8)$$

Accordingly, when the phase distribution of the basic units is obtained, the intensity distribution of the diffracted light may be computed by a Fourier transform of the phase distribution of the basic units. Thus, a diffractive optical element that generates the diffracted light having the desired distribution may be obtained by optimizing the phase distribution of the basic units.

Figure 8:
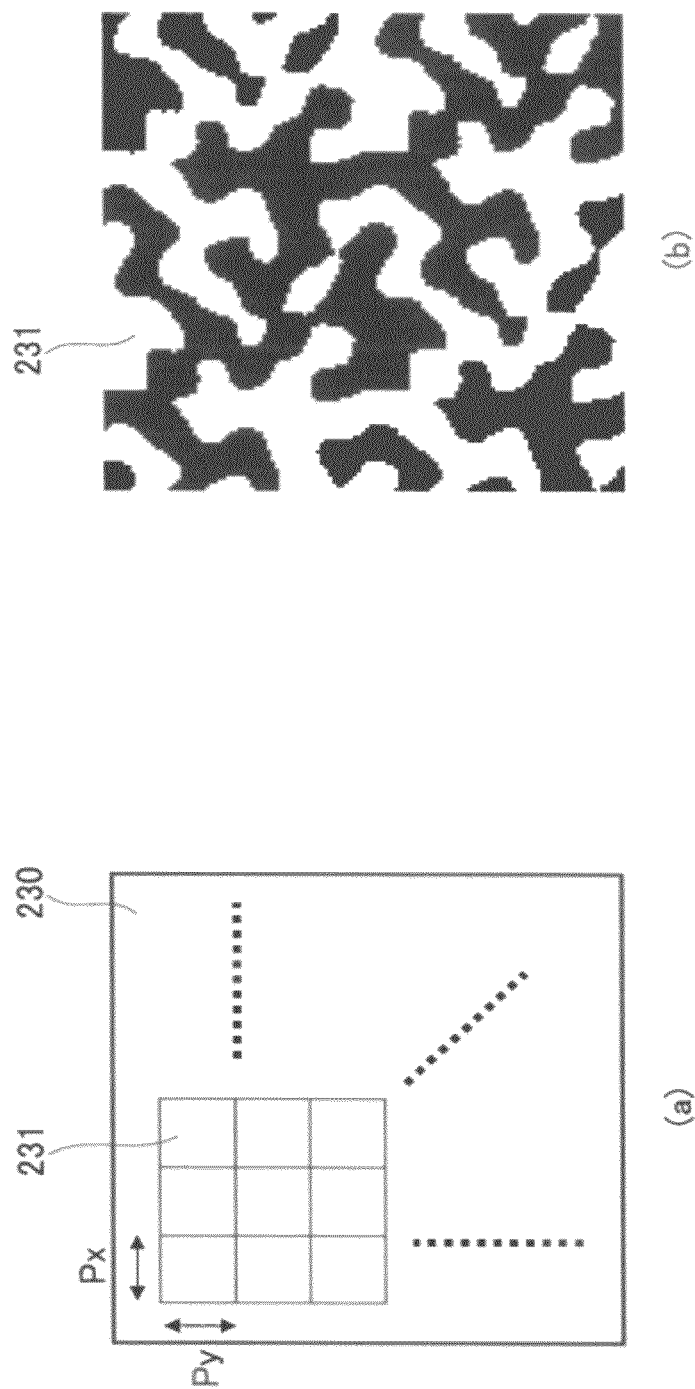
FIG. 8 is a diagram for explaining the diffractive optical element in the first embodiment.

Next, a description will be given of the structure of the diffractive optical element 230, based on FIG. 8. As illustrated in FIG. 8(a), the diffractive optical element 230 includes basic units 231 that are periodically arranged two-dimensionally at the pitch $P_x$ in the X-axis direction and at the pitch $P_y$ in the Y-axis direction. More particularly, the basic units 231 have a phase distribution illustrated in FIG. 8(b). FIG. 8(b) illustrates the diffractive optical element 230 having a concave-convex pattern that includes convex parts indicated black regions and concave parts indicated by white (or blank) regions. The diffractive optical element 230 has a structure to generate the phase distribution. Examples of this structure may include a light transmitting member made of a material such as glass and resin with a concave-convex pattern formed on a surface thereof, and a transparent member with a concave-convex pattern and bonded to a member having a refractive index different from that of the transparent member in order to make the surface of the concave-convex pattern flat. A further example of this structure may include a transparent member having a refractive index that is varied. In other words, the concave-convex pattern does not only include the concave-convex in the surface shape, and may include a structure that may provide a phase difference to the incident light. In addition, the number of basic units does not need to be an integer when the basic units 231 are arranged two-dimensionally in the diffractive optical element 230, and a boundary of the concave-convex pattern and a region having no concave-convex pattern may not match a boundary of the basic units as long as one or more basic units are included within the concave-convex pattern.

Figure 9:
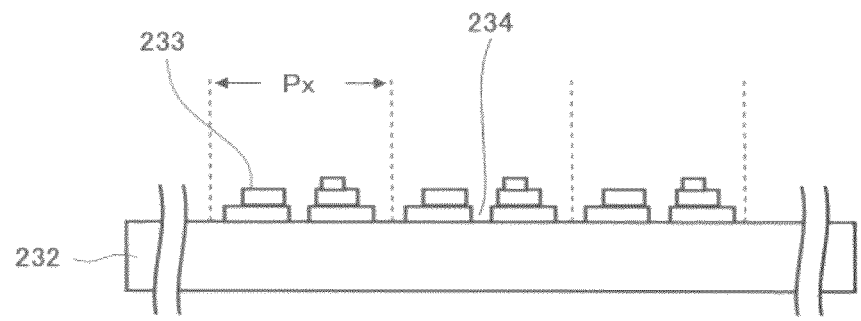
FIG. 9 is a structural diagram illustrating an example of a first diffractive optical part and a second diffractive optical part.

As one example of the diffractive optical element 230, FIG. 9 schematically illustrates a cross section of the diffractive optical element 230 having a structure in which the concave-convex pattern is formed by forming convex parts 233 on a surface of a transparent substrate 232 made of glass or the like. In this diffractive optical element 230, concave parts 234 are formed by regions where no convex part 233 is formed on the surface of the transparent substrate 232.

The transparent substrate 232 needs to be transparent with respect to the incident light, and substrates made of various kinds of materials, including a glass substrate, a resin substrate, a resin film, and the like, may be used as the transparent substrate 232. Optically isotropic materials, including glass, quartz, and the like, are preferably used for the transparent substrate 232 because such materials do not cause birefringence effects on the transmitted light. In addition, the transparent substrate 232 may include a reflection preventing layer having a multi-layer structure formed at an interface between the transparent substrate 232 and surrounding air, in order to reduce reflection of light due to Fresnel reflection.

The convex parts 233 may be formed using a material such as an organic material, an inorganic material, and organic-inorganic hybrid material. The methods of forming the convex parts 233 may include a method using photolithography and etching, an injection molding to transfer the concave-convex pattern by a mold or die, and a method using imprint. In addition, the convex parts 233 do not necessarily have to be formed using a single material, and for example, the convex parts 233 may be formed by a multi-layer structure made of inorganic materials. Furthermore, a reflection preventing layer or a reflection preventing structure may be formed on the surface of the convex parts 233 in order to reduce surface reflection.

Figure 10:
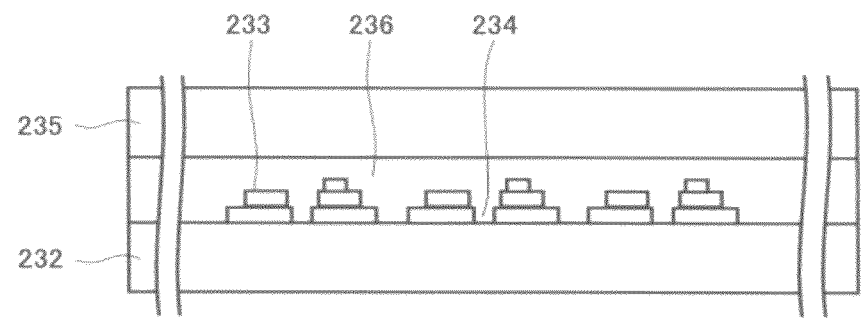
FIG. 10 is a structural diagram illustrating another example of the first diffractive optical part and the second diffractive optical part.

As illustrated in FIG. 10, the diffractive optical element 230 is provided with a transparent substrate 235 on the side where the convex parts 233 are formed on the surface of the transparent substrate 232. A transparent resin 236 having a refractive index different from the refractive index of the material forming the convex parts 233 fills a space between the transparent substrates 232 and 235. Alternatively, instead of providing the transparent substrate 235, the transparent resin 236 having the refractive index different from the refractive index of the material forming the convex parts 233 may be formed on the side where the convex parts 233 are formed on the surface of the transparent substrate 232, and the surface of the transparent resin 236 may be planarized.

The diffractive optical element 230 described above may be fabricated by a technique using the iterative Fourier transform method or the like. In other words, because the phase distribution of the basic units 231 of the diffractive optical element and the field distribution of the diffracted light are in a Fourier transform relationship, the phase distribution of the basic units 231 may be obtained by an inverse Fourier transform of the field distribution of the diffracted light.

When fabricating the diffractive optical element 230, the limited condition (or constraints) include only the intensity distribution of the diffracted light, and not the phase condition. Hence, the phase distribution of the basic units 231 may be arbitrary. According to the iterative Fourier transform method, the information of the phase distribution of the basic units is extracted by the inverse Fourier transform of the light intensity distribution of the diffracted light, and the phase distribution that is obtained may be used as the phase distribution of the basic units to further perform a Fourier transform. Hence, a difference between a result of the Fourier transform and the light intensity distribution of predetermined diffracted light becomes an evaluation value, and the computation described above may be repeated, in order to obtain, as an optimum design, the phase distribution of the diffractive optical element that minimizes the evaluation value.

Various design algorithms of the diffractive optical element other than the above have been proposed, including the algorithm described in Bernard Kress and Patrick Meyruelis, "Digital Diffraction Optics", Maruzen, published March 2005, for example. In addition, the Fourier transform method may use a Fast Fourier Transform (FFT) algorithm or the like.

[Second Embodiment]

Next, a description will be given of a second embodiment. The diffractive optical element in this embodiment has a structure integrally including the first diffractive optical part and the second diffractive optical part or, includes convex parts forming the first diffractive optical part on one surface of a single substrate and convex parts forming the second diffractive optical part on the other surface of the single substrate. Hence, alignment of the first diffractive optical part and the second diffractive optical part becomes unnecessary, and the diffractive optical element may be reduced to a small size.

Figure 11:
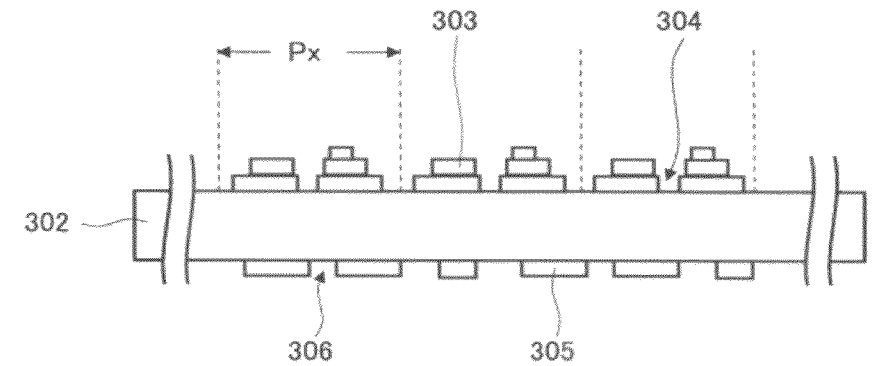
FIG. 11 is a structural diagram illustrating an example of the diffractive optical element in a second embodiment.

In a diffractive optical element illustrated in FIG. 11, convex parts 303 of the first diffractive optical part are formed on one surface of a transparent substrate 302, in order to form an concave-convex pattern by the convex parts 303 and concave parts 304 that are formed by regions where no convex part 303 is formed. On the other hand, convex parts 305 of the second diffractive optical part are formed on the other surface of the transparent substrate 302, in order to form an concave-convex pattern by the convex parts 305 and concave parts 306 that are formed by regions where no convex part 305 is formed.

FIGS. 12 through 15 illustrate diffractive optical elements having a structure in which a first diffractive optical part 310 and a second diffractive optical part 320 are adhered and bonded using an adhesive or the like. The first diffractive optical part 310 includes an concave-convex pattern formed by convex parts 313 that are formed on a surface of a transparent substrate 312, and concave parts 314 that are formed by regions where no convex part 313 is formed. On the other hand, the second diffractive optical part 320 includes an concave-convex pattern formed by convex parts 323 that are formed on a surface a transparent substrate 322, and concave parts 324 that are formed by regions where no convex part 323 is formed. The first diffractive optical element 310 and the like in this embodiment corresponds to the first diffractive optical part 110 of the first embodiment, and the second diffractive optical part 320 and the like in this embodiment corresponds to the second diffractive optical part 120 of the first embodiment.

Figure 12:
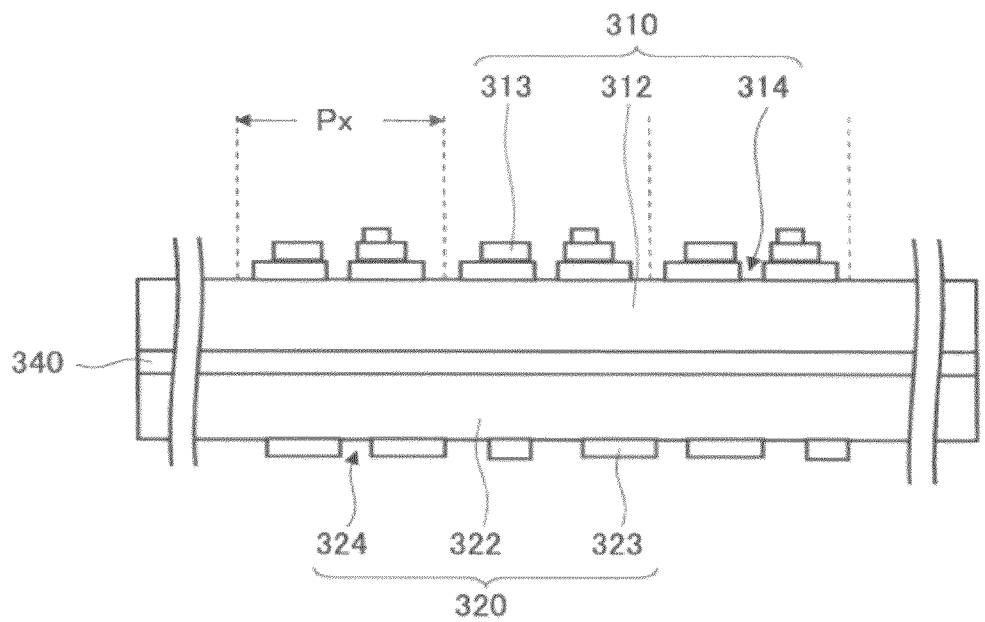
FIG. 12 is a structural diagram illustrating another example of the diffractive optical element in the second embodiment.

In the diffractive optical element illustrated in FIG. 12, the surface of the first diffractive optical part 310 not formed with the convex parts 313 is arranged to oppose the surface of the second diffractive optical part 320 not formed with the convex parts 323, and the mutually opposing surfaces are bonded by an adhesive agent 340.

Figure 13:
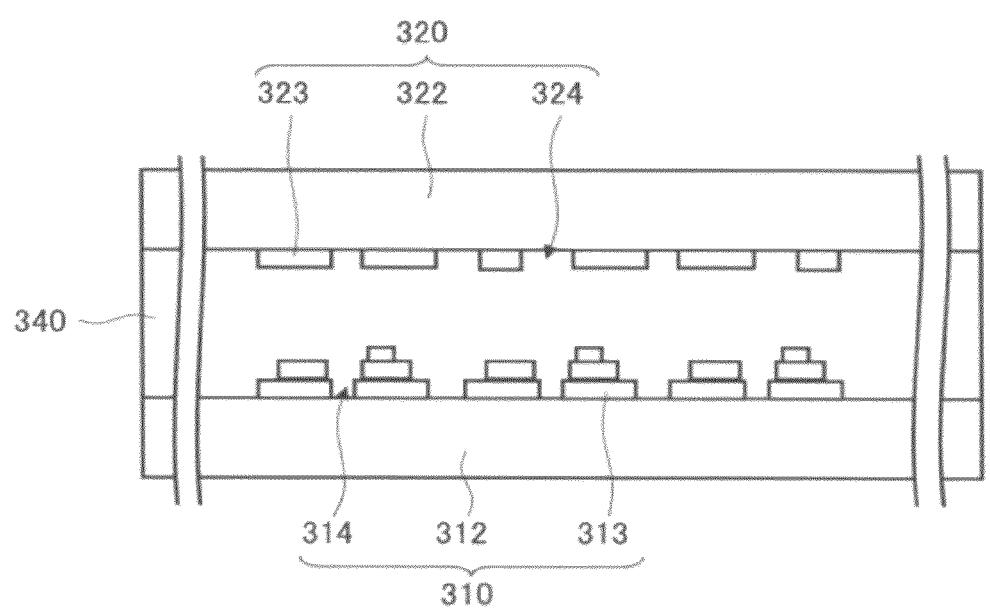
FIG. 13 is a structural diagram illustrating another example of the diffractive optical element in the second embodiment.

In the diffractive optical element illustrated in FIG. 13, the surface of the first diffractive optical part 310 formed with the convex parts 313 is arranged to oppose the surface of the second diffractive optical part 320 formed with the convex parts 323, and the mutually opposing surfaces are bonded by the adhesive agent 340.

Figure 14:
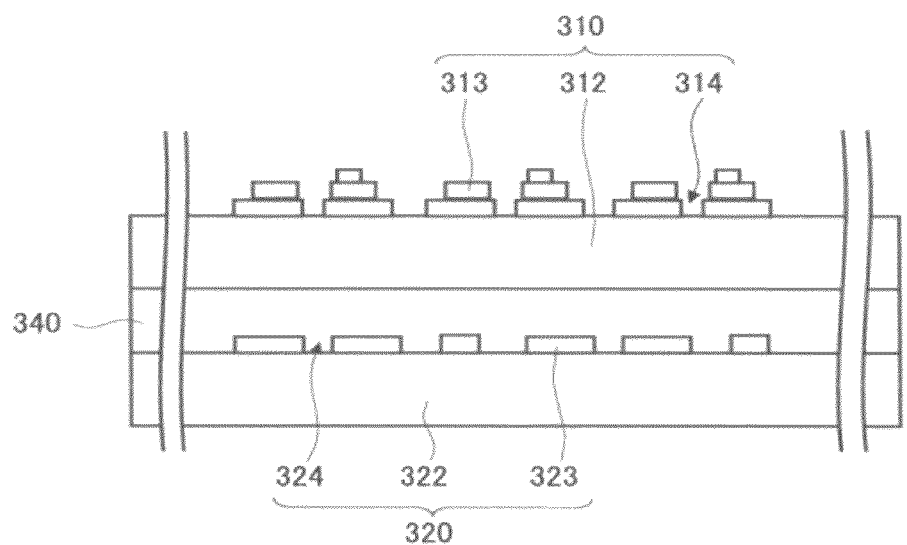
FIG. 14 is a structural diagram illustrating another example of the diffractive optical element in the second embodiment.

In the diffractive optical element illustrated in FIG. 14, the surface of the first diffractive optical part 310 not formed with the convex parts 313 is arranged to oppose the surface of the second diffractive optical part 320 formed with the convex parts 323, and the mutually opposing surfaces are bonded by the adhesive agent 340.

Figure 15:
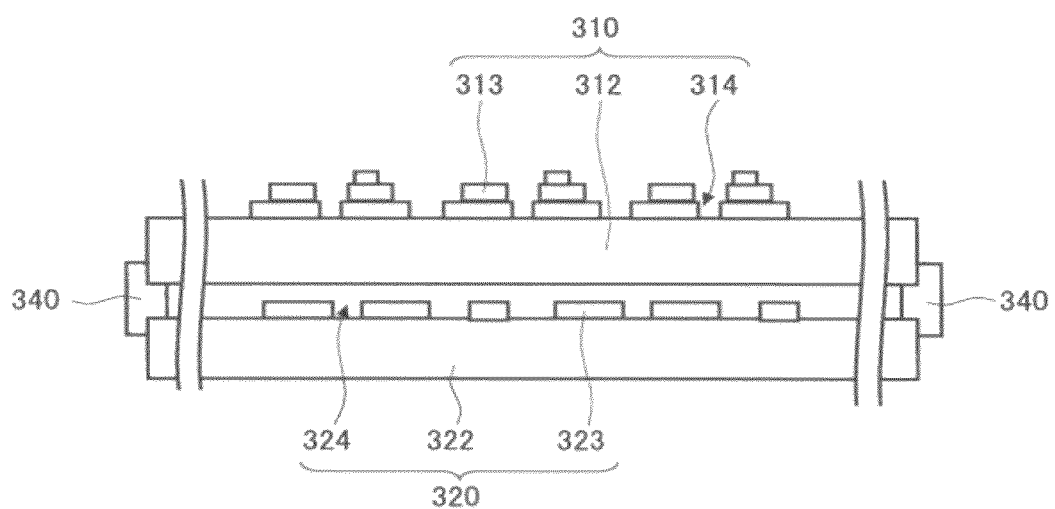
FIG. 15 is a structural diagram illustrating another example of the diffractive optical element in the second embodiment.

In the diffractive optical element illustrated in FIG. 15, the surface of the first diffractive optical part 310 not formed with the convex parts 313 is arranged to oppose the surface of the second diffractive optical part 320 formed with the convex parts 323, and the periphery of the mutually opposing surfaces are bonded by the adhesive agent 340.

<Example Embodiments>

Next, a description will be given of example embodiments. FIGS. 16 through 18 illustrate tables summarizing the structures of the diffractive optical elements in examples 1 through 10. In this specification, the examples 1 through 8 correspond to example embodiments 1 through 8, and examples 9 and 10 correspond to comparison examples 1 and 2. In the examples 1 through 10, quartz is used for the transparent substrates of the first diffractive optical part and the second diffractive optical part, and the wavelength λ of the incident light beam is 830 nm. The table in FIG. 16 indicates a spot number $n_1$ generated by the first diffractive optical part, a maximum order of diffraction in the X-axis direction (X-max), a minimum order of diffraction in the X-axis direction (X-min), a maximum order of diffraction in the Y-axis direction (Y-max), a minimum order of diffraction in the Y-axis direction (Y-min), pitches $P_x$ and $P_y$ at which the basic units are respectively arranged in the X-axis direction and the Y-axis direction, a number of steps of the diffraction part, and a height of each step. The table in FIG. 16 further indicates a diffraction angle $\theta_1$ obtained by this structure, together with maximum values that may be taken by a diffraction angle of the diffracted light on the X-axis and a diffraction angle of the diffracted light on the Y-axis, and a refractive index of the medium used for the example.

The table in FIG. 17 indicates a spot number $n_2$ generated by the second diffractive optical part, a maximum order of diffraction in the X-axis direction (X-max), a minimum order of diffraction in the X-axis direction (X-min), a maximum order of diffraction in the Y-axis direction (Y-max), a minimum order of diffraction in the Y-axis direction (Y-min), pitches $P_x$ and $P_y$ at which the basic units are respectively arranged in the X-axis direction and the Y-axis direction, a number of steps of the diffraction part, and a height of each step. The table in FIG. 17 further indicates a diffraction angle $\theta_2$ obtained by this structure, together with maximum values that may be taken by a diffraction angle of the diffracted light on the X-axis and a diffraction angle of the diffracted light on the Y-axis, and a refractive index of the medium used for the example. The second diffractive optical part is designed using, as a reference, the phase difference that is generated when the light beam is incident at a predetermined incidence angle, and this incidence angle is indicated as a design incidence angle Ø. The table in FIG. 17 also indicates values of $1/\cos Ø_{avg}$, and $\lambda \cos Ø_{avg}$ computed from the design incidence angle Ø. When a spectrometry is done for a case in which the light beam is input to the second diffractive optical part and the wavelength is $\lambda \cos Ø_{avg}$, the characteristic that is obtained is similar to that for a case in which the wavelength is λ and the incidence angle is Ø. $Ø_{avg}$ takes a value $Ø_{avg} = (Ø_0+Ø_1)/2$ when the light is input to the second diffractive optical part at an incidence angle $Ø_0$ and the angle of refraction in the second diffractive optical part is denoted by $Ø_1$. When a medium other than air is used for the concave parts of the second diffractive optical part, an angle computed from the refractive index of the medium forming the concave parts using Snell's law may be used as the value for the angle $Ø_0$.

The table in FIG. 18 indicates the diffraction angle θ of the light beam transmitted through the two diffraction parts, together with maximum values that may be taken by a diffraction angle of the diffracted light on the X-axis and a diffraction angle of the diffracted light on the Y-axis.

FIGS. 19 and 20 illustrate tables summarizing the characteristic values of the diffractive optical elements in the examples 1 through 10. The tables in FIGS. 19 and 20 indicate an average value $\mu_1$ and a standard deviation $\sigma_1$ of the intensity of the diffracted light that are computed for a case in which a light beam having an intensity 1 is input to the first diffractive optical part, by not taking into consideration the reflection that occurs at the interface of the diffraction parts when making the computation. In addition, the value of the standard deviation $\sigma_1$ divided by the average value $\mu_1$ is represented in a percentage, and this percentage will be referred to as a luminous energy fluctuation (or light quantity fluctuation) due to the first diffractive optical part 110.

In addition, the tables in FIGS. 19 and 20 also indicate an average value $\mu_2$ and a standard deviation $\sigma_2$ of the intensity of the diffracted light that are computed for a case in which a light beam having an intensity 1 is input to the second diffractive optical part at a predetermined incident angle, by not taking into consideration the reflection that occurs at the interface of the diffraction parts when making the computation. In addition, the value of the standard deviation $\sigma_2$ divided by the average value $\mu_2$ is represented in a percentage, and this percentage will be referred to as a luminous energy fluctuation (or light quantity fluctuation) due to the second diffractive optical part 120. Further, a luminous energy fluctuation (or light quantity fluctuation) of the diffractive optical element is obtained from $\sigma = \{(\sigma_1/\mu_1)^2 + (\sigma_2/\mu_2)^2\}^{0.5}$. Moreover, a luminous energy of the zero order diffracted light of the second diffractive optical part 120 is indicated for various incident angles.

The tables in FIGS. 19 and 20 further indicate computation results for a case in which light spots of the diffracted light generated by design are measured on a screen located at a predetermined position away from the diffractive optical element, amongst the diffracted lights generated by the diffractive optical element. The position of the screen is regarded as the measuring position, and a rectangular measuring range is indicated using coordinates (X, Y) on the screen. In addition, an angle in the diagonal direction of the measuring range measured from the position of the diffractive optical element is regarded as the measuring range angle. When measuring the spots, the spots within measuring regions having uniform areas when the measuring range is divided (or segmented) into 9 areas in the X-axis direction and into 9 in the Y-axis direction are measured. The tables in FIGS. 19 and 20 indicate the number of spots in a center region R(5, 5), an average value of the number of spots in peripheral regions R(1, 1), R(1, 9), R(9, 1) and R(9, 9), a maximum value of the number of spots in the regions R(1, 1) through R(9, 9), and a minimum value of the number of spots in the regions R(1, 1) through R(9, 9), where R(1, 1) denotes the measuring region having the minimum X coordinate and the minimum Y coordinate, and R(9, 9) denotes the measuring region having the maximum X coordinate and the maximum Y coordinate.

A table in FIG. 21 indicates an average value $\mu_2$ and a standard deviation $\sigma_2$ of the intensity of the diffracted light that are computed for a case in which a light beam having an intensity 1 is input to the second diffractive optical part at a predetermined incident angle for each of the wavelengths indicated in FIG. 21, when the light is input perpendicularly to the first diffractive optical part in the diffractive optical element of the examples 3 through 5, by not taking into consideration the reflection that occurs at the interface of the diffraction parts when making the computation. Moreover, a luminous energy of the zero order diffracted light of the second diffractive optical part 120 is indicated for various incident wavelengths.

(Embodiment 1)

Figure 22:
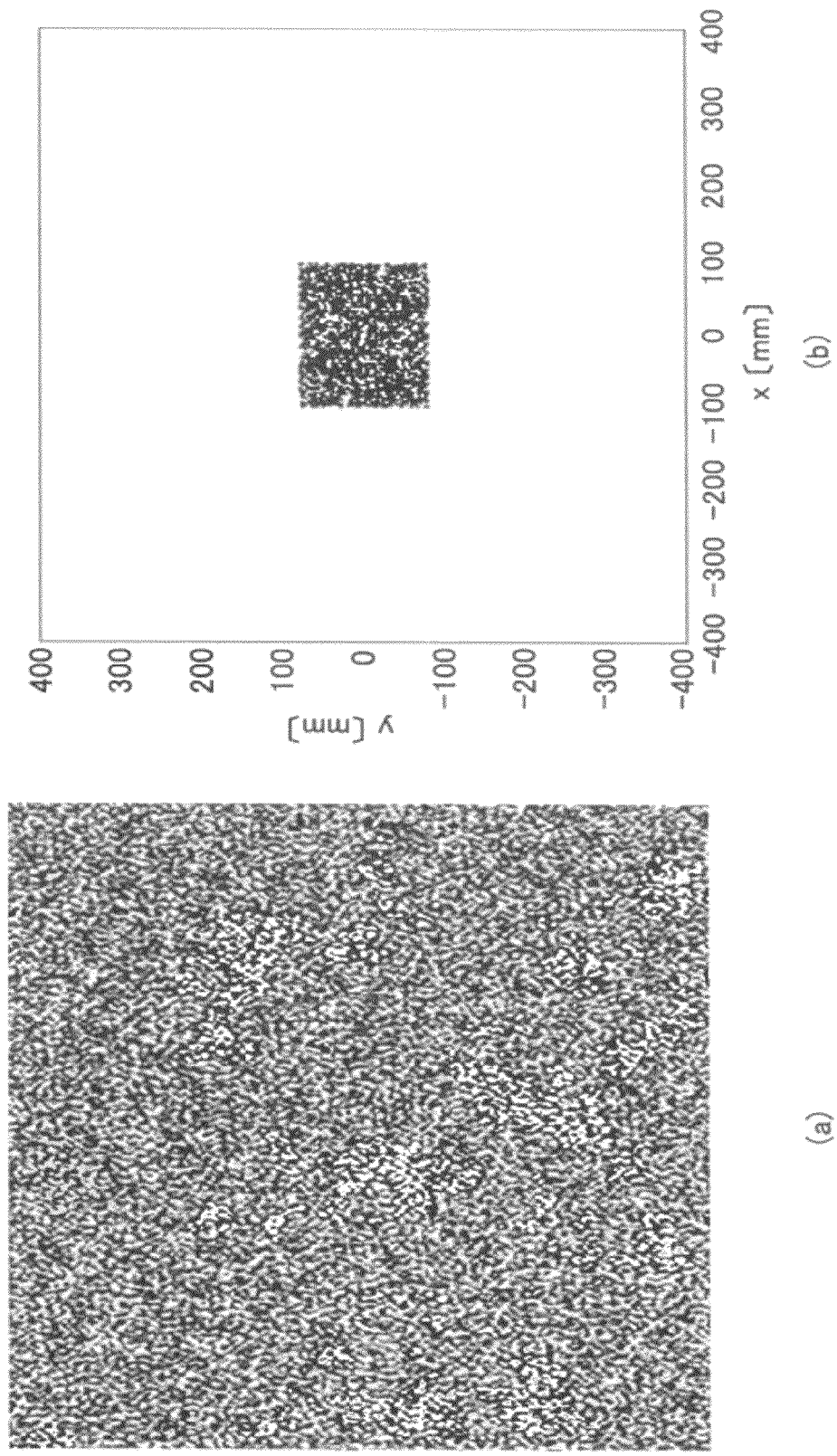
FIG. 22 is a diagram for explaining one of the diffractive optical parts used in first and fourth example embodiments.

The embodiment 1 corresponds to the diffractive optical element of the example 1 illustrated in FIGS. 16 through 19, and is an example of the case in which the diffraction angle $\theta_1$ of the first diffractive optical part 110 and the diffraction angle $\theta_2$ of the second diffractive optical part 120 satisfy $\theta_1 \leq \theta_2$. FIG. 22(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 22(b) illustrates a light spot distribution of the diffracted light that is generated by design on the screen that is located at a position 554.3 mm from the diffraction part when the light is input perpendicularly to this diffraction part.

Figure 23:
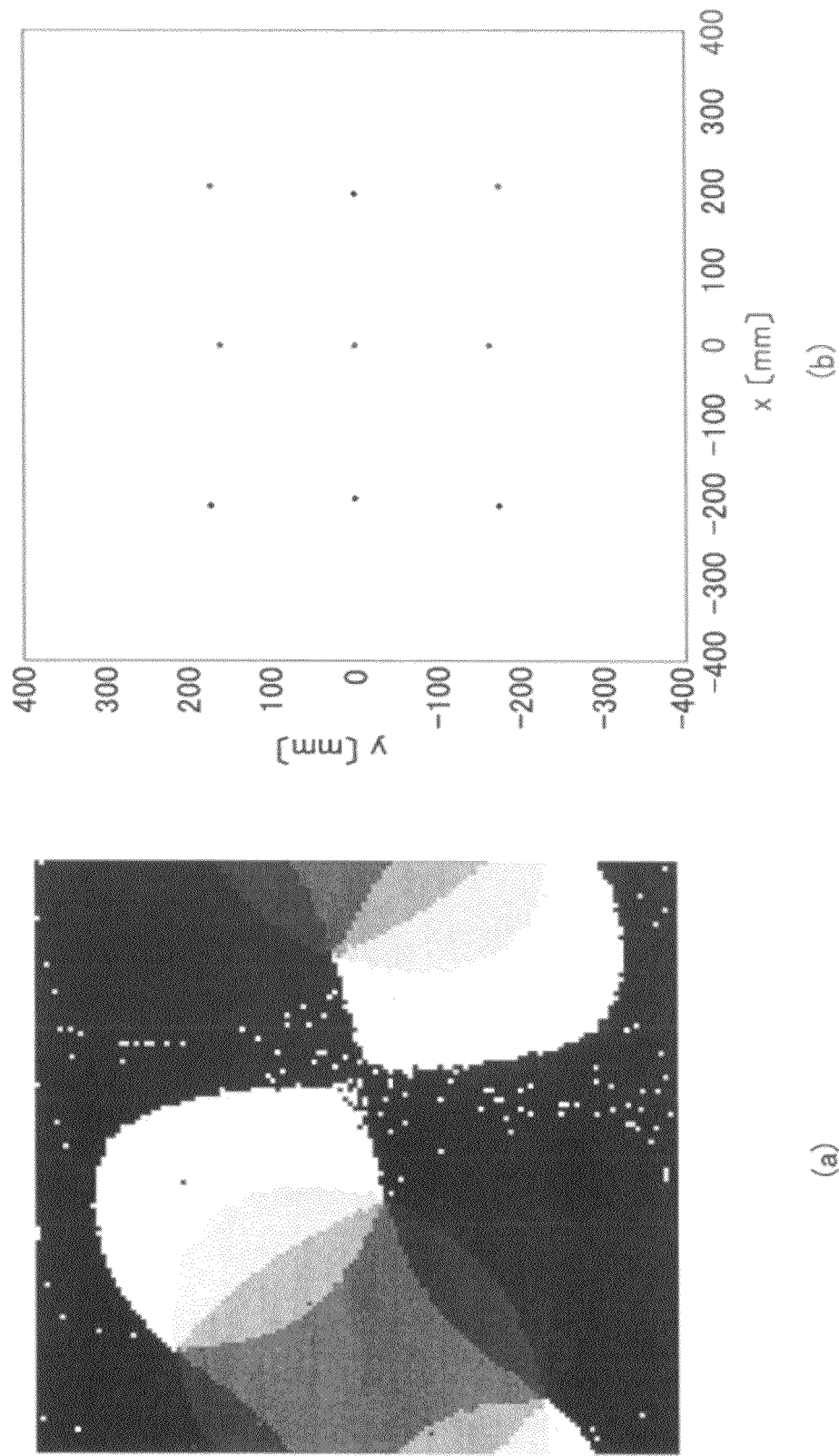
FIG. 23 is a diagram for explaining the other of the diffractive optical parts used in the first and fourth example embodiments.
Figure 24:
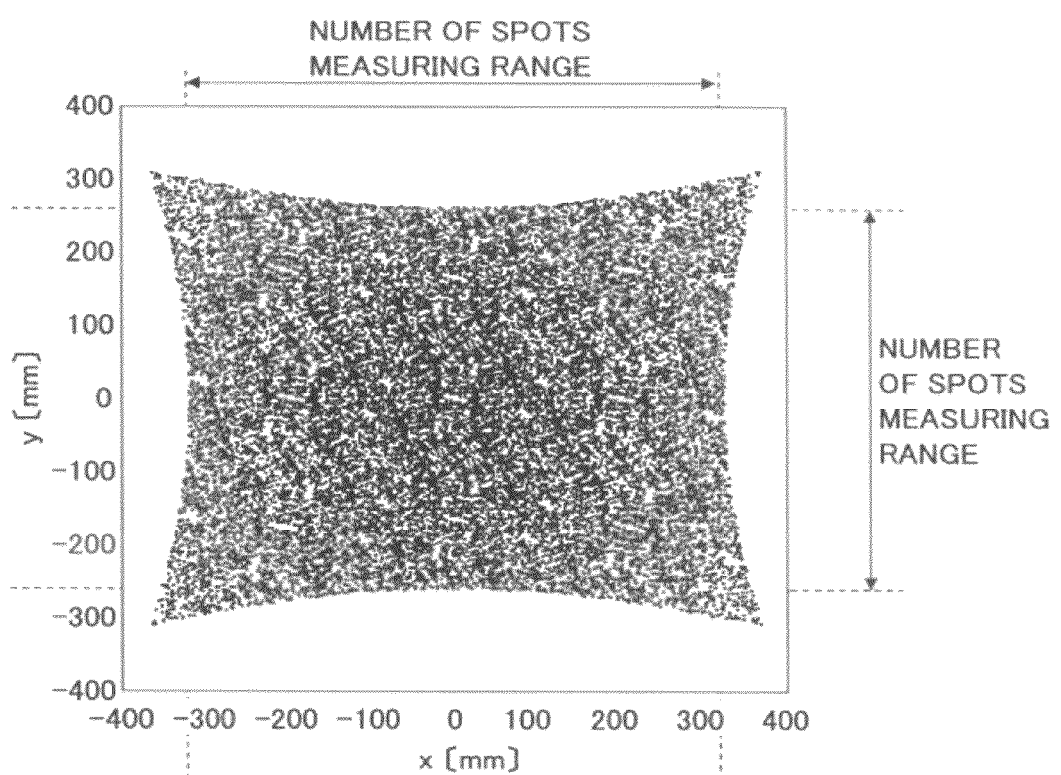
FIG. 24 is a diagram illustrating light spots formed by the diffractive optical element of the first and fourth example embodiments.

FIG. 23(a) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 23(b) illustrates a light spot distribution of the diffracted light that is generated by design on the screen that is located at a position 554.3 mm from the diffraction part when the light is input perpendicularly to this diffraction part. FIG. 24 illustrates a light spot distribution of the diffracted light that is generated by design on the screen that is located at a position 554.3 mm from the diffractive optical element of this embodiment, amongst the lights transmitted through the first diffractive optical part 110 and the second diffractive optical part 120, that is, the two diffractive optical parts forming the diffractive optical element.

The light beam is emitted in a diffraction angle range 12.5° by the first diffractive optical part 110, and as illustrated in FIG. 19, a luminous energy fluctuation of 3.9% occurs in the second diffractive optical part 120 with respect to the light beam having an incident angle 12.5°, and this combined with a luminous energy fluctuation of 5.2% occurring in the first diffractive optical part 110, a maximum luminous energy fluctuation of 6.5% occurs in the diffractive optical element as a whole. In addition, a ratio of the number of spots in the peripheral region and the number of spots in the center region on the screen becomes 0.538.

(Embodiment 2)

Figure 25:
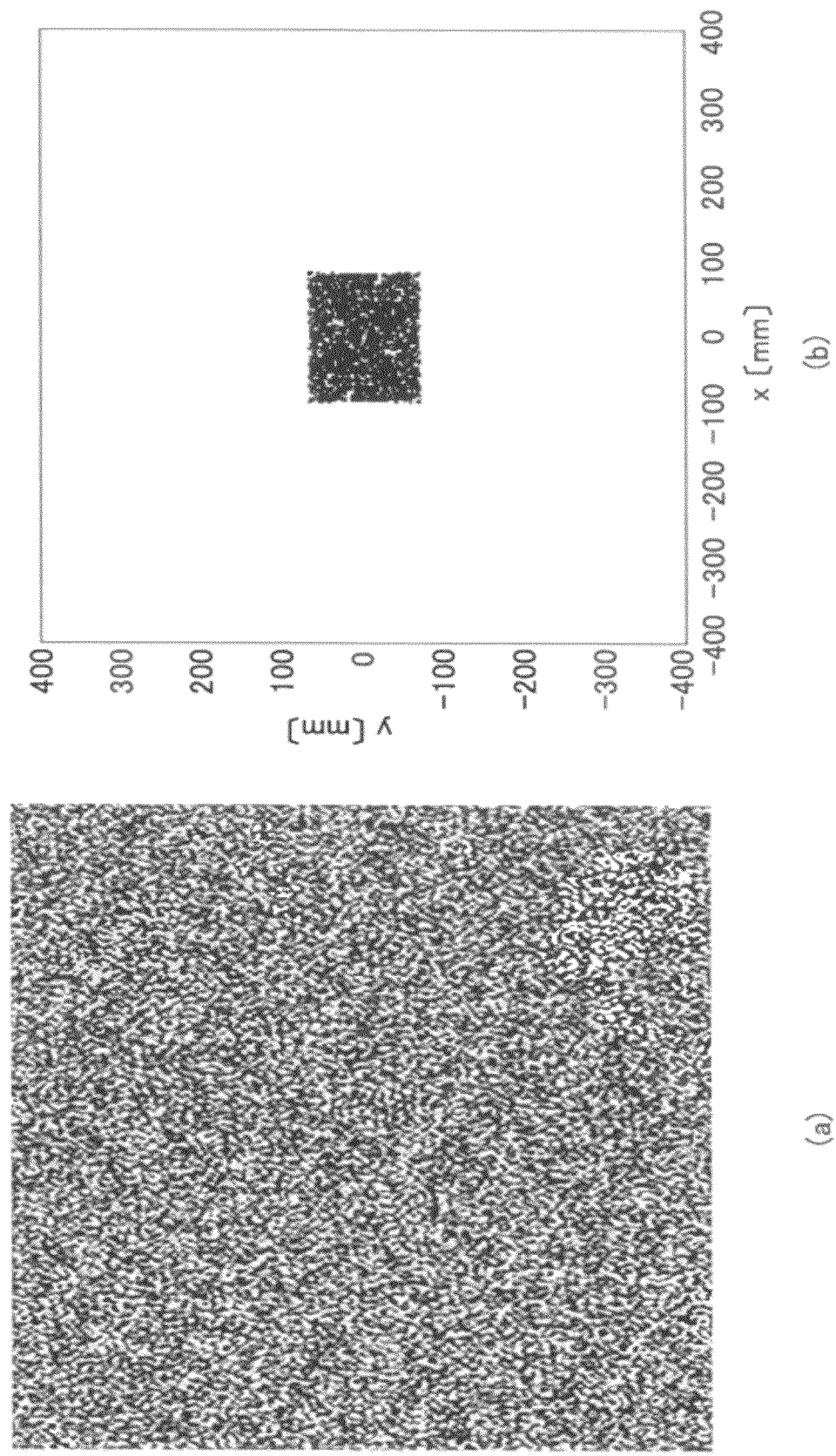
FIG. 25 is a diagram for explaining one of the diffractive optical parts used in second, third, and fifth example embodiments.

The embodiment 2 corresponds to the diffractive optical element of the example 2 illustrated in FIGS. 16 through 18 and 20, and is an example of the case in which the diffraction angle $\theta_1$ of the first diffractive optical part 110 and the diffraction angle $\theta_2$ of the second diffractive optical part 120 satisfy $\theta_1 \leq \theta_2$. FIG. 25(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 25(b) illustrates a light spot distribution of the diffracted light that is generated by design on the screen that is located at a position 342.8 mm from the diffraction part when the light is input perpendicularly to this diffraction part.

Figure 26:
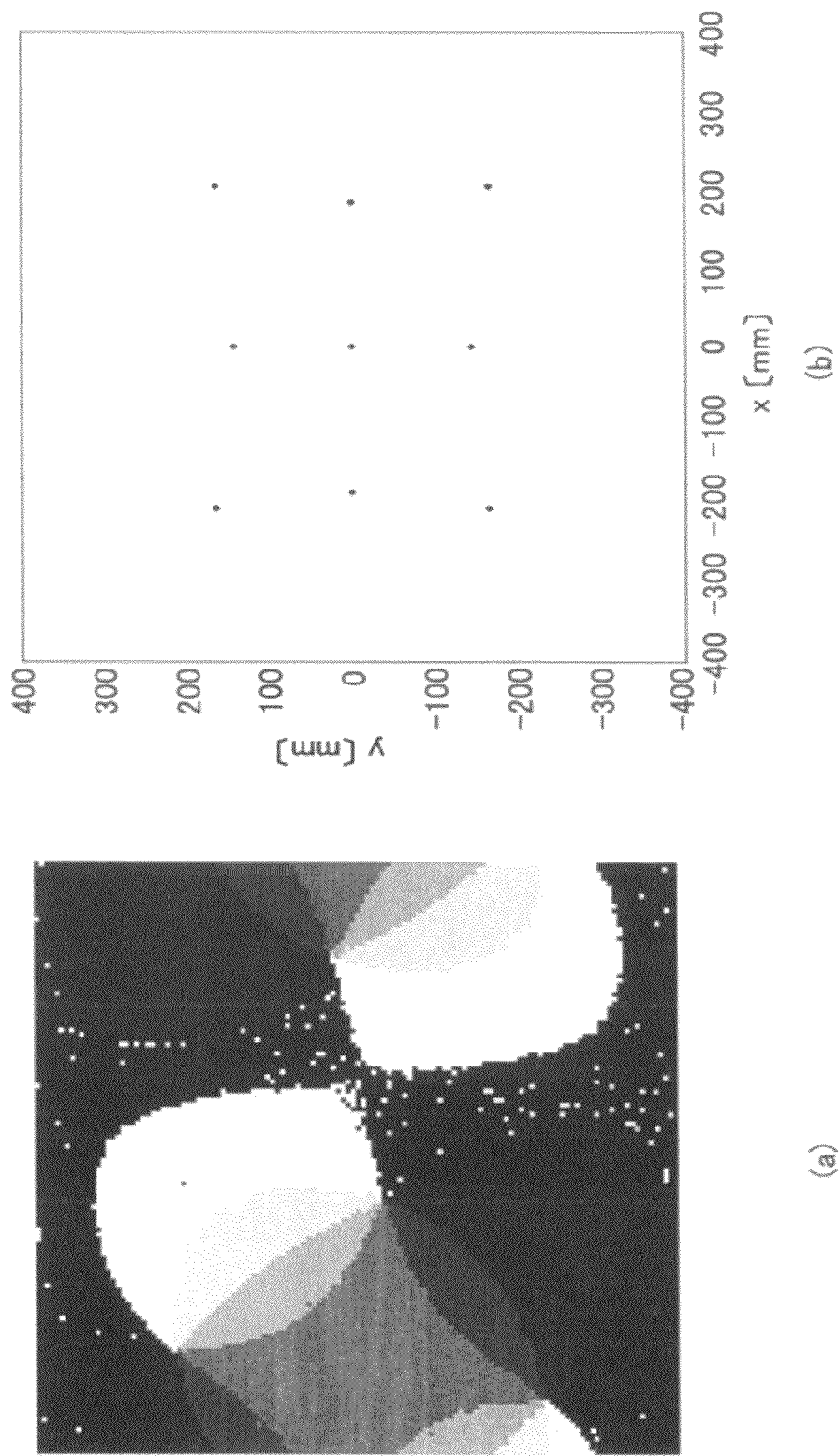
FIG. 26 is a diagram for explaining the other of the diffractive optical parts used in the second, third, and fifth example embodiments.
Figure 27:
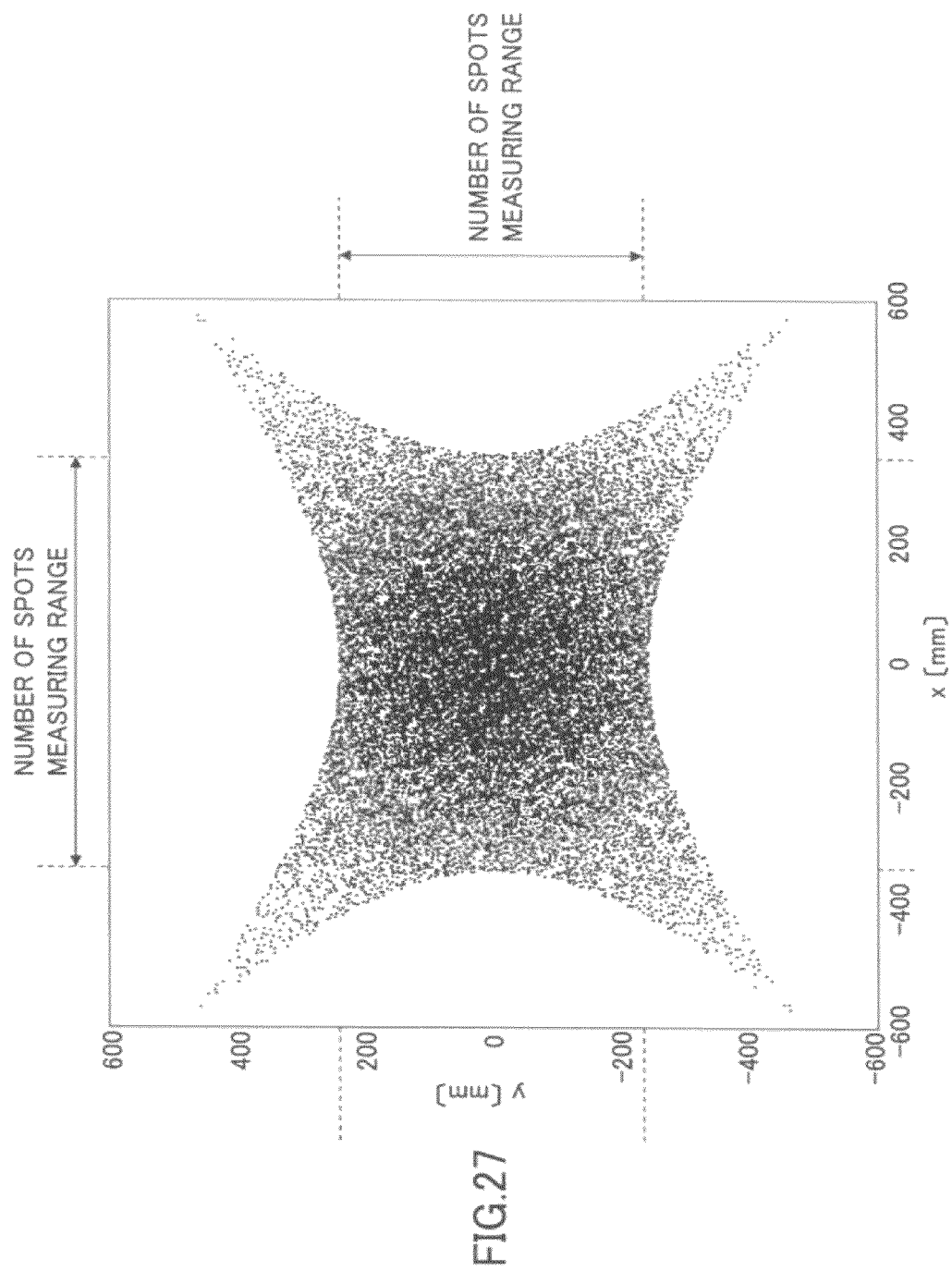
FIG. 27 is a diagram illustrating light spots formed by the diffractive optical element of the second, third, and fifth example embodiments.

FIG. 26(a) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 26(b) illustrates a light spot distribution of the diffracted light that is generated by design on the screen that is located at a position 342.8 mm from the diffraction part when the light is input perpendicularly to this diffraction part. FIG. 27 illustrates a light spot distribution of the diffracted light that is generated by design on the screen that is located at a position 342.8 mm from the diffractive optical element of this embodiment, amongst the lights transmitted through the first diffractive optical part 110 and the second diffractive optical part 120, that is, the two diffractive optical parts forming the diffractive optical element.

The light beam is emitted in a diffraction angle range 17.6° by the first diffractive optical part 110, and as illustrated in FIG. 20, a luminous energy fluctuation of 7.6% occurs in the second diffractive optical part 120 with respect to the light beam having an incident angle 17.6°, and this combined with a luminous energy fluctuation of 5.2% occurring in the first diffractive optical part 110, a maximum luminous energy fluctuation of 9.2% occurs in the diffractive optical element as a whole. In addition, a ratio of the number of spots in the peripheral region and the number of spots in the center region on the screen becomes 0.215.

(Embodiment 3)

The embodiment 3 corresponds to the diffractive optical element of the example 3 illustrated in FIGS. 16 through 18, 20 and 21, and is an example of the case in which the diffraction angle $\theta_1$ of the first diffractive optical part 110 and the diffraction angle $\theta_2$ of the second diffractive optical part 120 satisfy $\theta_1 \leq \theta_2$, and the design incident angle to the second diffractive optical part 120 is 12.5°. FIG. 25(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 25(b)

illustrates a light spot distribution of the diffracted light that is generated by design on the screen that is located at a position 342.8 mm from the diffraction part when the light is input perpendicularly to this diffraction part.

FIG. 26(a) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 26(b) illustrates a light spot distribution of the diffracted light that is generated by design on the screen that is located at a position 342.8 mm from the diffraction part when the light is input perpendicularly to this diffraction part. FIG. 27 illustrates a light spot distribution of the diffracted light that is generated by design on the screen that is located at a position 342.8 mm from the diffractive optical element of this embodiment, amongst the lights transmitted through the first diffractive optical part 110 and the second diffractive optical part 120, that is, the two diffractive optical parts forming the diffractive optical element. The second diffractive optical part 120 is designed so that the luminous energy fluctuation and the zero order diffracted light become a minimum at the incident angle of 12.5°. When a spectrometry is done using the perpendicularly incident light beam, the luminous energy fluctuation and the zero order diffracted light become a minimum when the wavelength is 816 nm.

The light beam is emitted in a diffraction angle range 17.6° by the first diffractive optical part 110, and as illustrated in FIG. 20, a luminous energy fluctuation of 3.9% occurs in the second diffractive optical part 120 with respect to the light beam having an incident angle 17.6°, and this combined with a luminous energy fluctuation of 5.2% occurring in the first diffractive optical part 110, a maximum luminous energy fluctuation of 6.5% occurs in the diffractive optical element as a whole. In addition, a ratio of the number of spots in the peripheral region and the number of spots in the center region on the screen becomes 0.215.

(Embodiment 4)

The embodiment 4 corresponds to the diffractive optical element of the example 4 illustrated in FIGS. 16 through 18 and 21, and is an example of the case in which the diffraction angle $\theta_1$ of the first diffractive optical part 110 and the diffraction angle $\theta_2$ of the second diffractive optical part 120 satisfy $\theta_1 > \theta_2$, and the design incident angle to the second diffractive optical part 120 is 18.5°. FIG. 23(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 23(b) illustrates a light spot distribution of the diffracted light that is generated by design on the screen that is located at a position 554.3 mm from the diffraction part when the light is input perpendicularly to this diffraction part.

FIG. 22(a) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 22(b) illustrates a light spot distribution of the diffracted light that is generated by design on the screen that is located at a position 554.3 mm from the diffraction part when the light is input perpendicularly to this diffraction part. FIG. 24 illustrates a light spot distribution of the diffracted light that is generated by design on the screen that is located at a position 554.3 mm from the diffractive optical element of this embodiment, amongst the lights transmitted through the first diffractive optical part 110 and the second diffractive optical part 120, that is, the two diffractive optical parts forming the diffractive optical element. The second diffractive optical part 120 is designed so that the luminous energy fluctuation and the zero order diffracted light become a minimum at the incident angle of 18.5°. When a spectrometry is done using the perpendicularly incident light beam, the luminous energy fluctuation and the zero order diffracted light become a minimum when the wavelength is 800 nm.

The light beam is emitted in a diffraction angle range 25.9° by the first diffractive optical part 110, and as illustrated in FIG. 19, a luminous energy fluctuation of 6.1% occurs in the second diffractive optical part 120 with respect to the light beam having an incident angle 25.9°, and this combined with a luminous energy fluctuation of 0.4% occurring in the first diffractive optical part 110, a maximum luminous energy fluctuation of 6.1% occurs in the diffractive optical element as a whole. In addition, a ratio of the number of spots in the peripheral region and the number of spots in the center region on the screen becomes 0.538.

(Embodiment 5)

The embodiment 5 corresponds to the diffractive optical element of the example 5 illustrated in FIGS. 16 through 18, 20 and 21, and is an example of the case in which the diffraction angle $\theta_1$ of the first diffractive optical part 110 and the diffraction angle $\theta_2$ of the second diffractive optical part 120 satisfy $\theta_1 > \theta_2$, and the design incident angle to the second diffractive optical part 120 is 27.2°. FIG. 26(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 26(b) illustrates a light spot distribution of the diffracted light that is generated by design on the screen that is located at a position 342.8 mm from the diffraction part when the light is input perpendicularly to this diffraction part.

FIG. 25(a) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 25(b) illustrates a light spot distribution of the diffracted light that is generated by design on the screen that is located at a position 342.8 mm from the diffraction part when the light is input perpendicularly to this diffraction part. FIG. 27 illustrates a light spot distribution of the diffracted light that is generated by design on the screen that is located at a position 342.8 mm from the diffractive optical element of this embodiment, amongst the lights transmitted through the first diffractive optical part 110 and the second diffractive optical part 120, that is, the two diffractive optical parts forming the diffractive optical element. The second diffractive optical part 120 is designed so that the luminous energy fluctuation and the zero order diffracted light become a minimum at the incident angle of 27.2°. When a spectrometry is done using the perpendicularly incident light beam, the luminous energy fluctuation and the zero order diffracted light become a minimum when the wavelength is 765 nm.

The light beam is emitted in a diffraction angle range 37.6° by the first diffractive optical part 110, and as illustrated in FIG. 20, a luminous energy fluctuation of 8.5% occurs in the second diffractive optical part 120 with respect to the light beam having an incident angle 37.6°, and this combined with a luminous energy fluctuation of 0.4% occurring in the first diffractive optical part 110, a maximum luminous energy fluctuation of 8.5% occurs in the diffractive optical element as a whole. In addition, a ratio of the number of spots in the peripheral region and the number of spots in the center region on the screen becomes 0.215.

(Embodiment 6)

Figure 28:
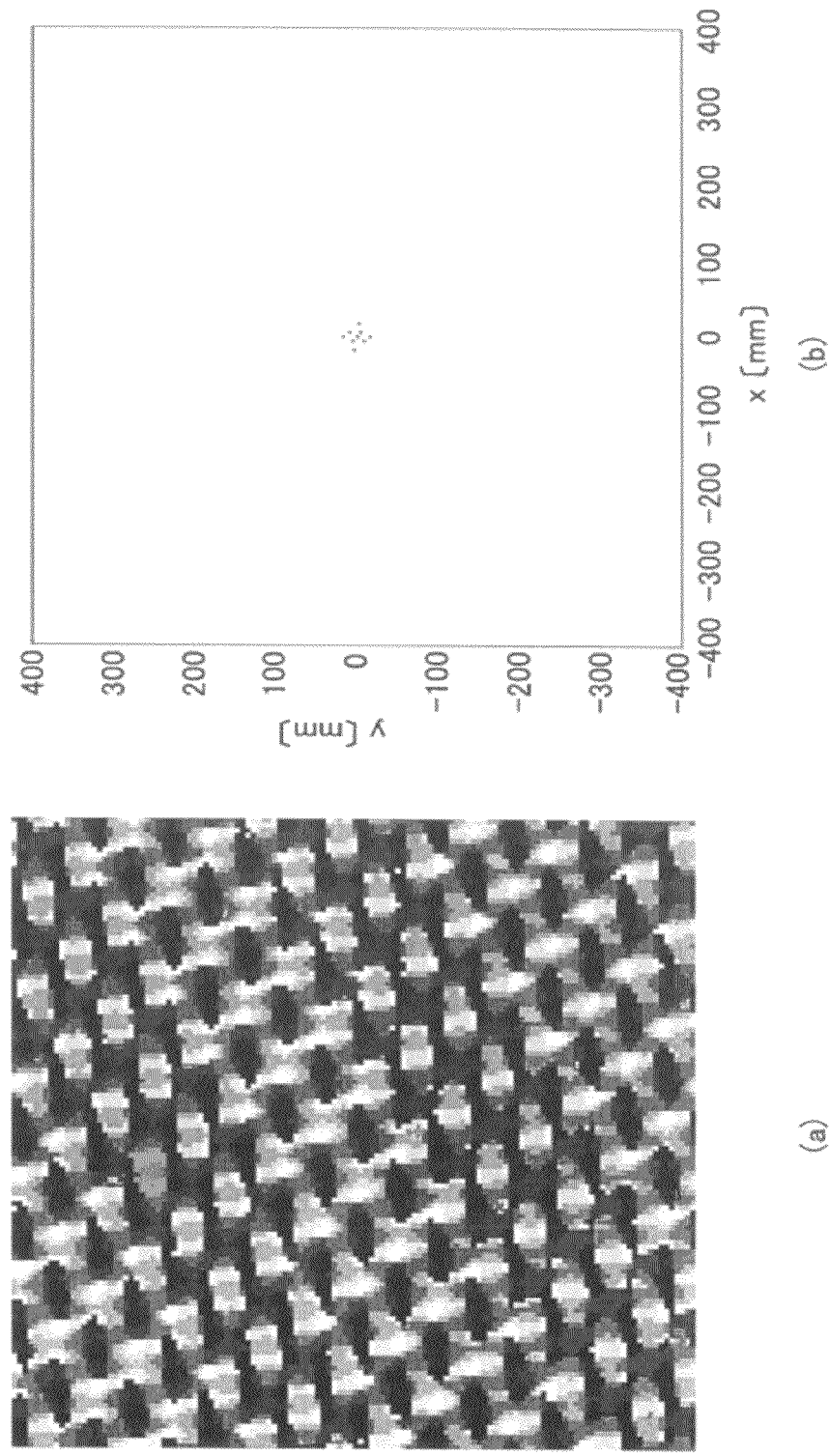
FIG. 28 is a diagram for explaining one of the diffractive optical parts used in a sixth example embodiment.

The embodiment 6 corresponds to the diffractive optical element of the example 6 illustrated in FIGS. 16 through 19, and is an example of the case in which the diffraction angle $\theta_1$ of the first diffractive optical part 110 and the diffraction angle $\theta_2$ of the second diffractive optical part 120 satisfy $\theta_1 \leq \theta_2$, and the number of spots, $n_1$, generated by the first diffractive optical part 110 and the number of spots, $n_2$, generated by the second diffractive optical part 120 satisfy $n_1 \leq n_2$. FIG. 28(*a*) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 28(*b*) illustrates a light spot distribution of the diffracted light that is generated by design on the screen that is located at a position 554.3 mm from the diffraction part when the light is input perpendicularly to this diffraction part.

Figure 29:
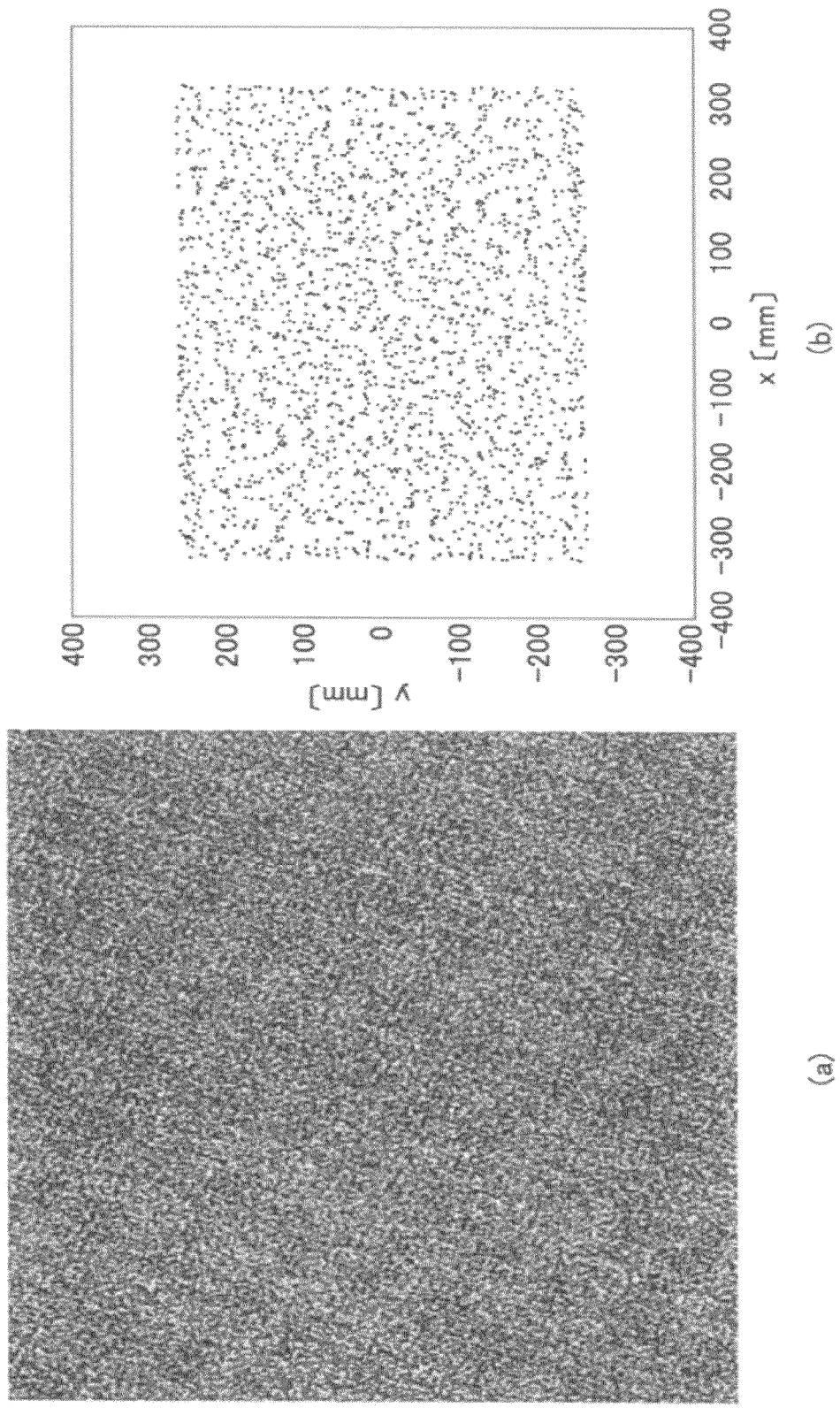
FIG. 29 is a diagram for explaining the other of the diffractive optical parts used in the sixth example embodiment.
Figure 30:
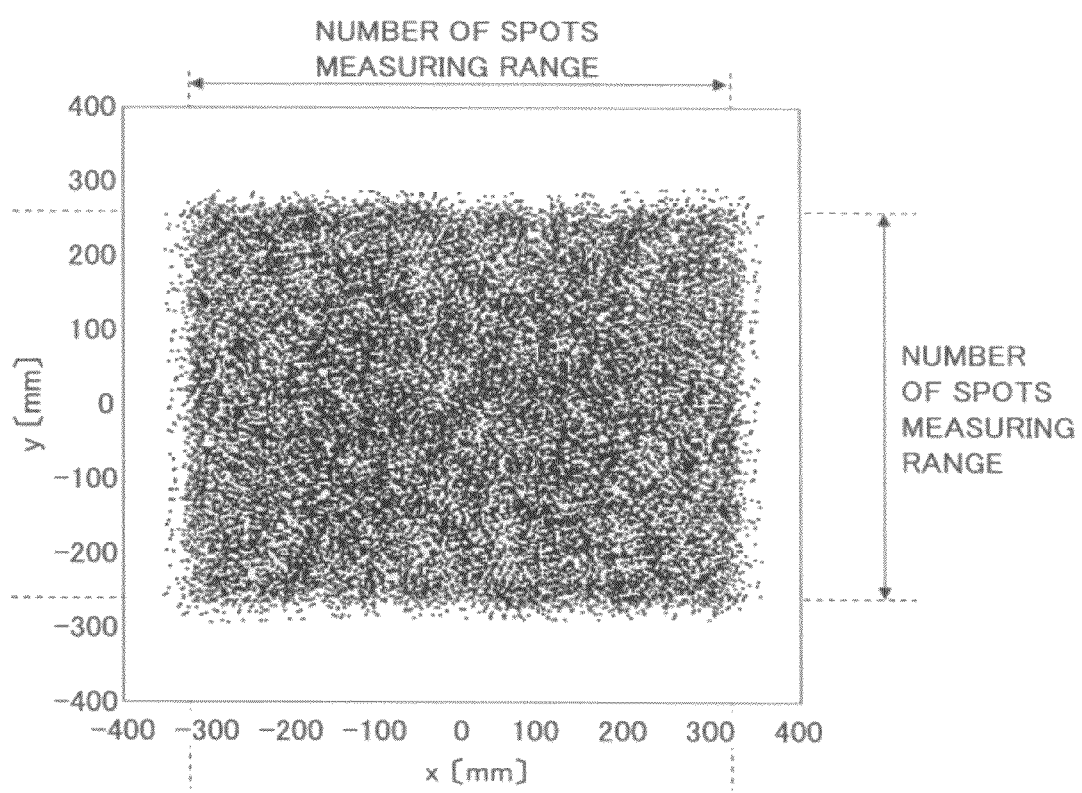
FIG. 30 is a diagram illustrating light spots formed by the diffractive optical element of the sixth example embodiment.

FIG. 29(*a*) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 29(*b*) illustrates a light spot distribution of the diffracted light that is generated by design on the screen that is located at a position 554.3 mm from the diffraction part when the light is input perpendicularly to this diffraction part. FIG. 30 illustrates a light spot distribution of the diffracted light that is generated by design on the screen that is located at a position 554.3 mm from the diffractive optical element of this embodiment, amongst the lights transmitted through the first diffractive optical part 110 and the second diffractive optical part 120, that is, the two diffractive optical parts forming the diffractive optical element.

The light beam is emitted in a diffraction angle range 2.6° by the first diffractive optical part 110, and as illustrated in FIG. 19, a luminous energy fluctuation of 3.0% occurs in the second diffractive optical part 120 with respect to the light beam having an incident angle 2.6°, and this combined with a luminous energy fluctuation of 0.5% occurring in the first diffractive optical part 110, a maximum luminous energy fluctuation of 3.1% occurs in the diffractive optical element as a whole. In addition, a ratio of the number of spots in the peripheral region and the number of spots in the center region on the screen becomes 0.768.

(Embodiment 7)

Figure 31:
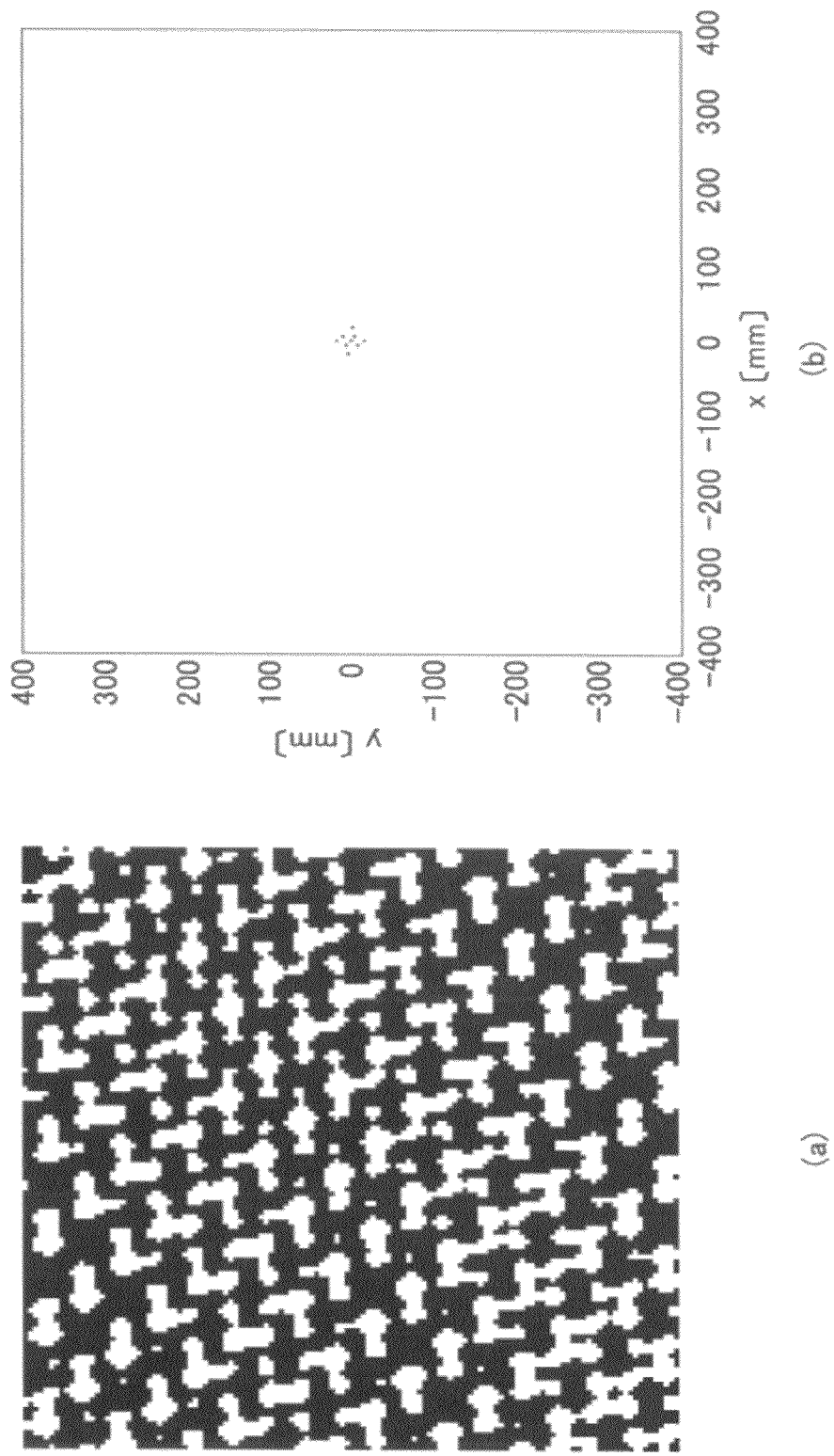
FIG. 31 is a diagram for explaining one of the diffractive optical parts used in a seventh example embodiment.

The embodiment 7 corresponds to the diffractive optical element of the example 7 illustrated in FIGS. 16 through 19, and is an example of the case in which the diffraction angle $\theta_1$ of the first diffractive optical part 110 and the diffraction angle $\theta_2$ of the second diffractive optical part 120 satisfy $\theta_1 \leq \theta_2$, the number of spots, $n_1$, generated by the first diffractive optical part 110 and the number of spots, $n_2$, generated by the second diffractive optical part 120 satisfy $n_1 \leq n_2$, and each of the first diffractive optical part 110 and the second diffractive optical part 120 includes diffraction parts with 2 steps. The projection patterns emitted from the first diffractive optical part 110 and the second diffractive optical part 120 are in point symmetry about the zero order diffracted light. FIG. 31(*a*) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 31(*b*) illustrates a light spot distribution of the diffracted light that is generated by design on the screen that is located at a position 554.3 mm from the diffraction part when the light is input perpendicularly to this diffraction part.

Figure 32:
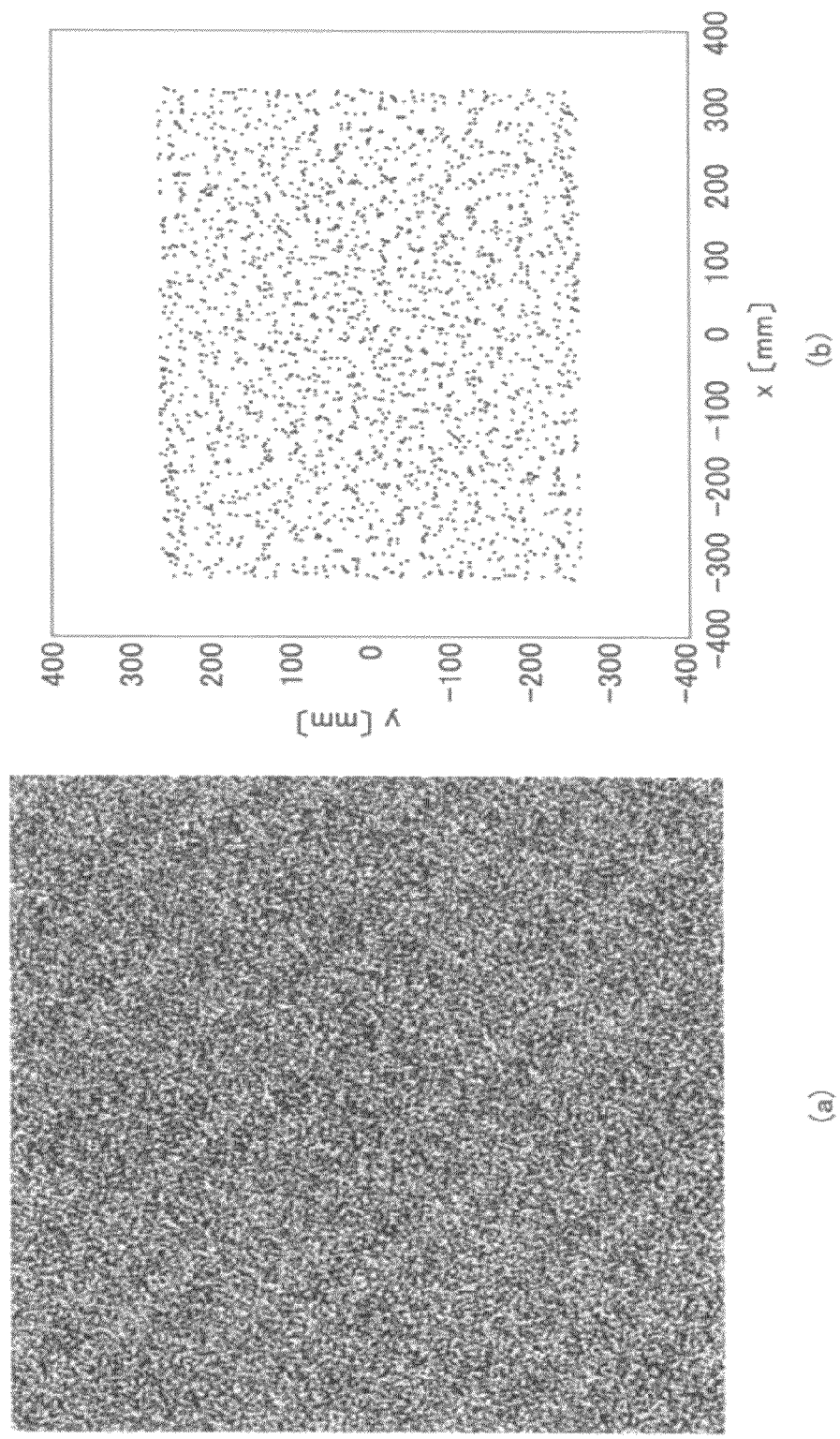
FIG. 32 is a diagram for explaining the other of the diffractive optical parts used in the seventh example embodiment.
Figure 33:
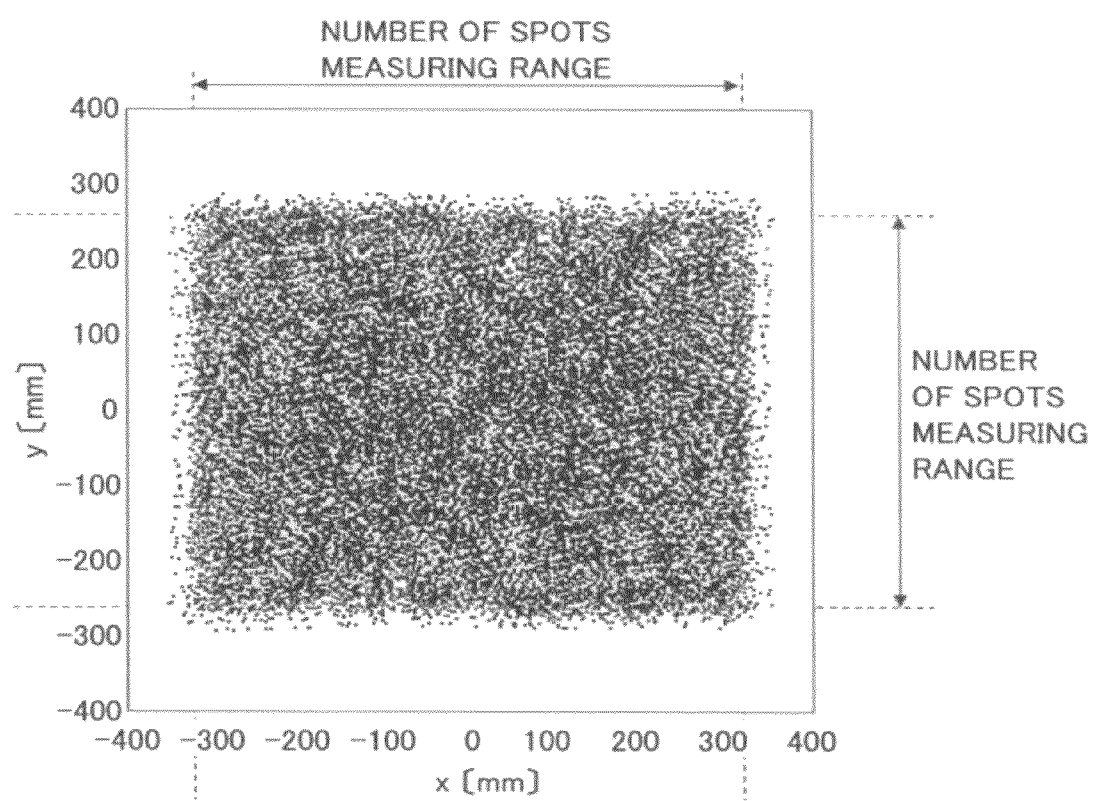
FIG. 33 is a diagram illustrating light spots formed by the diffractive optical element of the seventh example embodiment.

FIG. 32(*a*) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 32(*b*) illustrates a light spot distribution of the diffracted light that is generated by design on the screen that is located at a position 554.3 mm from the diffraction part when the light is input perpendicularly to this diffraction part. FIG. 33 illustrates a light spot distribution of the diffracted light that is generated by design on the screen that is located at a position 554.3 mm from the diffractive optical element of this embodiment, amongst the lights transmitted through the first diffractive optical part 110 and the second diffractive optical part 120, that is, the two diffractive optical parts forming the diffractive optical element.

The light beam is emitted in a diffraction angle range 2.6° by the first diffractive optical part 110, and as illustrated in FIG. 19, a luminous energy fluctuation of 5.8% occurs in the second diffractive optical part 120 with respect to the light beam having an incident angle 2.6°, and this combined with a luminous energy fluctuation of 0.5% occurring in the first diffractive optical part 110, a maximum luminous energy fluctuation of 5.8% occurs in the diffractive optical element as a whole. In addition, a ratio of the number of spots in the peripheral region and the number of spots in the center region on the screen becomes 0.768.

(Embodiment 8)

Figure 34:
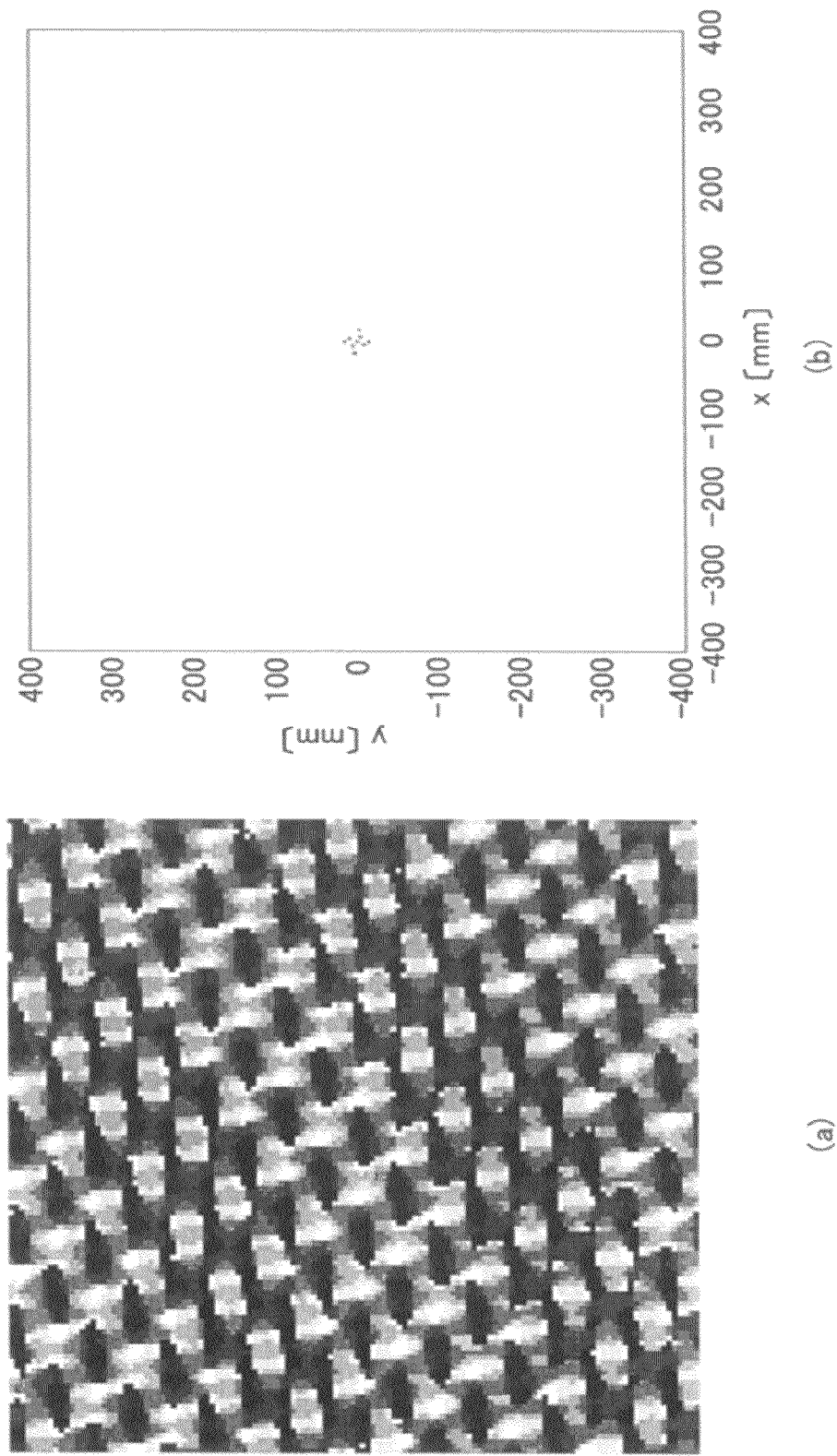
FIG. 34 is a diagram for explaining one of the diffractive optical parts used in an eighth example embodiment.

The embodiment 8 corresponds to the diffractive optical element of the example 8 illustrated in FIGS. 16 through 18 and 20, and is an example of the case in which the diffraction angle $\theta_1$ of the first diffractive optical part 110 and the diffraction angle $\theta_2$ of the second diffractive optical part 120 satisfy $\theta_1 \leq \theta_2$, the number of spots, $n_1$, generated by the first diffractive optical part 110 and the number of spots, $n_2$, generated by the second diffractive optical part 120 satisfy $n_1 \leq n_2$. FIG. 34(*a*) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 34(*b*) illustrates a light spot distribution of the diffracted light that is generated by design on the screen that is located at a position 342.8 mm from the diffraction part when the light is input perpendicularly to this diffraction part.

Figure 35:
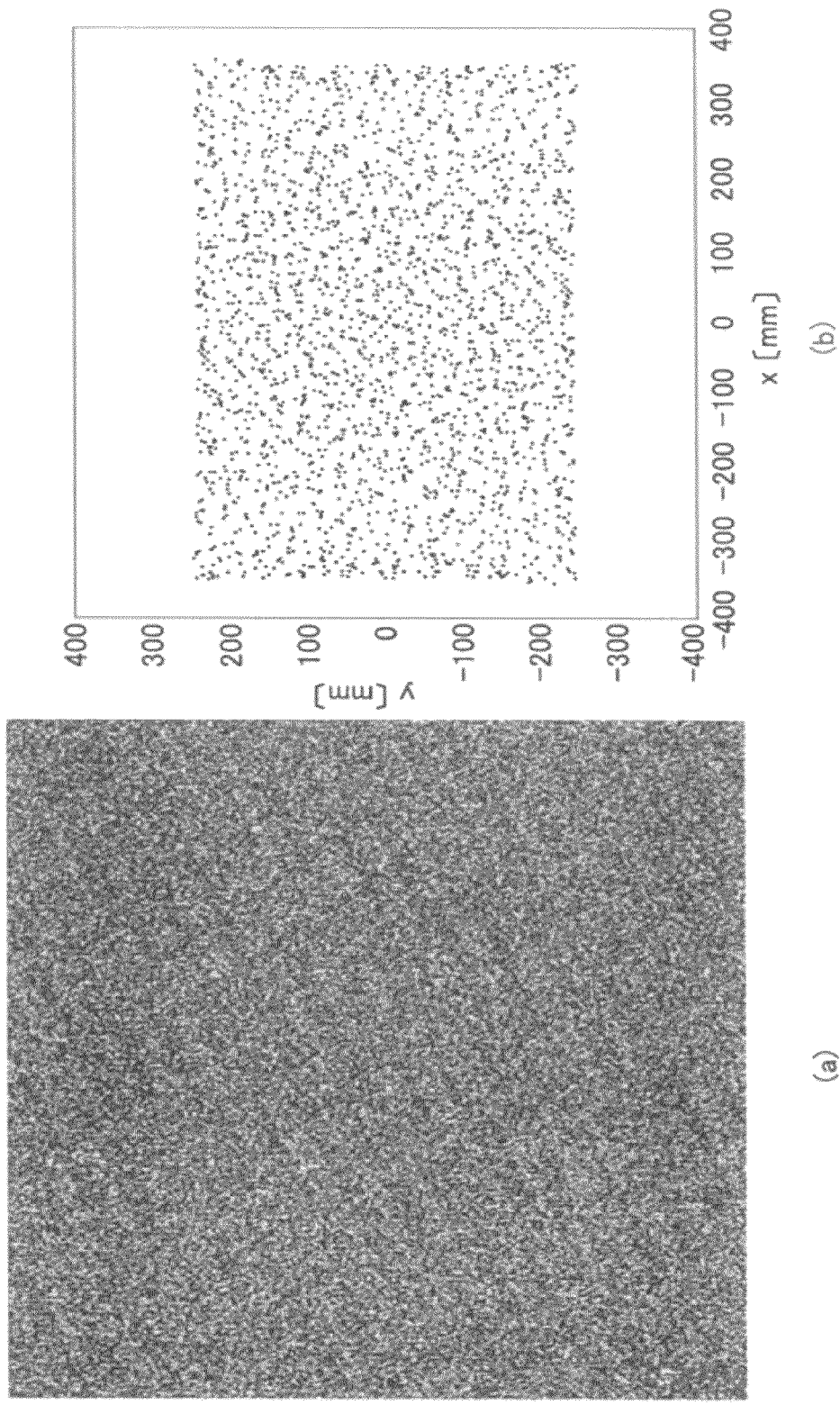
FIG. 35 is a diagram for explaining the other of the diffractive optical parts used in the eighth example embodiment.
Figure 36:
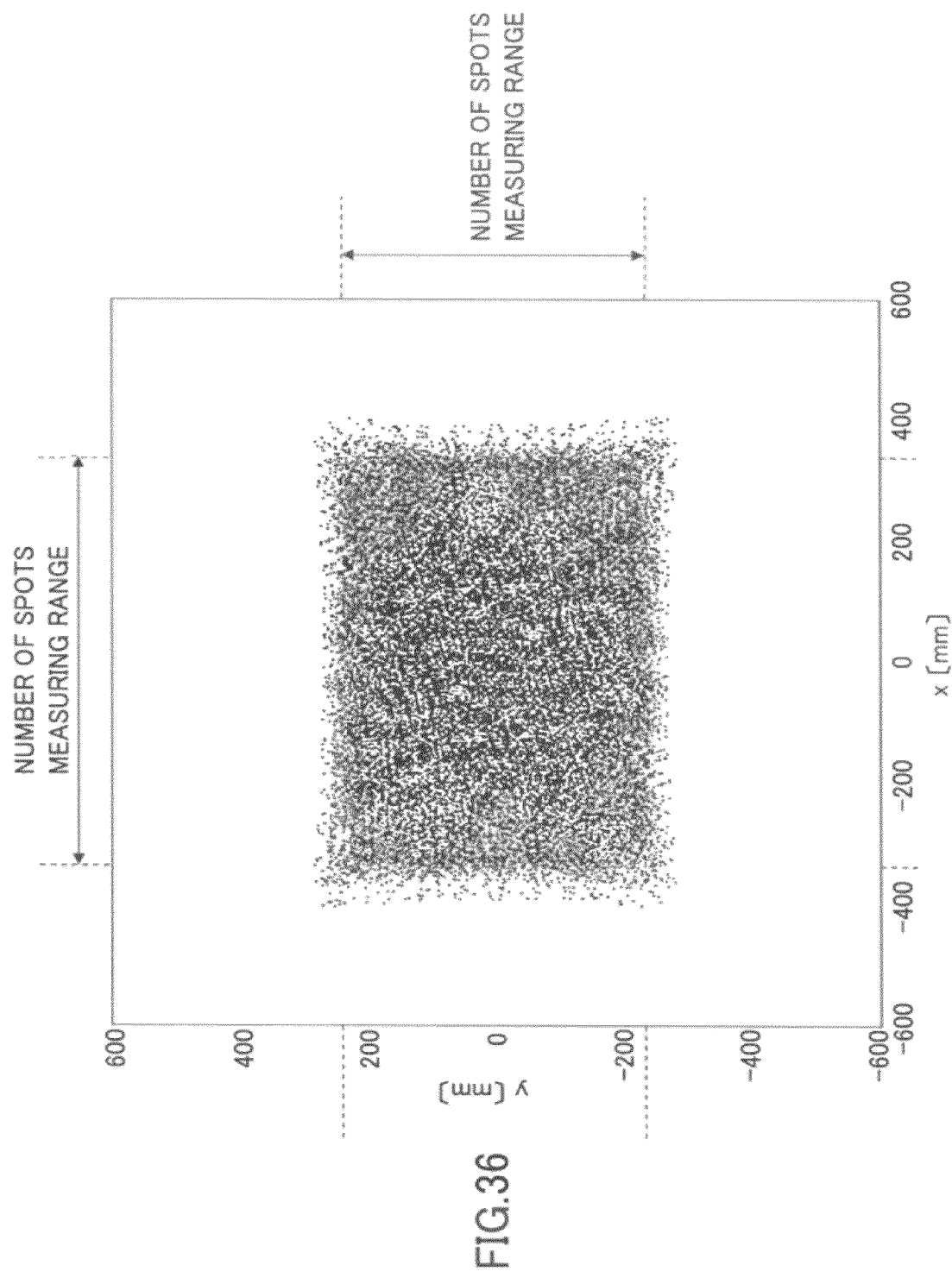
FIG. 36 is a diagram illustrating light spots formed by the diffractive optical element of the eighth example embodiment.

FIG. 35(*a*) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 35(*b*) illustrates a light spot distribution of the diffracted light that is generated by design on the screen that is located at a position 554.3 mm from the diffraction part when the light is input perpendicularly to this diffraction part. FIG. 36 illustrates a light spot distribution of the diffracted light that is generated by design on the screen that is located at a position 342.8 mm from the diffractive optical element of this embodiment, amongst the lights transmitted through the first diffractive optical part 110 and the second diffractive optical part 120, that is, the two diffractive optical parts forming the diffractive optical element.

The light beam is emitted in a diffraction angle range 3.5° by the first diffractive optical part 110, and as illustrated in FIG. 20, a luminous energy fluctuation of 2.5% occurs in the second diffractive optical part 120 with respect to the light beam having an incident angle 3.5°, and this combined with a luminous energy fluctuation of 0.5% occurring in the first diffractive optical part 110, a maximum luminous energy fluctuation of 2.5% occurs in the diffractive optical element as a whole. In addition, a ratio of the number of spots in the peripheral region and the number of spots in the center region on the screen becomes 0.581.

COMPARISON EXAMPLE 1

The comparison example 1 corresponds to the diffractive optical element of the example 9 illustrated in FIGS. 16 through 19, and is an example of the case in which the diffraction angle $\theta_1$ of the first diffractive optical part 110 and the diffraction angle $\theta_2$ of the second diffractive optical part 120 satisfy $\theta_1 > \theta_2$. FIG. 23(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 23(b) illustrates a light spot distribution of the diffracted light that is generated by design on the screen that is located at a position 554.3 mm from the diffraction part when the light is input perpendicularly to this diffraction part.

FIG. 22(a) illustrates a basic unit of the second diffractive optical part 120. Such a basic unit is subjected to a process, such as photolithography and etching, to have the pitches $P_x$ and $P_y$, the number of steps, and the height of each step illustrated in FIG. 17. FIG. 22(b) illustrates a light spot distribution of the diffracted light that is generated by design on the screen that is located at a position 554.3 mm from the diffraction part when the light is input perpendicularly to this diffraction part. FIG. 24 illustrates a light spot distribution of the diffracted light that is generated by design on the screen that is located at a position 554.3 mm from the diffractive optical element of this embodiment, amongst the lights transmitted through the diffractive optical element of this comparison example.

The light beam is emitted in a diffraction angle range 25.9° by the first diffractive optical part 110, and as illustrated in FIG. 19, a luminous energy fluctuation of 8.3% occurs in the second diffractive optical part 120 with respect to the light beam having an incident angle 25.9°, and this combined with a luminous energy fluctuation of 0.4% occurring in the first diffractive optical part 110, a maximum luminous energy fluctuation of 8.3% occurs in the diffractive optical element as a whole. In addition, a ratio of the number of spots in the peripheral region and the number of spots in the center region on the screen becomes 0.538.

COMPARISON EXAMPLE 2

The comparison example 2 corresponds to the diffractive optical element of the example 10 illustrated in FIGS. 16 through 18 and 20, and is an example of the case in which the diffraction angle $\theta_1$ of the first diffractive optical part 110 and the diffraction angle $\theta_2$ of the second diffractive optical part 120 satisfy $\theta_1 > \theta_2$. FIG. 26(a) illustrates a basic unit of the first diffractive optical part 110. Such a basic unit is subjected to a process, such as photolithography and etching, to have the pitches $P_x$ and $P_y$, the number of steps, and the height of each step illustrated in FIG. 16. FIG. 26(b) illustrates a light spot distribution of the diffracted light that is generated by design on the screen that is located at a position 342.8 mm from the diffraction part when the light is input perpendicularly to this diffraction part.

FIG. 25(a) illustrates a basic unit of the second diffractive optical part. Such a basic unit is subjected to a process, such as photolithography and etching, to have the pitches $P_x$ and $P_y$, the number of steps, and the height of each step illustrated in FIG. 17. FIG. 25(b) illustrates a light spot distribution of the diffracted light that is generated by design on the screen that is located at a position 342.8 mm from the diffraction part when the light is input perpendicularly to this diffraction part. FIG. 27 illustrates a light spot distribution of the diffracted light that is generated by design on the screen that is located at a position 342.8 mm from the diffractive optical element of this embodiment, amongst the lights transmitted through the diffractive optical element of this comparison example.

The light beam is emitted in a diffraction angle range 37.6° by the first diffractive optical part 110, and as illustrated in FIG. 20, a luminous energy fluctuation of 14.9% occurs in the second diffractive optical part 120 with respect to the light beam having an incident angle 37.6°, and this combined with a luminous energy fluctuation of 0.4% occurring in the first diffractive optical part 110, a maximum luminous energy fluctuation of 14.9% occurs in the diffractive optical element as a whole. In addition, a ratio of the number of spots in the peripheral region and the number of spots in the center region on the screen becomes 0.215.

(Embodiment 9)

The diffractive optical elements of the embodiments 1 through 8 are used for the measuring apparatus. As a result, the luminous energy fluctuation may be reduced, and a high-precision measurement may be made. In addition, the luminous energy of the zero order diffracted light generated by the second diffractive optical part 120 may be suppressed, in order to suppress deterioration of the image caused by strong diffracted light.

Therefore, a value (maximum/minimum) of a value [(average number of spots in the peripheral portion)/(number of spots in the central portion)] for the diffractive optical elements of the embodiments 6 through 8 may be made larger than the value (maximum/minimum) of the value [(average number of spots in the peripheral portion)/(number of spots in the central portion)] for the diffractive optical elements of the comparison examples 1 and 2, and the light spot distribution may be more uniformly distributed throughout the entire projection region. In addition, compared to the diffractive optical elements of the comparison examples 1 and 2, the diffractive optical elements of the embodiments 7 through 8 may suppress the generation of the pincushion distortion.

(Third Embodiment)

Next, a description will be given of a third embodiment. This embodiment provides a diffractive optical element capable of forming light spots having a density that is approximately the same as that of a region in which the diffraction angle of the diffracted light is small, even in a region in which the diffraction angle of the diffracted light is large, when the diffracted light is projected on a plane or flat surface.

(Measuring Apparatus)

Figure 37:
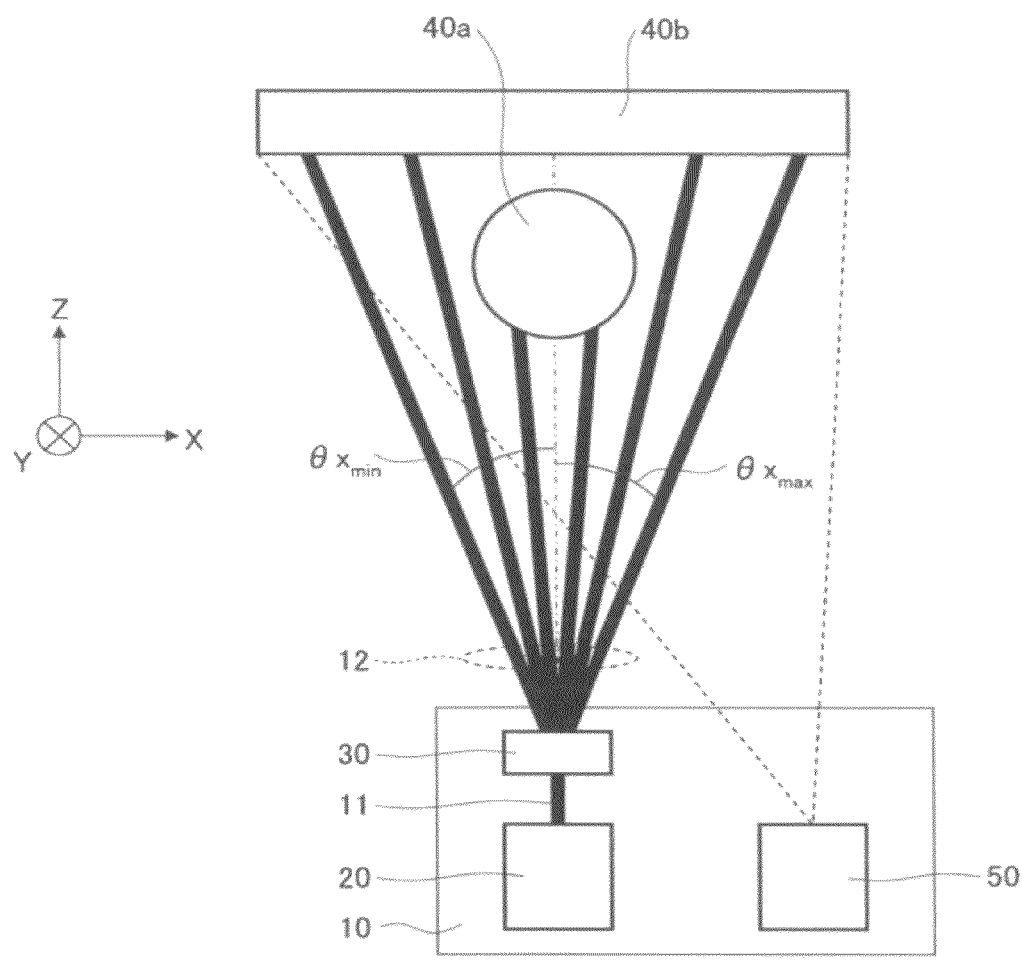
FIG. 37 is a structural diagram illustrating an example of the measuring apparatus in a third embodiment.

A description will be given of the measuring apparatus in this embodiment, based on FIG. 37. FIG. 37 illustrates an example of the structure of the measuring apparatus in this embodiment. The measuring apparatus 10 in this embodiment includes a light source 20, a diffractive optical element 30, and an image sensor 50. The diffractive optical element 30 generates diffracted lights 12 when a light beam (incident light) 11 from the light source 20 is input to the diffractive optical element 30. The image sensor 50 picks up an image of measuring target 40a and 40b irradiated with a projection pattern of light spots formed by the diffracted lights 12.

The diffractive optical element 30 generates a plurality of diffracted lights 12, and a desired projection pattern is formed by the light spots formed by the plurality of diffracted lights 12. Hence, when this projection pattern is irradiated on the measuring targets 40*a* and 40*b* and the image of the measuring targets 40*a* and 40*b* in the state irradiated with the projection pattern is picked up by the image sensor 50, information related to a three-dimensional shape and the like of the measuring targets 40*a* and 40*b* may be acquired. In order to perform the three-dimensional measurement, the number of light spots is preferably 100 or greater. In addition, in the measuring apparatus 10 illustrated in FIG. 37, the pattern of the predetermined light spots may be generated by providing, in place of the diffractive optical element 30, a combination of a pattern generating source, such as a liquid crystal display panel, and a projection lens.

(Diffractive Optical Element)

As described above, in a normal diffractive optical element, when the diffracted light is projected onto a projection surface that is a plane or flat surface, the distribution of the light spots is dense in the region in which the diffraction angle is small, and the distribution of the light spots is coarse in the region in which the diffraction angle is large. In addition, when the luminous energies of the diffracted light having the large diffraction angle and the diffracted light having the small diffraction angle were compared, it was confirmed that the luminous energy of the light having the large diffraction angle is low compared to the luminous energy of the light having the small diffraction angle. For this reason, the distribution of the light spots is dense in the center region where the diffraction angle is small and is approximately 0, and the luminous energy of each of the light spots becomes the predetermined designed luminous energy. On the other hand, the distribution of the light spots is coarse in the peripheral region where the diffraction angle is large, and the luminous energy of each of the light spots becomes lower than the predetermined designed luminous energy. Accordingly, the center region is bright, while the peripheral region is dark and darker than the center region.

Figure 38:
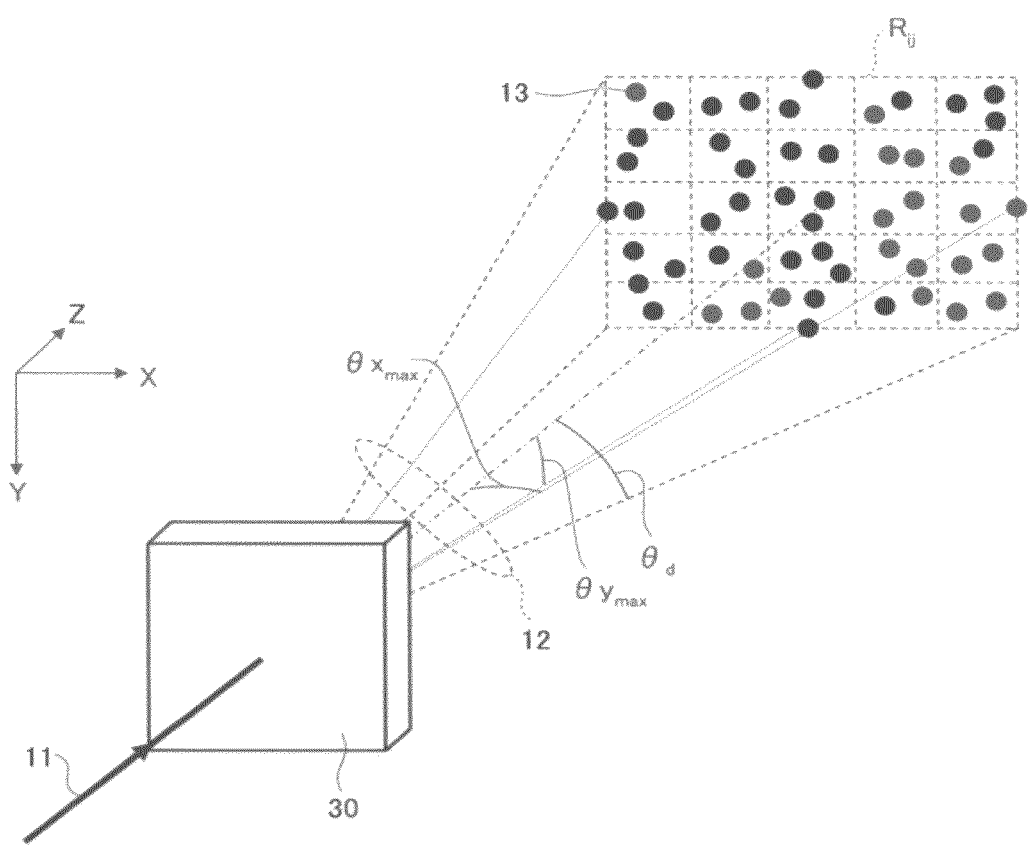
FIG. 38 is a diagram for explaining light spots generated by the diffractive optical element in the third embodiment.

Next, a description will be given of the diffractive optical element 30 in this embodiment. The diffractive optical element 30 formed so that the diffracted lights 12 emitted with respect to the incident light beam 11 have a two-dimensional distribution. When the direction of the optical axis of the light beam 11 incident to the diffractive optical element 30 is denoted by the Z-axis, and axes having an intersection with the Z-axis and perpendicular to the Z-axis are denoted by the X-axis and the Y-axis, respectively, the light beam group is distributed within an angular range from a minimum angle $\theta x_{min}$ to a maximum angle $\theta x_{max}$ on the X-axis and an angular range from a minimum angle $\theta y_{min}$ to a maximum angle $\theta y_{max}$ on the Y-axis (not illustrated in FIG. 37). In this case, the X-axis is approximately parallel to a long side of a light spot pattern, and the Y-axis is approximately parallel to a short side of the light spot pattern. The range in which the diffracted light 12 is irradiated, from the minimum angle $\theta x_{min}$ to the maximum angle $\theta x_{max}$ in the X-axis direction and from the minimum angle $\theta y_{min}$ to the maximum angle $\theta y_{max}$ in the Y-axis direction, approximately matches an imaging range of the image sensor 50. As illustrated in FIG. 38, in the light spot pattern, a straight line parallel to the Y-axis and passing through the light spot having the angle $\theta x_{max}$ in the X-axis direction with respect to the Z-axis becomes the short side described above, and a straight line parallel to the X-axis and passing through the light spot having the angle $\theta y_{max}$ in the Y-axis direction with respect to the Z-axis becomes the long side described above. An angle formed by a straight line connecting an intersection of the short side and the long side and the diffractive optical element and the Z-axis is denoted by $\theta_d$, and this angle $\theta_d$ is referred to as the angle in the diagonal direction.

Normally, the cross section of the diffractive optical element 30 has the concave-convex shape, blazing shape, and the like. In a case in which the cross section of the diffractive optical element has a shape other than the continuous blazing shape or, the cross section of the diffractive optical element has the blazing shape but includes inconsistencies generated at the time of its fabrication, stray light may be generated in addition to the desired diffracted light. However, because such stray light is not intended in the design stage and is not the desired diffracted light, it will be assumed that the stray light is not included in the light distributed within the angular range described above. The diffractive optical element 30 of this embodiment is preferably formed so that the light intensity of the stray light is 70% or less with respect to the average light intensity of the desired diffracted lights. In addition, the diffractive optical element 30 is preferably formed so that a sum of the luminous energies of the desired diffracted lights emitted therefrom is 50% or greater with respect to the incident luminous energy. Hence, it becomes possible to form the projection pattern including the light spots and the like at a high light utilization efficiency.

FIG. 38 is a diagram schematically illustrating a relationship between the diffracted lights 12 diffracted by the diffractive optical element 30 and light spots 13 generated thereby. The diffracted lights 12 are generated by inputting the light beam 11 to the diffractive optical element 30 as the incident light. The diffracted light 12 is the light diffracted by an angle $\theta_x$ in the X-axis direction and by an angle $\theta_y$ in the Y-axis direction, with reference to the Z-axis direction, according to the following diffraction grating formulas (9). In the diffraction grating formulas (9), $m_x$ denotes an order of diffraction in the X-axis direction, $m_y$ denotes an order of diffraction in the Y-axis direction, and $\lambda$ denotes a wavelength of the light beam 11, $P_x$ and $P_y$ denote pitches of basic units of the diffractive optical element which will be described later in the X-axis direction and the Y-axis direction, respectively. When the diffracted light 12 is irradiated on a projection surface such as a screen or a measuring target, the plurality of light spots 13 are generated in the irradiated region. The number of light spots 13 generated on such a projection surface is denoted by M.

$$\sin \theta_x = m_x \lambda / P_x$$

$$\sin \theta_y = m_y \lambda / P_y \qquad (9)$$

The diffraction grating formulas (9) are for a case in which the incident light is input perpendicularly to the diffractive optical element. FIG. 37 illustrates a state in which the incident light 11 is input perpendicularly with respect to the diffractive optical element 30, but when the light source is a laser light source or the like, the incident light 11 may be input to the diffractive optical element 30 in a direction inclined from the direction perpendicular to the diffractive optical element 30, in order to prevent light reflected from the diffractive optical element 30 from being optically fed back to the laser light source or the like. This is because the optical feedback to the laser light source or the like may cause unstable laser oscillation due to effects of interference.

(Distribution of Light Spots)

On the projection surface, a range from the minimum angle $\theta x_{min}$ to the maximum angle $\theta x_{max}$ in the vicinity of the X-axis is equally divided (or segmented) into $N_x$ regions, and a range from the minimum angle $\theta y_{min}$ to the maximum angle $\theta y_{max}$ in the vicinity of the Y-axis is equally divided (or segmented) into $N_y$ regions, and each of the divided regions is denoted by R(i, j), where $N_x$ and $N_y$ are an add number greater than or equal to 3 and less than or equal to $M^{0.5}$, i is an integer from 1 to $N_x$, and $j$ is an integer from 1 to $N_y$. The value of i is set so that the region located close to $\theta x_{min}$ is i=1, and the value increases as the region becomes closer to $\theta x_{max}$. In addition, the value of j is set so that the region located close to $\theta y_{min}$ is j=1, and the value increases as the region becomes closer to $\theta y_{max}$. Because the statistical variability becomes large when the values of $N_x$ and $N_y$ are large, the values of $N_x$ and $N_y$ are preferably 15 or less.

The diffractive optical element is formed so that a number $M_c$ of light spots of the diffracted lights included in the center region R((i+1)/2, (j+1)/2) and an average value $M_o$ of the number of light spots of the diffracted lights included in the peripheral regions R(1, 1), R(1, $N_y$), R($N_x$, 1) and R($N_x$, $N_y$) satisfy the following relationships (10).

$$15° \leq \theta_d < 90° \quad (10)$$
$$M_o/M_c > -0.02173\, \theta_d + 1.314$$

Hence, a difference between the number of light spots of the diffracted lights in the peripheral region and the number of light spots of the diffracted lights in the center region may be made small, and it is possible to obtain light spots that are distributed in an approximately uniform manner. Accordingly, a decrease in the entire luminous energy may be suppressed at the peripheral regions. In addition, the diffractive optical element may also be formed so that the following relationships (11) are satisfied.

$$15° \leq \theta_d < 90° \quad (11)$$
$$0.8 \leq M_o/M_c \leq 1.2$$

In this case, the difference between the number of light spots of the diffracted lights in the peripheral region and the number of light spots of the diffracted lights in the center region may also be made small, and it is also possible to obtain light spots that are distributed in an approximately uniform manner.

The value $M_o/M_c$ is most preferably 1, and the light spots maybe distributed in the approximately uniform manner by setting the value $M_o/M_c$ in a range using the value 1 as the center.

In addition, the diffractive optical element may be formed so that a maximum number Mmax of light spots of the diffracted lights and a minimum number Mmin of light spots of the diffracted lights respectively included in each region R(i, j) satisfy the following relationships (12).

$$15° \leq \theta_d < 90° \quad (12)$$
$$M_{min}/M_{max} > -0.01729\, \theta_d + 1.108$$

Hence, a difference between the number of light spots of the diffracted lights in each of the peripheral regions R(i, j) may be made small, and it is possible to obtain light spots that are distributed in an approximately uniform manner. Accordingly, a decrease in the entire luminous energy may be suppressed at the peripheral regions where the luminous energy easily decreases. In addition, the diffractive optical element may also be formed so that the following relationships (13) are satisfied.

$$30° \leq \theta_d < 90° \quad (13)$$
$$0.6 \leq M_{min}/M_{max} \leq 1.4$$

In this case, the difference between the number of light spots of the diffracted lights in the peripheral region where the luminous energy easily decreases and the number of light spots of the diffracted lights in the center region may also be made small, and it is also possible to obtain light spots that are distributed in an approximately uniform manner. In addition, the diffractive optical element may also be formed so that the following relationships (14) are satisfied.

$$15° \leq \theta_d < 90° \quad (14)$$
$$0.7 \leq M_{min}/M_{max} \leq 1.3$$

In this case, the difference between the number of light spots of the diffracted lights in the peripheral region where the luminous energy easily decreases and the number of light spots of the diffracted lights in the center region may also be made small, and it is also possible to obtain light spots that are distributed in an approximately uniform manner.

The value $M_{min}/M_{max}$ is most preferably 1, and the light spots maybe distributed in the approximately uniform manner by setting the value $M_{min}/M_{max}$ in a range using the value 1 as the center.

The projection plane on which the number of light spots is measured is not limited to the plane perpendicular to the Z-axis, and may be a plane inclined from the perpendicular direction with respect to the Z-axis. In a case in which the light spots are distributed on the projection surface in a shape other than the rectangular shape, such as an oval shape, a similar evaluation may be made by taking into consideration a rectangular region that inscribes the shape other than the rectangular shape. Further, besides taking into consideration the rectangular region that inscribes the shape other than the rectangular shape, it is possible to divide the number of spots by the area of the projection in order to obtain the density of the light spots, and to compare the densities between the center portion and the peripheral portion in order to obtain the light spot distribution in which the number light spots is uniform in the center portion and the peripheral portion.

Moreover, in the apparatus that performs the three-dimensional measurement by acquiring the image of the measuring target, a distortion occurs in the center portion and the peripheral portion when a lens of an imaging device becomes a wide angle lens. More particularly, even in a case of a uniform light spot pattern, the acquired image may be dense in the center portion and coarse in the peripheral portion. In order to solve this problem, the projection surface to which the light spots are projected may be changed from the flat surface to the curved surface that reproduces the denseness and coarseness of the wide angle lens. In other words, the light spots distributed on the curved surface may be projected to a two-dimensional flat surface in order to use this flat surface as the projection surface on which the light spots are measured.

In the diffractive optical element 30 that emits the diffracted lights described above may be formed by a diffractive optical element designed by an iterative Fourier transform method or the like. The diffractive optical element refers to an element in which basic units that generate predetermined phase distributions are arranged periodically, that is, two-dimensionally, for example. In such a diffractive optical element, the distribution of the order of diffraction of the far diffracted light may be obtained by a Fourier transform in the basic units, as has been explained by the scalar diffraction theory. An electromagnetic field is a vector quantity but may be represented by a scalar quantity within an isotropic medium, and a scalar function $u(A, t_m)$ at a time $t_m$ and a point A may be represented by the following formula (15).

$$u(A,t_m)=Re[U(A)\exp(-i\omega t_m)] \quad (15)$$

The formula (15) indicates a case in which the incident light is monochromatic light, where $U(A)$ denotes a complex amplitude and $\omega$ denotes an angular frequency. The scalar function represented by the formula (15) satisfies the following wave equation (16) in all space.

$$\nabla^2 u - \frac{1}{c^2}\frac{\partial^2 u}{\partial t^2} = 0 \quad (16)$$

When the formula (15) is substituted into the wave equation (16), the following Helmholtz equation (17) may be obtained.

$$(\nabla^2+k^2)u=0 \quad (17)$$

In the Helmholtz equation (17), k denotes a wavenumber, and $k=2\pi/\lambda$. By solving the wave equation (16), a scalar function distribution in space may be computed. In addition, when a sufficiently thin flat screen that gives a certain phase distribution is denoted by $\Sigma$, a point on the screen $\Sigma$ is denoted by $A_1$, and the scalar function at the point $A_0$ for a case in which a plane wave is transmitted through the screen $\Sigma$ is computed from the Helmholtz equation (17) using the Kirchhoff's boundary condition, the following formula (18) may be obtained, where $r_{01}$ denotes a distance between the points $A_0$ and $A_1$.

$$u(A_0) \propto \int\int_\Sigma u(A_1)\frac{e^{ikr_{01}}}{r_{01}}dS \quad (18)$$

Furthermore, when a coordinate at the point $A_0$ is denoted by $(x_0, y_0, 0)$, a coordinate at the $A_1$ is denoted by $(x_1, y_1, z)$, and z is a value sufficiently larger than $|x_0-x_1|, |y_0-y_1|$, the Fraunhofer approximation represented by the following formula (19) may be obtained by expanding $r_{01}$.

$$u(x_0,y_0) \propto \iint_\Sigma u(x_1,y_1)e^{-i(k/z)(x_0 x_1+y_0 y_1)}dS \quad (19)$$

The formula (19) corresponds to a Fourier transform of the phase distribution given by the screen. Particularly in a case in which the phase distribution $u(A_1)$ subsequent to the screen has a periodicity of the pitch $P_x$ in the X-axis direction and the pitch $P_y$ in the Y-axis direction, diffracted light having an order (m, n) of diffraction is generated in $u(A0)$ as may be seen from the following formulas (20).

$$\sin\theta x_{out}=\sin\theta x_{in}+m\times\lambda/P_x$$

$$\sin\theta y_{out}=\sin\theta y_{in}+n\times\lambda/P_y \quad (20)$$

In this case, a diffraction efficiency $\eta_{mn}$ of the (m, n) order diffracted light may be represented by the following formula (21), using a phase distribution $u'(x_1, y_1)$ of the periodic basic units, where m and n denote integers, $\theta x_{in}$ and $\theta y_{in}$ respectively denote angles of the incident light in the X-axis direction and the Y-axis direction with respect to the Z-axis, and $\theta x_{out}$ and $\theta y_{out}$ respectively denote angles of emitted (or output) light in the X-axis direction and the Y-axis direction with respect to the Z-axis.

$$\eta_{mn} \propto |\int_0^{P_x}\int_0^{P_y}u'(x_1,y_1)e^{-i(2\pi mx/P_x+2\pi ny/P_y)}dS|^2 \quad (21)$$

Accordingly, when the phase distribution of the basic units is obtained, the intensity distribution of the diffracted light may be computed by a Fourier transform of the phase distribution of the basic units. Thus, a diffractive optical element that generates the diffracted light having the desired distribution may be obtained by optimizing the phase distribution of the basic units.

Next, a description will be given of the structure of the diffractive optical element 30, based on FIG. 39. As illustrated in FIG. 39(a), the diffractive optical element 30 includes basic units 31 that are periodically arranged two-dimensionally at the pitch $P_x$ in the X-axis direction and at the pitch $P_y$ in the Y-axis direction. More particularly, the diffractive optical element 30 has a phase distribution illustrated in FIG. 39(b). FIG. 39(b) illustrates the diffractive optical element 30 having an concave-convex pattern that includes convex parts indicated black regions and concave parts indicated by white (or blank) regions. The diffractive optical element 30 has a structure to generate the phase distribution. Examples of this structure may include a light transmitting member made of a material such as glass and resin with an concave-convex pattern formed on a surface thereof, and a transparent member with an concave-convex pattern and bonded to a member having a refractive index different from that of the transparent member in order to make the surface of the concave-convex pattern flat. A further example of this structure may include a transparent member having a refractive index that is varied. In other words, the concave-convex pattern does not only include the concave-convex in the surface shape, and may include a structure that may provide a phase difference to the incident light. In addition, the number of basic units does not need to be an integer when the basic units 31 are arranged two-dimensionally in the diffractive optical element 30, and a boundary of the concave-convex pattern and a region having no concave-convex pattern may not match a boundary of the basic units as long as one or more basic units are included within the concave-convex pattern.

Figure 40:
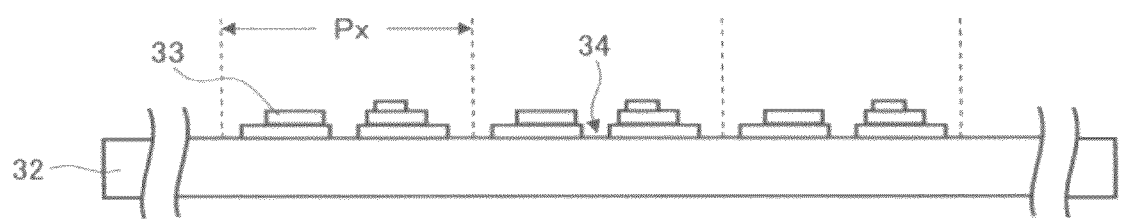
FIG. 40 is a structural diagram illustrating an example of the diffractive optical element in the third embodiment.

As one example of the diffractive optical element 30, FIG. 40 schematically illustrates a cross section of the diffractive optical element 30 having a structure in which the concave-convex pattern is formed by forming convex parts 33 on a surface of a transparent substrate 32 made of glass or the like. In this diffractive optical element 30, concave parts 34 are formed by regions where no convex part 33 is formed on the surface of the transparent substrate 32.

The transparent substrate 32 needs to be transparent with respect to the incident light, and substrates made of various kinds of materials, including a glass substrate, a resin substrate, a resin film, and the like, may be used as the transparent substrate 32. Optically isotropic materials, including glass, quartz, and the like, are preferably used for the transparent substrate 32 because such materials do not cause birefringence effects on the transmitted light. In addition, the transparent substrate 32 may include a reflection preventing layer having a multi-layer structure formed at an interface between the transparent substrate 32 and surrounding air, in order to reduce reflection of light due to Fresnel reflection. Further, although the concave-convex pattern is formed on one side of the transparent substrate 32 in FIG. 40, the concave-convex pattern may of course be formed on both sides of the transparent substrate 32.

The diffractive optical element 30 described above may be fabricated by a technique using the iterative Fourier transform method or the like. In other words, because the phase distribution of the basic units 31 of the diffractive optical element and the field distribution of the diffracted light are in a Fourier transform relationship, the phase distribution of the basic units 31 may be obtained by an inverse Fourier transform of the field distribution of the diffracted light.

When fabricating the diffractive optical element 30, the limited condition (or constraints) include only the intensity distribution of the diffracted light, and not the phase condition. Hence, the phase distribution of the basic units 31 may be arbitrary. According to the iterative Fourier transform method, the information of the phase distribution of the basic units is extracted by the inverse Fourier transform of the light intensity distribution of the diffracted light, and the phase distribution that is obtained may be used as the phase distribution of the basic units to further perform a Fourier transform. Hence, a difference between a result of the Fourier transform and the light intensity distribution of predetermined diffracted light becomes an evaluation value, and the computation described above may be repeated, in order to obtain, as an optimum design, the phase distribution of the diffractive optical element that minimizes the evaluation value.

Various design algorithms of the diffractive optical element other than the above have been proposed, including the algorithm described in Bernard Kress and Patrick Meyruelis, "Digital Diffraction Optics", Maruzen, published March 2005, for example. In addition, the Fourier transform method may use a Fast Fourier Transform (FFT) algorithm or the like.

The distribution of the light spots formed by the diffractive optical element of this embodiment is based on the relationships (10) through (14) described above. Next, a description will be given of a method of fabricating the diffractive optical element that generates such a light spot distribution.

First, a coordinate group of the light spot distribution is created in which the light spots are distributed to satisfy one of the relationships (10) through (14) on the projection surface located a distance z from the diffractive optical element. The light spot distribution may be a random distribution, a dispersed distribution controlled of its interval (or spacing) of the light spots, or a regular distribution having a regular arrangement. In the light spot distribution, a coordinate of a qth light spot is denoted by $(x_q, y_q)$. Because the diffraction angle of the diffracted light is $(\theta_x, \theta_y)$, the wavenumber vector k of the diffracted light in a traveling direction may be represented by the following formula (22).

$$k = \frac{2\pi}{\lambda}\begin{pmatrix} \sin\theta_x \\ \sin\theta_y \\ \sqrt{1-\sin^2\theta_x - \sin^2\theta_y} \end{pmatrix} \quad (22)$$

From the formula (22), it may be seen that the wavenumber vector k multiplied by a non-zero constant should be $(x_q, y_q, z)$ in order to generate the diffracted light at the coordinate $(x_q, y_q, z)$. In other words, this may be represented by the following formula (23).

$$\begin{pmatrix} x_q \\ y_q \\ z \end{pmatrix} = \beta\begin{pmatrix} \sin\theta_x \\ \sin\theta_y \\ \sqrt{1-\sin^2\theta_x - \sin^2\theta_y} \end{pmatrix} \quad (23)$$

From the formula (23), $\beta = z/(1-\sin^2\theta_x - \sin^2\theta_y)^{0.5}$ and $\sin\theta_y = y_q \sin\theta_x/x_q$, and the following formulas (24) may be obtained therefrom.

$$\sin\theta_x = x_q/\sqrt{x_q^2+y_q^2+z^2}$$

$$\sin\theta_y = y_q/\sqrt{x_q^2+y_q^2+z^2} \quad (24)$$

Accordingly, the following formulas (25) may be obtained by using the formulas (1). In the formulas (25), the values of the left terms are integers, but the right terms in general do not become integers. For this reason, an integer closest to the value of the right term is denoted by $(m_{qx}, m_{qy})$, and is made to correspond to the order of diffraction of the diffractive optical element that generates the diffracted light at the coordinate $(x_q, y_q, z)$.

$$m_x = x_q P_x/(\lambda\sqrt{x_q^2+y_q^2+z^2})$$

$$m_y = y_q P_y/(\lambda\sqrt{x_q^2+y_q^2+z^2}) \quad (25)$$

By performing the above described computation for M points, a combination $(m_{qx}, m_{qy})$ (q=1, ..., M) of the order of diffraction corresponding to the coordinate group $(x_q, y_q)$ (q=1, ..., M) of each spot in the spot distribution may be obtained.

Therefore, the diffractive optical element of this embodiment that generates the predetermined distribution of the light spots may be obtained. Hence, in the diffractive optical element of this embodiment, the distribution of the light spots may be made even more uniform on the projection surface.

(Luminous Energy of Light Spot)

Next, a description will be given of a method of reducing the difference in the luminous energies of the light spots among portions of the projection surface. As described above, in the normal diffractive optical element, the luminous energy of the light spots in the peripheral portion is lower than the luminous energy of the light spots in the center region of the projection surface. For this reason, the peripheral portion is generally dark compared to the center region.

The present inventor studied this phenomenon and found that, particularly in a region where the diffraction angle $\theta_d$ is 15° or greater, the light intensity of the diffracted light emitted from the diffractive optical element tends to decrease as the diffraction angle $\theta_d$ becomes larger. In other words, in the region in which the diffraction angle is large, it was found that the actual luminous energy is lower than the design value. It may be regarded that the luminous energy is low in this region because the Fraunhofer approximation represented by the formula (19), used to derive the formula (21), stands in a paraxial region, the approximation is insufficient when the value of the diffraction angle is large, and the error becomes larger as the diffraction angle becomes larger. It may also be regarded that the luminous energy is low in this region because the diffracted light having the large diffraction angle is easily and greatly affected by the micro shape of the concave-convex pattern formed in the diffractive optical element, and in the normal fabrication process and the like, it is difficult to accurately fabricate the diffractive optical element having the large diffraction angle and corresponding to the high order of diffraction of the diffracted light.

The diffractive optical element of this embodiment was fabricated by designing the basic units so that the light intensity of the light spot of the diffracted light for the order (mx, my) of diffraction increases as the distance $(M_x^2+M_y^2)^{0.5}$ from an origin increases.

The relationship between the light intensity of the diffracted light and the order (mx, my) of diffraction may be a linear relationship or a non-linear relationship, as long as the light intensity of the diffracted light increases as the order of diffraction becomes higher.

Next, a description will be given of a method of obtaining a design diffracted light distribution from the actual element. In the fabrication process of the diffractive optical element, the shape of the diffractive optical element may become more complex compared to the shape anticipated by design, due to inconsistencies generated during the fabrication process and the like. In such a case, the phase distribution may be approximated by securing a computing region sufficiently large to approximate the concave-convex shape of the basic unit of the diffractive optical element. The approximated phase distribution may be used as the design phase distribution and a Fourier transform may be performed in order to obtain the intensity distribution of the diffracted light generated by design. When performing the Fourier transform using a computer or the like, a phase distribution approximated by a power of 2 ($2^n$) meshes may be used as the computing region, and in this case, the fast Fourier transform (FFT) may be used in order to perform the computation at a high speed. Hence, the phase distribution is preferably approximated by the power of 2.

Therefore, in the diffractive optical element of this embodiment, the difference between the luminous energy of the light spots of the diffracted light in the center portion and the luminous energy of the light spots of the diffracted light in the peripheral region of the projection surface may be reduced, and make the luminous energies of the light spots more uniform throughout the center portion and the peripheral portion.

<Other Example Embodiments>

Next, a description will be given of the diffractive optical elements of embodiments 10 through 16, as example embodiments of the third embodiment. It is assumed in the diffractive optical element of these example embodiments that a quartz substrate is used for the transparent substrate 32, and the refractive index of the quartz substrate is 1.454 with respect to the light in the wavelength range of 810 nm to 850 nm. In addition, it is assumed that the light spots generated by the diffractive optical element in these example embodiments include no zero order diffracted light (light with zero order of diffraction).

(Embodiment 10)

A description will be given of the diffractive optical element of the embodiment 10, based on FIG. 41. FIG. 41(a) illustrates a distribution of light spots of the diffracted lights generated by the diffractive optical element 30 of this embodiment. More particularly, FIG. 41(a) illustrates the distribution of the light spots on the curved surface approximately equidistant from the diffractive optical element 30, that is, the order ($m_x, m_y$) of diffraction of the diffracted lights generated by the diffractive optical element 30 of this embodiment. The diffracted lights are distributed between −160 order to 160 order in the X-axis direction and between −120 order to 120 order in the Y-axis direction. FIG. 41(b) illustrates a distribution of the light spots of the diffracted lights projected on the flat surface. In other words, FIG. 41(b) illustrates the light spot pattern of the diffracted lights on the projection surface obtained by inputting light having the wavelength of 810 nm to the diffractive optical element 30 of this embodiment. FIG. 41(c) illustrates the basic unit 31 of the diffractive optical element 30 of this embodiment. A phase distribution of this basic unit 31 is computed by the iterative Fourier transform method, and has 32-valued phase values. The phase distribution of the basic unit 31, such as that illustrated in FIG. 41(c), illustrates the 32-valued phase values by a halftone representation.

The basic unit 31 having the phase distribution illustrated in FIG. 41(c) has the pitch $P_x$ of 378.9 μm in the X-axis direction and the pitch $P_y$ of 368.4 μm in the Y-axis direction. The basic unit 31 is arranged two-dimensionally within a region of 4 mm×4 mm. The height of one step of the concave-convex pattern formed on the surface of the transparent substrate 32 is formed to 57.6 nm in the diffractive optical element 30 of this embodiment. More particularly, by repeating a process of forming a resist pattern on the surface of the transparent substrate 32 and performing a dry etching, such as a RIE (Reactive Ion Etching), a plurality of times, the concave-convex pattern having 32 steps are formed on the surface of the transparent substrate 32, where one step has a height of 57.6 nm. Hence, the diffractive optical element 30 of this embodiment fabricated in this manner has a maximum diffraction angle of 20° in the X-axis direction, a maximum diffraction angle of 15.3° in the Y-axis direction, and an angle 24.5° in the diagonal direction, with respect to the light having the wavelength of 810 nm.

As described above, FIG. 41(b) illustrates the light spot distribution of the diffracted lights generated on the projection surface when the light having the wavelength of 810 nm is input to the diffractive optical element 30 of this embodiment. Within a projection range indicated by dotted lines in FIG. 41(b), 80×60 light spots are arranged in an approximately regular manner. The projection range indicated by the dotted line for a case in which the projection surface is provided parallel to the XY-plane at a distance of 1 m from the diffractive optical element 30 is −363 mm to 363 mm in the X-axis direction and −273 mm to 273 mm in the Y-axis direction of the projection surface. This projection range indicated by the dotted line is divided (or segmented) into 9 regions in the X-axis direction and divided (or segmented) into 9 regions in the Y-axis direction, so that this projection range is divided into 81 regions, and the number of light spots included in each of the 81 divided regions is measured. In the diffractive optical element 30 of this embodiment, values of $M_c$, $M_o$, $M_{max}$ and $M_{min}$ were set to $M_c$=49, $M_o$=51, $M_{max}$=63, and $M_{min}$=48. Based on these values of $M_c$, $M_o$, $M_{max}$ and $M_{min}$, the value $M_o/M_c$ is 1.041, and the value $M_{min}/M_{max}$ is 0.762, which fall within the ranges of the relationships (10) through (12) and (14). Hence, the diffractive optical element of this embodiment may obtain a more uniform optical spot distribution in the projection range indicated by the dotted line.

(Embodiment 11)

A description will be given of the diffractive optical element of the embodiment 11, based on FIG. 42. FIG. 42(a) illustrates a distribution of light spots of the diffracted lights generated by the diffractive optical element 30 of this embodiment. More particularly, FIG. 42(a) illustrates the distribution of the light spots on the curved surface approximately equidistant from the diffractive optical element 30, that is, the order ($m_x, m_y$) of diffraction of the diffracted lights generated by the diffractive optical element 30 of this embodiment. The diffracted lights are distributed between −121 order to 120 order in the X-axis direction and between −91 order to 90 order in the Y-axis direction. FIG. 42(b) illustrates a distribution of the light spots of the diffracted lights projected on the flat surface. In other words, FIG. 42(b) illustrates the light spot pattern of the diffracted lights on the projection surface obtained by inputting light having the wavelength of 810 nm to the diffractive optical element 30 of this embodiment. FIG. 42(c) illustrates the basic unit 31 of the diffractive optical element 30 of this embodiment. A phase distribution of this basic unit 31 is computed by the iterative Fourier transform method, and has 32-valued phase values.

The basic unit 31 having the phase distribution illustrated in FIG. 42(c) has the pitch $P_x$ of 284.2 µm in the X-axis direction and the pitch $P_y$ of 278 µm in the Y-axis direction. The basic unit 31 is arranged two-dimensionally within a region of 4 mm×4 mm. The height of one step of the concave-convex pattern formed on the surface of the transparent substrate 32 is formed to 57.6 nm in the diffractive optical element 30 of this embodiment. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 57.6 nm. Hence, the diffractive optical element 30 of this embodiment fabricated in this manner has a maximum diffraction angle of 20° in the X-axis direction, a maximum diffraction angle of 15.2° in the Y-axis direction, and an angle 24.4° in the diagonal direction, with respect to the light having the wavelength of 810 nm.

As described above, FIG. 42(b) illustrates the light spot distribution of the diffracted lights generated on the projection surface when the light having the wavelength of 810 nm is input to the diffractive optical element 30 of this embodiment. Within a projection range indicated by dotted lines in FIG. 42(b), 1155 light spots are distributed. The projection range indicated by the dotted line for a case in which the projection surface is provided parallel to the XY-plane at a distance of 1 m from the diffractive optical element 30 is −363 mm to 363 mm in the X-axis direction and −271 mm to 271 mm in the Y-axis direction of the projection surface. This projection range indicated by the dotted line is divided (or segmented) into 9 regions in the X-axis direction and divided (or segmented) into 9 regions in the Y-axis direction, so that this projection range is divided into 81 regions, and the number of light spots included in each of the 81 divided regions is measured. In the diffractive optical element 30 of this embodiment, values of $M_c$, $M_o$, $M_{max}$ and $M_{min}$ were set to $M_c=14$, $M_o=14.8$, $M_{max}=23$, and $M_{min}=8$. Based on these values of $M_c$, $M_o$, $M_{max}$ and $M_{min}$, the value $M_o/M_c$ is 1.057, and the value $M_{min}/M_{max}$ is 0.348, which fall within the ranges of the relationships (10) and (11). Hence, the diffractive optical element of this embodiment may obtain a more uniform optical spot distribution in the projection range indicated by the dotted line.

(Embodiment 12)

A description will be given of the diffractive optical element of the embodiment 12, based on FIG. 43. FIG. 43(a) illustrates a distribution of light spots of the diffracted lights generated by the diffractive optical element 30 of this embodiment. More particularly, FIG. 43(a) illustrates the distribution of the light spots on the curved surface approximately equidistant from the diffractive optical element 30, that is, the order $(m_x, m_y)$ of diffraction of the diffracted lights generated by the diffractive optical element 30 of this embodiment. The diffracted lights are distributed between −320 order to 320 order in the X-axis direction and between −240 order to 240 order in the Y-axis direction. FIG. 43(b) illustrates a distribution of the light spots of the diffracted lights projected on the flat surface. In other words, FIG. 43(b) illustrates the light spot pattern of the diffracted lights on the projection surface obtained by inputting light having the wavelength of 830 nm to the diffractive optical element 30 of this embodiment. FIG. 43(c) illustrates the basic unit 31 of the diffractive optical element 30 of this embodiment. A phase distribution of this basic unit 31 is computed by the iterative Fourier transform method, and has 32-valued phase values.

The basic unit 31 having the phase distribution illustrated in FIG. 43(c) has the pitch $P_x$ of 531.2 µm in the X-axis direction and the pitch $P_y$ of 499.6 µm in the Y-axis direction. The basic unit 31 is arranged two-dimensionally within a region of 4 mm×4 mm. The height of one step of the concave-convex pattern formed on the surface of the transparent substrate 32 is formed to 59 nm in the diffractive optical element 30 of this embodiment. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 59 nm. Hence, the diffractive optical element 30 of this embodiment fabricated in this manner has a maximum diffraction angle of 30° in the X-axis direction, a maximum diffraction angle of 23.5° in the Y-axis direction, and an angle 35.9° in the diagonal direction, with respect to the light having the wavelength of 830 nm.

As described above, FIG. 43(b) illustrates the light spot distribution of the diffracted lights generated on the projection surface when the light having the wavelength of 830 nm is input to the diffractive optical element 30 of this embodiment. Within a projection range indicated by dotted lines in FIG. 43(b), 200×150 light spots are arranged in an approximately regular manner. The projection range indicated by the dotted line for a case in which the projection surface is provided parallel to the XY-plane at a distance of 1 m from the diffractive optical element 30 is −577 mm to 577 mm in the X-axis direction and −433 mm to 433 mm in the Y-axis direction of the projection surface. This projection range indicated by the dotted line is divided into 9 regions in the X-axis direction and divided into 9 regions in the Y-axis direction, so that this projection range is divided into 81 regions, and the number of light spots included in each of the 81 divided regions is measured. In the diffractive optical element 30 of this embodiment, values of $M_c$, $M_o$, $M_{max}$ and $M_{min}$ were set to $M_c=353$, $M_o=357$, $M_{max}=378$, and $M_{min}=346$. Based on these values of $M_c$, $M_o$, $M_{max}$ and $M_{min}$, the value $M_o/M_c$ is 1.011, and the value $M_{min}/M_{max}$ is 0.915, which fall within the ranges of the relationships (10) through (14). Hence, the diffractive optical element of this embodiment may obtain a more uniform optical spot distribution in the projection range indicated by the dotted line.

(Embodiment 13)

A description will be given of the diffractive optical element of the embodiment 13, based on FIG. 44. FIG. 44(a) illustrates a distribution of light spots of the diffracted lights generated by the diffractive optical element 30 of this embodiment. More particularly, FIG. 44(a) illustrates the distribution of the light spots on the curved surface approximately equidistant from the diffractive optical element 30, that is, the order $(m_x, m_y)$ of diffraction of the diffracted lights generated by the diffractive optical element 30 of this embodiment. The diffracted lights are distributed between −401 order to 400 order in the X-axis direction and between −301 order to 300 order in the Y-axis direction. FIG. 44(b) illustrates a distribution of the light spots of the diffracted lights projected on the flat surface. In other words, FIG. 44(b) illustrates the light spot pattern of the diffracted lights on the projection surface obtained by inputting light having the wavelength of 830 nm to the diffractive optical element 30 of this embodiment. FIG. 44(c) illustrates the basic unit 31 of the diffractive optical element 30 of this embodiment. A phase distribution of this basic unit 31 is computed by the iterative Fourier transform method, and has 32-valued phase values.

The basic unit 31 having the phase distribution illustrated in FIG. 44(c) has the pitch $P_x$ of 664 µm in the X-axis direction and the pitch $P_y$ of 624.5 µm in the Y-axis direction. The basic unit 31 is arranged two-dimensionally within a region of 4 mm×4 mm. The height of one step of the concave-convex pattern faulted on the surface of the transparent substrate 32 is formed to 59 nm in the diffractive optical element 30 of this embodiment. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 59 nm. Hence, the diffractive optical element 30 of this embodiment fabricated in this manner has a maximum diffraction angle of 30° in the X-axis direction, a maximum diffraction angle of 23.5° in the Y-axis direction, and an angle 35.9° in the diagonal direction, with respect to the light having the wavelength of 830 nm.

As described above, FIG. 44(b) illustrates the light spot distribution of the diffracted lights generated on the projection surface when the light having the wavelength of 830 nm is input to the diffractive optical element 30 of this embodiment. Within a projection range indicated by dotted lines in FIG. 44(b), 9887 light spots are distributed. The projection range indicated by the dotted line for a case in which the projection surface is provided parallel to the XY-plane at a distance of 1 m from the diffractive optical element 30 is −577 mm to 577 mm in the X-axis direction and −433 mm to 433 mm in the Y-axis direction of the projection surface. This projection range indicated by the dotted line is divided into 9 regions in the X-axis direction and divided into 9 regions in the Y-axis direction, so that this projection range is divided into 81 regions, and the number of light spots included in each of the 81 divided regions is measured. In the diffractive optical element 30 of this embodiment, values of $M_c$, $M_o$, $M_{max}$ and $M_{min}$ were set to $M_c$=128, $M_o$=129.5, $M_{max}$=154, and $M_{min}$=95. Based on these values of $M_c$, $M_o$, $M_{max}$ and $M_{min}$, the value $M_o/M_c$ is 1.011, and the value $M_{min}/M_{max}$ is 0.617, which fall within the ranges of the relationships (10) through (13). Hence, the diffractive optical element of this embodiment may obtain a more uniform optical spot distribution in the projection range indicated by the dotted line.

(Embodiment 14)

Figure 45:
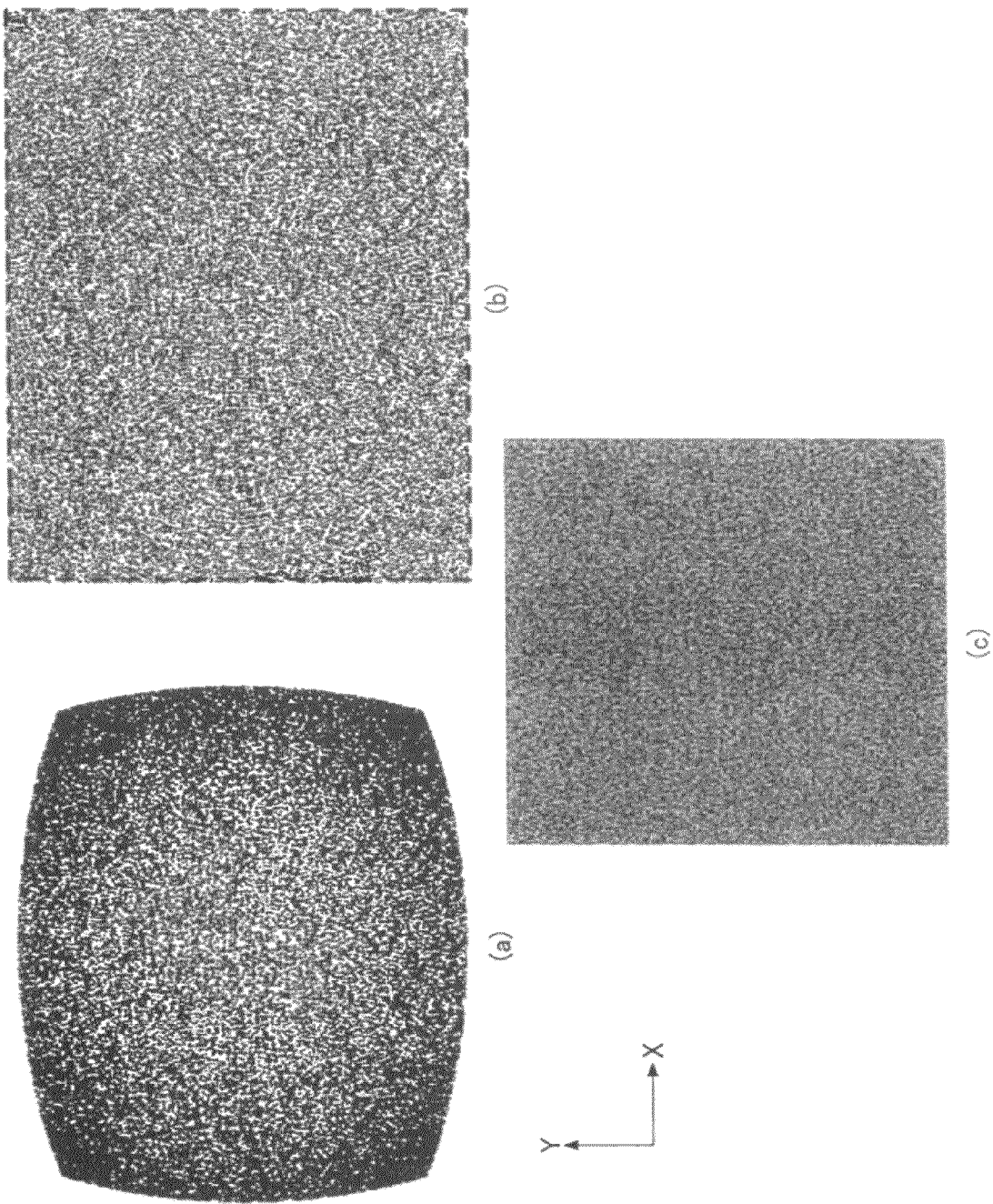
FIG. 45 is a diagram for explaining the diffractive optical element in a fourteenth example embodiment.

A description will be given of the diffractive optical element of the embodiment 14, based on FIG. 45. FIG. 45(a) illustrates a distribution of light spots of the diffracted lights generated by the diffractive optical element 30 of this embodiment. More particularly, FIG. 45(a) illustrates the distribution of the light spots on the curved surface approximately equidistant from the diffractive optical element 30, that is, the order ($M_x$, $m_y$) of diffraction of the diffracted lights generated by the diffractive optical element 30 of this embodiment. The diffracted lights are distributed between −321 order to 320 order in the X-axis direction and between −241 order to 240 order in the Y-axis direction. FIG. 45(b) illustrates a distribution of the light spots of the diffracted lights projected on the flat surface. In other words, FIG. 45(b) illustrates the light spot pattern of the diffracted lights on the projection surface obtained by inputting light having the wavelength of 850 nm to the diffractive optical element 30 of this embodiment. FIG. 45(c) illustrates the basic unit 31 of the diffractive optical element 30 of this embodiment. A phase distribution of this basic unit 31 is computed by the iterative Fourier transform method, and has 32-valued phase values.

The basic unit 31 having the phase distribution illustrated in FIG. 45(c) has the pitch $P_x$ of 423.2 μm in the X-axis direction and the pitch $P_y$ of 383.9 μm in the Y-axis direction. The basic unit 31 is arranged two-dimensionally within a region of 4 mm×4 mm. The height of one step of the concave-convex pattern formed on the surface of the transparent substrate 32 is formed to 60.4 nm in the diffractive optical element 30 of this embodiment. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 60.4 nm. Hence, the diffractive optical element 30 of this embodiment fabricated in this manner has a maximum diffraction angle of 40° in the X-axis direction, a maximum diffraction angle of 32.1° in the Y-axis direction, and an angle 46.3° in the diagonal direction, with respect to the light having the wavelength of 850 nm.

As described above, FIG. 45(b) illustrates the light spot distribution of the diffracted lights generated on the projection surface when the light having the wavelength of 850 nm is input to the diffractive optical element 30 of this embodiment. Within a projection range indicated by dotted lines in FIG. 45(b), 29720 light spots are distributed. The projection range indicated by the dotted line for a case in which the projection surface is provided parallel to the XY-plane at a distance of 1 m from the diffractive optical element 30 is −839 mm to 839 mm in the X-axis direction and −627 mm to 627 mm in the Y-axis direction of the projection surface. This projection range indicated by the dotted line is divided into 9 regions in the X-axis direction and divided into 9 regions in the Y-axis direction, so that this projection range is divided into 81 regions, and the number of light spots included in each of the 81 divided regions is measured. In the diffractive optical element 30 of this embodiment, values of $M_c$, $M_o$, $M_{max}$ and $M_{min}$ were set to $M_c$=360, $M_o$=369.3, $M_{max}$=396, and $M_{min}$=343. Based on these values of $M_c$, $M_o$, $M_{max}$ and $M_{min}$, the value $M_o/M_c$ is 1.026, and the value $M_{min}/M_{max}$ is 0.866, which fall within the ranges of the relationships (10) through (14). Hence, the diffractive optical element of this embodiment may obtain a more uniform optical spot distribution in the projection range indicated by the dotted line.

(Embodiment 15)

A description will be given of the diffractive optical element of the embodiment 15. A phase distribution of this basic unit 31 in the diffractive optical element 30 of this embodiment is computed by the iterative Fourier transform method, and has 8-valued (or octal) phase values.

The basic unit 31 of the diffractive optical element of this embodiment, having the phase distribution, has the pitch $P_x$ of 512 μm in the X-axis direction and the pitch $P_y$ of 518 μm in the Y-axis direction. The basic unit 31 is arranged two-dimensionally within a region of 5 mm×4 mm. The height of one step of the concave-convex pattern formed on the surface of the transparent substrate 32 is formed to 335 nm in the diffractive optical element 30 of this embodiment. More particularly, by repeating a process of forming a resist pattern on the surface of the transparent substrate 32 and performing a dry etching, such as a RIE, a plurality of times, the concave-convex pattern having 8 steps are formed on the surface of the transparent substrate 32, where one step has a height of 335 nm.

By inputting the light having the wavelength of 830 nm to the diffractive optical element 30 of this embodiment, 24579 optical spots were distributed within a projection range having an angle of 29.5° in the X-axis direction, an angle of 23.4° in the Y-axis direction, and an angle 35.5° in the diagonal direction on the projection surface located at a distance of 450 mm from the diffractive optical element 30. The order of diffraction in the above projection range is −303 order to 303 order in the X-axis direction, and −247 order to 247 order in the Y-axis direction. This projection range is divided into 17 regions in the X-axis direction and divided into 13 regions in the Y-axis direction, so that this projection range is divided into 221 regions, and the number of light spots included in each of the 221 divided regions is measured. In the diffractive optical element 30 of this embodiment, values of $M_c$, $M_o$, $M_{max}$ and $M_{min}$ were set to $M_c$=120, $M_o$=111, $M_{max}$=129, and $M_{min}$=96. Based on these values of $M_c$, $M_o$, $M_{max}$ and $M_{min}$, the value $M_o/M_c$ is 0.925, and the value $M_{min}/M_{max}$ is 0.744, which fall within the ranges of the relationships (10) through (14). Hence, the diffractive optical element of this embodiment may obtain a more uniform optical spot distribution in the projection range indicated by the dotted line.

In this embodiment, the diffractive optical element is designed and fabricated so that the light intensities of each of the light spots are approximately uniform, however, when the light intensity of the center region in the projection range is 1, the light intensity in the peripheral region was 0.43. The peripheral regions used to compute the value $M_o$ were the four corners of the projection range, and the diffraction angle was 31.7° at the minimum, which is 15° or greater, and further, is 30° or greater. When the intensity of the diffracted light was obtained by performing the Fourier transform of the phase distribution of the diffractive optical element of the embodiment 15, and the obtained intensity of the diffracted light was normalized by the average of the diffracted lights, the inclination with respect to the diffraction angle was 0.0013.

(Embodiment 16)

A description will be given of the diffractive optical element of the embodiment 16. A phase distribution of this basic unit 31 in the diffractive optical element 30 of this embodiment is computed by the iterative Fourier transform method, and has 8-valued (or octal) phase values.

The basic unit 31 of the diffractive optical element of this embodiment, having the phase distribution, has the pitch $P_x$ of 512 μm in the X-axis direction and the pitch $P_y$ of 518 μm in the Y-axis direction. The basic unit 31 is arranged two-dimensionally within a region of 5 mm×4 mm. The height of one step of the concave-convex pattern formed on the surface of the transparent substrate 32 is formed to 335 nm in the diffractive optical element 30 of this embodiment. More particularly, by repeating a process of forming a resist pattern on the surface of the transparent substrate 32 and performing a dry etching, such as a RIE, a plurality of times, the concave-convex pattern having 8 steps are formed on the surface of the transparent substrate 32, where one step has a height of 335 nm.

By inputting the light having the wavelength of 830 nm to the diffractive optical element 30 of this embodiment, 24579 optical spots were distributed within a projection range having an angle of 29.5° in the X-axis direction, an angle of 23.4° in the Y-axis direction, and an angle 35.5° in the diagonal direction on the projection surface located at a distance of 450 mm from the diffractive optical element 30. The order of diffraction in the above projection range is –303 order to 303 order in the X-axis direction, and –247 order to 247 order in the Y-axis direction. This projection range is divided into 17 regions in the X-axis direction and divided into 13 regions in the Y-axis direction, so that this projection range is divided into 221 regions, and the number of light spots included in each of the 221 divided regions is measured. In the diffractive optical element 30 of this embodiment, values of $M_c$, $M_o$, $M_{max}$ and $M_{min}$ were set to $M_c$=120, $M_o$=111, $M_{max}$=129, and $M_{min}$=96. Based on these values of $M_c$, $M_o$, $M_{max}$ and $M_{min}$, the value $M_o/M_c$ is 0.925, and the value $M_{min}/M_{max}$ is 0.744, which fall within the ranges of the relationships (10) through (14). Hence, the diffractive optical element of this embodiment may obtain a more uniform optical spot distribution in the projection range indicated by the dotted line.

In this embodiment, the diffractive optical element is designed and fabricated so that the light intensity of the light spots in the peripheral region is 1.66 times the light intensity of the light spots in the center region, however, when the light intensity of the center region in the projection range is 1, the light intensity in the peripheral region was 0.48. The peripheral regions used to compute the value $M_o$ were the four corners of the projection range, and the diffraction angle was 31.7° at the minimum, and the peripheral regions included parts where the diffraction angle is 15° or greater, and parts where the diffraction angle is 30° or greater. When the intensity of the diffracted light was obtained by performing the Fourier transform of the phase distribution of the diffractive optical element of the embodiment 16, and the obtained intensity of the diffracted light was normalized by the average of the diffracted lights, the inclination with respect to the diffraction angle was 0.0135.

COMPARISON EXAMPLES 3 THROUGH 6

Figure 46:
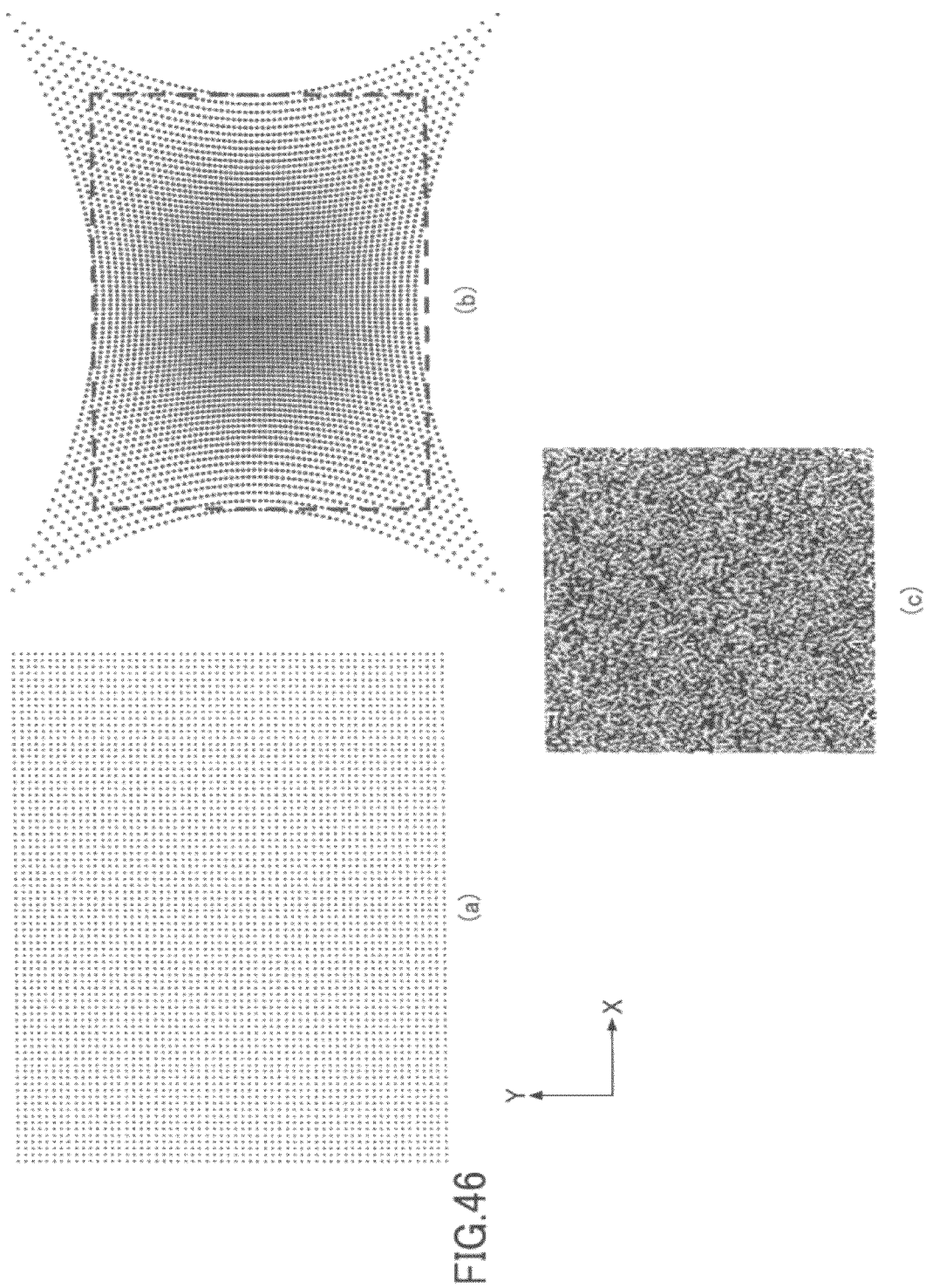
FIG. 46 is a diagram for explaining the diffractive optical element in third through sixth comparison examples.

A description will be given of the diffractive optical elements of comparison examples 3 through 6, based on FIG. 46. FIG. 46(a) illustrates a distribution of light spots of the diffracted lights generated by the diffractive optical element of the comparison example 6. More particularly, FIG. 46(a) illustrates the distribution of the light spots on the curved surface approximately equidistant from the diffractive optical element, that is, the order ($m_x$, $m_y$) of diffraction of the diffracted lights generated by the diffractive optical element of this comparison example 6. The diffracted lights are distributed between –79 order to 79 order in the X-axis direction and between –59 order to 59 order in the Y-axis direction. FIG. 46(b) illustrates a distribution of the light spots of the diffracted lights projected on the flat surface. In other words, FIG. 46(b) illustrates the light spot pattern of the diffracted lights on the projection surface obtained by inputting light having the wavelength of 810 nm to the diffractive optical element of this comparison example 6. FIG. 46(c) illustrates the basic unit of the diffractive optical element of this comparison example 6. A phase distribution of this basic unit is computed by the iterative Fourier transform method, and has 32-valued phase values. The above features of the comparison example 6 similarly holds true for the comparison examples 3 through 5.

FIG. 47 illustrates a table of the pitch Px in the X-axis direction and the pitch Py in the Y-axis direction of the basic unit of the diffractive optical element in each of the comparison examples 3 through 6.

The basic unit of the diffractive optical element in each of the comparison examples 3 through 6 is arranged two-dimensionally within a region of 4 mm×4 mm. The height of one step of the concave-convex pattern formed on the surface of the transparent substrate 32 is farmed to 57.6 nm in the diffractive optical element of each of the comparison examples 3 through 6. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 57.6 nm.

When the light having a wavelength of 810 nm is input to the diffractive optical element of each of the comparison examples 3 through 6 fabricated in the manner described above, light spots are generated within a projection range indicated by dotted lines in FIG. 46(b) on the projection surface provided parallel to the XY-plane and located at a distance of 1 m from the diffractive optical element. FIG. 48 illustrates a table of a minimum value and a maximum value of the projection range in the X-axis direction, a minimum value and a maximum value of the projection range in the Y-axis direction, a maximum diffraction angle in the X-axis direction, a maximum diffraction angle in the Y-axis direction, and an angle in the diagonal direction for the comparison examples 3 through 6.

The projection range of the diffractive optical element in each of the comparison examples 3 through 6, indicated by the dotted line, is divided into 9 regions in the X-axis direction and divided into 9 regions in the Y-axis direction, so that this projection range is divided into 81 regions, and the number of light spots included in each of the 81 divided regions is measured. FIG. 49 illustrates a table of the values of $M_c$, $M_o$, $M_{max}$ and $M_{min}$ and the values of $M_o/M_c$ and $M_{min}/M_{max}$ of the diffractive optical element in each of the comparison examples 3 through 6.

In the comparison example 3, the maximum diffraction angle is small and the angle in the diagonal direction is less than 15°, and thus, the phenomenon in which the number of light spots in the peripheral region becomes smaller than that in the center region does not occur. On the other hand, in the comparison examples 4 through 6, the maximum diffraction angle is large and the angle in the diagonal direction is 15° or greater, and thus, the number of light spots in the peripheral region is smaller than that in the center region, and the ranges of the relationships (10) through (14) are not satisfied. Accordingly, in the diffractive optical element in each of the comparison examples 4 through 6, light spots that are distributed in an approximately uniform manner are not generated in the projection range on the flat surface.

A description will be given of the diffractive optical element of a comparison example 7, based on FIG. 50. FIG. 50(a) illustrates a distribution of light spots of the diffracted lights generated by the diffractive optical element of the comparison example 7. More particularly, FIG. 50(a) illustrates the distribution of the light spots on the curved surface approximately equidistant from the diffractive optical element, that is, the order ($m_x$, $m_y$) of diffraction of the diffracted lights generated by the diffractive optical element of this comparison example 7. FIG. 50(b) illustrates a distribution of the light spots of the diffracted lights projected on the flat surface. In other words, FIG. 50(b) illustrates the light spot pattern of the diffracted lights on the projection surface obtained by inputting light having the wavelength of 810 nm to the diffractive optical element of this comparison example 7. FIG. 50(c) illustrates the basic unit of the diffractive optical element of this comparison example 7. A phase distribution of this basic unit is computed by the iterative Fourier transform method, and has 32-valued phase values.

The basic unit of the diffractive optical element in this comparison example 7, having the phase distribution, has the pitch $P_x$ of 187.1 μm in the X-axis direction and the pitch $P_y$ of 182.3 μm in the Y-axis direction. The basic unit of the diffractive optical element in the comparison example 7 is arranged two-dimensionally within a region of 4 mm×4 mm. The height of one step of the concave-convex pattern formed on the surface of the transparent substrate 32 is formed to 57.6 nm in the diffractive optical element of the comparison example 7. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 57.6 nm.

By inputting the light having the wavelength of 810 nm to the diffractive optical element of the comparison example 7, 1118 optical spots were distributed within a projection range on the projection surface provided parallel to the XY-plane and located at a distance of 1 m from the diffractive optical element, indicated by dotted lines in FIG. 50(b). The projection range is −363 mm to 363 mm in the X-axis direction, and −271 mm to 271 mm in the Y-axis direction. The maximum diffraction angle is 20° in the X-axis direction, the maximum diffraction angle is 15° in the Y-axis direction, and the angle in the diagonal direction is 24.4°.

The projection range of the diffractive optical element of the comparison example 7 is divided into 9 regions in the X-axis direction and divided into 9 regions in the Y-axis direction, so that this projection range is divided into 81 regions, and the number of light spots included in each of the 81 divided regions is measured. In the diffractive optical element of the comparison example 7, values of $M_c$, $M_o$, $M_{max}$ and $M_{min}$ were set to $M_c$=15, $M_o$=11.8, $M_{max}$=23, and $M_{min}$=6. Based on these values of $M_c$, $M_o$, $M_{max}$ and $M_{min}$, the value $M_o/M_c$ is 0.787, and the value $M_{min}/M_{max}$ is 0.261.

Accordingly, in the diffractive optical element of the comparison example 7, the number of light spots in the peripheral region is smaller than that in the center region, and the ranges of the relationships (10) through (14) are not satisfied. Hence, the diffractive optical element of the comparison example 7 may not obtain a uniform optical spot distribution in the projection range indicated by the dotted line on the flat surface.

COMPARISON EXAMPLES 8 THROUGH 11

Figure 51:
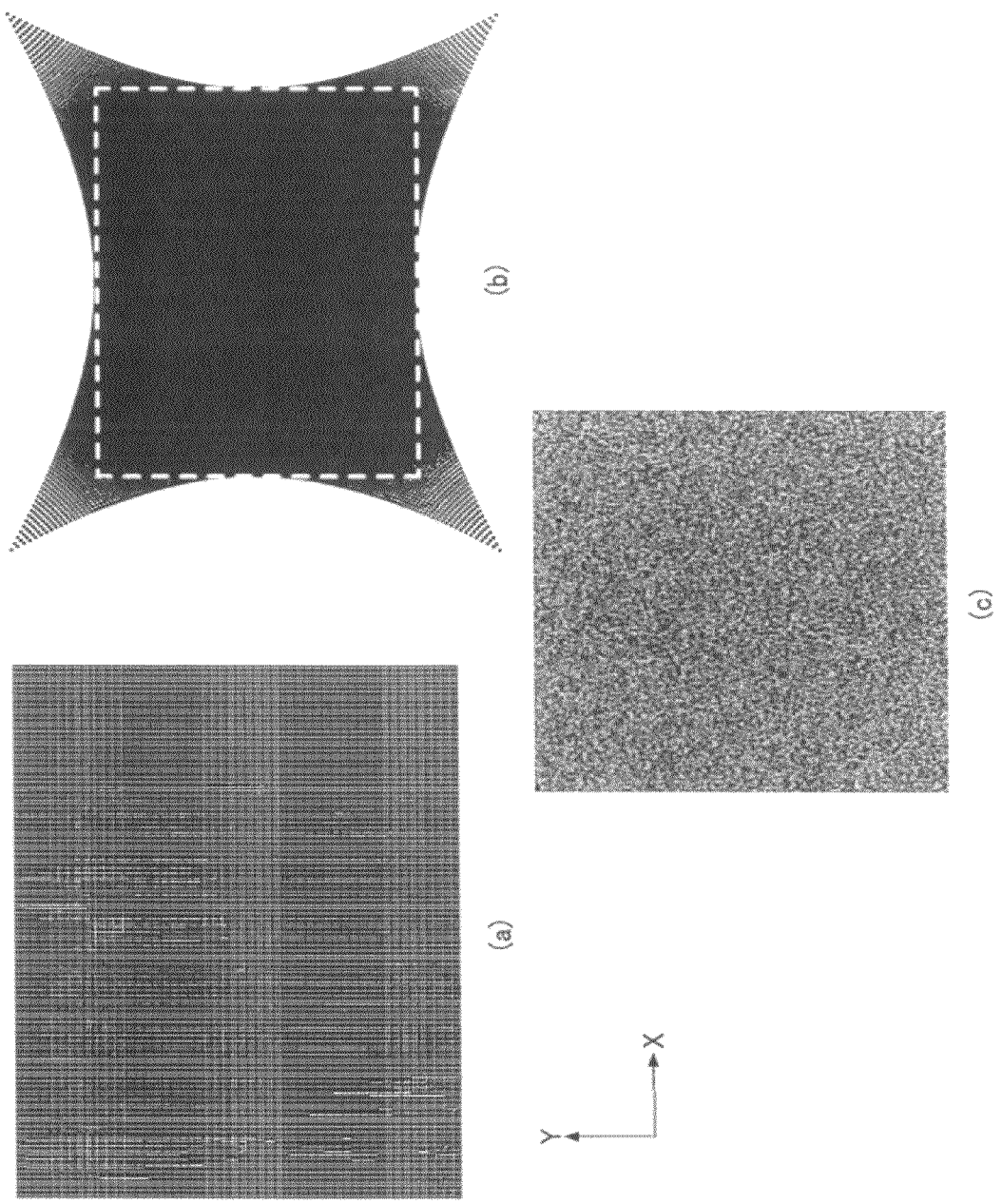
FIG. 51 is a diagram for explaining the diffractive optical element in eighth through eleventh comparison examples.

A description will be given of the diffractive optical element of comparison examples 8 through 11, based on FIG. 51. FIG. 51(a) illustrates a distribution of light spots of the diffracted lights generated by the diffractive optical element of the comparison example 11. More particularly, FIG. 51(a) illustrates the distribution of the light spots on the curved surface approximately equidistant from the diffractive optical element, that is, the order ($m_x$, $m_y$) of diffraction of the diffracted lights generated by the diffractive optical element of the comparison example 11. The diffracted lights are distributed between −199 order to 199 order in the X-axis direction and between −149 order to 149 order in the Y-axis direction, and 200×150 light spots are arranged in a regular manner. FIG. 51(b) illustrates a distribution of the light spots of the diffracted lights projected on the flat surface. In other words, FIG. 51(b) illustrates the light spot pattern of the diffracted lights on the projection surface obtained by inputting light having the wavelength of 830 nm to the diffractive optical element of the comparison example 11. FIG. 51(c) illustrates the basic unit of the diffractive optical element of the comparison example 11. A phase distribution of this basic unit is computed by the iterative Fourier transform method, and has 32-valued phase values. The above features of the comparison example 11 similarly holds true for the comparison examples 8 through 10.

FIG. 52 illustrates a table of the pitch Px in the X-axis direction and the pitch Py in the Y-axis direction of the basic unit of the diffractive optical element in each of the comparison examples 8 through 11.

The basic unit of the diffractive optical element in each of the comparison examples 8 through 11 is arranged two-dimensionally within a region of 4 mm×4 mm. The height of one step of the concave-convex pattern formed on the surface of the transparent substrate 32 is formed to 59 nm in the diffractive optical element of each of the comparison examples 8 through 11. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 59 nm.

When the light having a wavelength of 830 nm is input to the diffractive optical element of each of the comparison examples 8 through 11 fabricated in the manner described above, light spots are generated within a projection range indicated by dotted lines in FIG. 51(b) on the projection surface provided parallel to the XY-plane and located at a distance of 1 m from the diffractive optical element. FIG. 53 illustrates a table of a minimum value and a maximum value of the projection range in the X-axis direction, a minimum value and a maximum value of the projection range in the Y-axis direction, a maximum diffraction angle in the X-axis direction, a maximum diffraction angle in the Y-axis direction, and an angle in the diagonal direction for the comparison examples 8 through 11.

The projection range of the diffractive optical element in each of the comparison examples 8 through 11, indicated by the dotted line, is divided into 9 regions in the X-axis direction and divided into 9 regions in the Y-axis direction, so that this projection range is divided into 81 regions, and the number of light spots included in each of the 81 divided regions is measured. FIG. 54 illustrates a table of the values of $M_c$, $M_o$, $M_{max}$ and $M_{min}$ and the values of $M_o/M_c$ and $M_{min}/M_{max}$ of the diffractive optical element in each of the comparison examples 8 through 11.

In the comparison example 8, the maximum diffraction angle is small and the angle in the diagonal direction is less than 15°, and thus, the phenomenon in which the number of light spots in the peripheral region becomes smaller than that in the center region is less likely to occur. On the other hand, in the comparison examples 9 through 11, the maximum diffraction angle is large and the angle in the diagonal direction is 15° or greater, and thus, the number of light spots in the peripheral region is smaller than that in the center region, and the ranges of the relationships (10) through (14) are not satisfied. Accordingly, in the diffractive optical element in each of the comparison examples 9 through 11, light spots that are distributed in an approximately uniform manner are not generated in the projection range on the flat surface.

COMPARISON EXAMPLE 12

A description will be given of the diffractive optical element of a comparison example 12, based on FIG. 55. FIG. 55(a) illustrates a distribution of light spots of the diffracted lights generated by the diffractive optical element of the comparison example 12. More particularly, FIG. 55(a) illustrates the distribution of the light spots on the curved surface approximately equidistant from the diffractive optical element, that is, the order $(m_x, m_y)$ of diffraction of the diffracted lights generated by the diffractive optical element of this comparison example 12. FIG. 55(b) illustrates a distribution of the light spots of the diffracted lights projected on the flat surface. In other words, FIG. 55(b) illustrates the light spot pattern of the diffracted lights on the projection surface obtained by inputting light having the wavelength of 830 nm to the diffractive optical element of this comparison example 12. FIG. 55(c) illustrates the basic unit of the diffractive optical element of this comparison example 12. A phase distribution of this basic unit is computed by the iterative Fourier transform method, and has 32-valued phase values.

The basic unit of the diffractive optical element in this comparison example 12, having the phase distribution, has the pitch $P_x$ of 529.5 μm in the X-axis direction and the pitch $P_y$ of 497.5 μm in the Y-axis direction. The basic unit of the diffractive optical element in the comparison example 12 is arranged two-dimensionally within a region of 4 mm×4 mm. The height of one step of the concave-convex pattern formed on the surface of the transparent substrate 32 is formed to 59 nm in the diffractive optical element of the comparison example 12. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 59 nm.

By inputting the light having the wavelength of 830 nm to the diffractive optical element of the comparison example 12, 9286 optical spots were distributed within a projection range on the projection surface provided parallel to the XY-plane and located at a distance of 1 m from the diffractive optical element, indicated by dotted lines in FIG. 55(b). The projection range is −577 mm to 577 mm in the X-axis direction, and −433 mm to 433 mm in the Y-axis direction. The maximum diffraction angle is 30° in the X-axis direction, the maximum diffraction angle is 23.5° in the Y-axis direction, and the angle in the diagonal direction is 35.9°.

The projection range of the diffractive optical element of the comparison example 12 is divided into 9 regions in the X-axis direction and divided into 9 regions in the Y-axis direction, so that this projection range is divided into 81 regions, and the number of light spots included in each of the 81 divided regions is measured. In the diffractive optical element of the comparison example 12, values of $M_c$, $M_o$, $M_{max}$ and $M_{min}$ were set to $M_c$=155, $M_o$=81, $M_{max}$=164, and $M_{min}$=64. Based on these values of $M_c$, $M_o$, $M_{max}$ and $M_{min}$, the value $M_o/M_c$ is 0.523, and the value $M_{min}/M_{max}$ is 0.39.

Accordingly, in the diffractive optical element of the comparison example 12, the number of light spots in the peripheral region is smaller than that in the center region, and the ranges of the relationships (10) through (14) are not satisfied. Hence, the diffractive optical element of the comparison example 12 may not obtain a uniform optical spot distribution in the projection range indicated by the dotted line on the flat surface.

COMPARISON EXAMPLE 13

Figure 56:
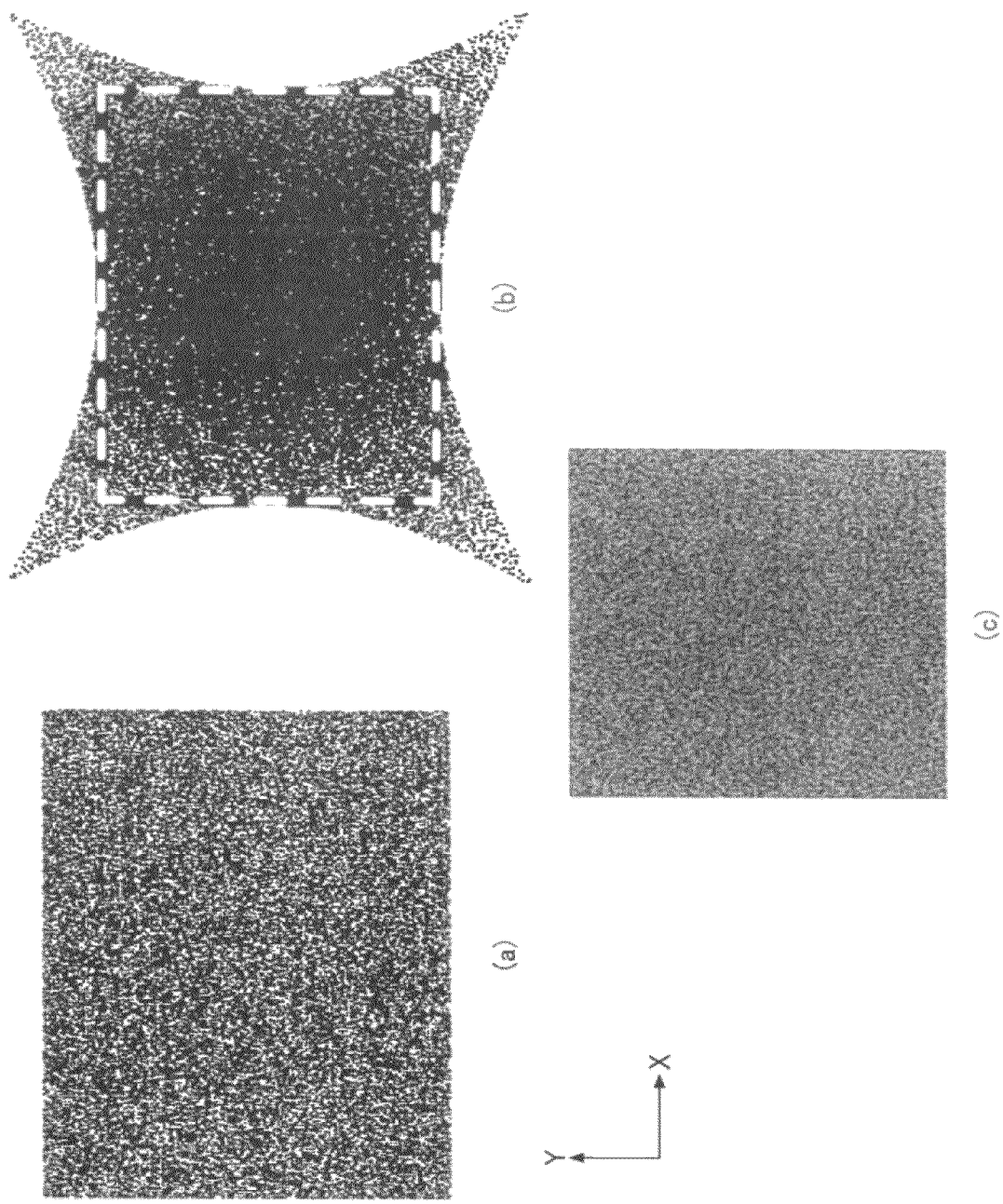
FIG. 56 is a diagram for explaining the diffractive optical element in a thirteenth comparison example.

A description will be given of the diffractive optical element of a comparison example 13, based on FIG. 56. FIG. 56(a) illustrates a distribution of light spots of the diffracted lights generated by the diffractive optical element of the comparison example 13. More particularly, FIG. 56(a) illustrates the distribution of the light spots on the curved surface approximately equidistant from the diffractive optical element, that is, the order $(m_x, m_y)$ of diffraction of the diffracted lights generated by the diffractive optical element of this comparison example 13. FIG. 56(b) illustrates a distribution of the light spots of the diffracted lights projected on the flat surface. In other words, FIG. 56(b) illustrates the light spot pattern of the diffracted lights on the projection surface obtained by inputting light having the wavelength of 850 nm to the diffractive optical element of this comparison example 13. FIG. 56(c) illustrates the basic unit of the diffractive optical element of this comparison example 13. A phase distribution of this basic unit is computed by the iterative Fourier transform method, and has 32-valued phase values.

The basic unit of the diffractive optical element of this comparison example 13, having the phase distribution, has the pitch $P_x$ of 421.8 μm in the X-axis direction and the pitch $P_y$ of 382.3 μm in the Y-axis direction. The basic unit of the diffractive optical element in the comparison example 13 is arranged two-dimensionally within a region of 4 mm×4 mm. The height of one step of the concave-convex pattern formed on the surface of the transparent substrate 32 is formed to 60.4 nm in the diffractive optical element of the comparison example 13. More particularly, by repeating a process of forming a resist pattern on the surface of the transparent substrate 32 and performing a dry etching, such as a RIE, a plurality of times, the concave-convex pattern having 32 steps are formed on the surface of the transparent substrate 32, where one step has a height of 60.4 nm.

By inputting the light having the wavelength of 850 nm to the diffractive optical element of the comparison example 13, 26836 optical spots were distributed within a projection range on the projection surface provided parallel to the XY-plane and located at a distance of 1 m from the diffractive optical element, indicated by dotted lines in FIG. 56(b). The projection range is −839 mm to 839 mm in the X-axis direction, and −627 mm to 627 mm in the Y-axis direction. The maximum diffraction angle is 40° in the X-axis direction, the maximum diffraction angle is 32.1° in the Y-axis direction, and the angle in the diagonal direction is 46.3°.

The projection range of the diffractive optical element of the comparison example 13 is divided into 9 regions in the X-axis direction and divided into 9 regions in the Y-axis direction, so that this projection range is divided into 81 regions, and the number of light spots included in each of the 81 divided regions is measured. In the diffractive optical element of the comparison example 13, values of $M_c$, $M_o$, $M_{max}$ and $M_{min}$ were set to $M_c$=558, $M_o$=171.5, $M_{max}$=558, and $M_{min}$=162. Based on these values of $M_c$, $M_o$, $M_{max}$ and $M_{min}$, the value $M_o/M_c$ is 0.307, and the value $M_{min}/M_{max}$ is 0.29.

Accordingly, in the diffractive optical element of the comparison example 13, the number of light spots in the peripheral region is smaller than that in the center region, and the ranges of the relationships (10) through (14) are not satisfied. Hence, the diffractive optical element of the comparison example 13 may not obtain a uniform optical spot distribution in the projection range indicated by the dotted line on the flat surface.

COMPARISON EXAMPLE 14

A description will be given of the diffractive optical element of the comparison example 14. A phase distribution of this basic unit in the diffractive optical element of this comparison example 14 is computed by the iterative Fourier transform method, and has 8-valued (or octal) phase values.

The basic unit of the diffractive optical element in this comparison example 14, having the phase distribution, has the pitch $P_x$ of 512 µm in the X-axis direction and the pitch $P_y$ of 518 µm in the Y-axis direction. The basic unit is arranged two-dimensionally within a region of 5 mm×4 mm. The height of one step of the concave-convex pattern formed on the surface of the transparent substrate 32 is formed to 340 nm in the diffractive optical element of this comparison example 14. More particularly, by repeating a process of forming a resist pattern on the surface of the transparent substrate 32 and performing a dry etching, such as a RIE, a plurality of times, the concave-convex pattern having 8 steps are formed on the surface of the transparent substrate 32, where one step has a height of 340 nm.

By inputting the light having the wavelength of 830 nm to the diffractive optical element of this comparison example 14, 23499 optical spots were distributed within a projection range having an angle of 29.5° in the X-axis direction, an angle of 23.4° in the Y-axis direction, and an angle 35.5° in the diagonal direction on the projection surface provided parallel to the XY-plane and located at a distance of 450 mm from the diffractive optical element 30. The order of diffraction in the above projection range is −303 order to 303 order in the X-axis direction, and −247 order to 247 order in the Y-axis direction. This projection range is divided into 17 regions in the X-axis direction and divided into 13 regions in the Y-axis direction, so that this projection range is divided into 221 regions, and the number of light spots included in each of the 221 divided regions is measured. In the diffractive optical element of this comparison example 14, values of $M_c$, $M_o$, $M_{max}$ and $M_{min}$ were set to $M_c$=150, $M_o$=64.8, $M_{max}$=153, and $M_{min}$=60. Based on these values of $M_c$, $M_o$, $M_{max}$ and $M_{min}$, the value $M_o/M_c$ is 0.432, and the value $M_{min}/M_{max}$ is 0.392.

Accordingly, in the diffractive optical element of the comparison example 14, the number of light spots in the peripheral region is smaller than that in the center region, and the ranges of the relationships (10) through (14) are not satisfied. Hence, the diffractive optical element of the comparison example 14 may not obtain a uniform optical spot distribution in the projection range indicated by the dotted line on the flat surface.

In this comparison example 14, the diffractive optical element is designed and fabricated so that the light intensity of the light spots is approximately uniform, however, when the light intensity of the center region in the projection range is 1, the light intensity in the peripheral region was 0.23. The peripheral regions used to compute the value $M_o$ were the four corners of the projection range, and the diffraction angle was 31.7° at the minimum, and the peripheral regions included parts where the diffraction angle is 15° or greater, and parts where the diffraction angle is 30° or greater. When the intensity of the diffracted light was obtained by performing the Fourier transform of the phase distribution of the diffractive optical element of the comparison example 14, and the obtained intensity of the diffracted light was normalized by the average of the diffracted lights, the inclination with respect to the diffraction angle was 0.0011.

Figure 57:
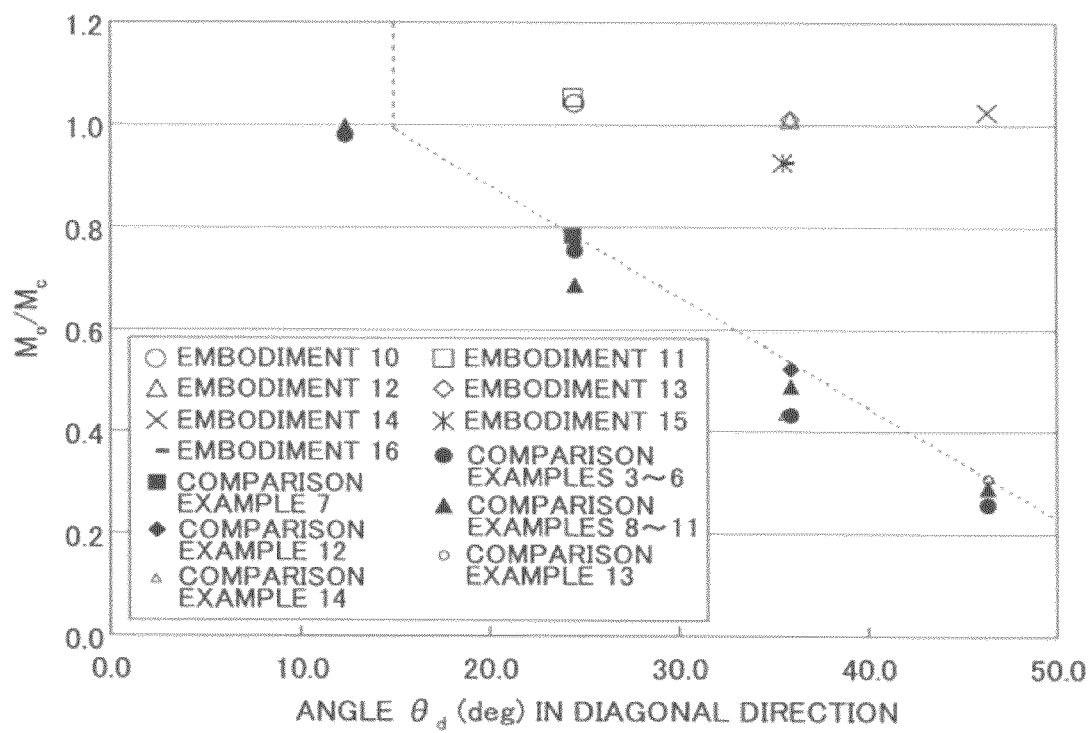
FIG. 57 is a correlation diagram of an angle $\theta_d$ in a diagonal direction and a value $M_o/M_c$.
Figure 58:
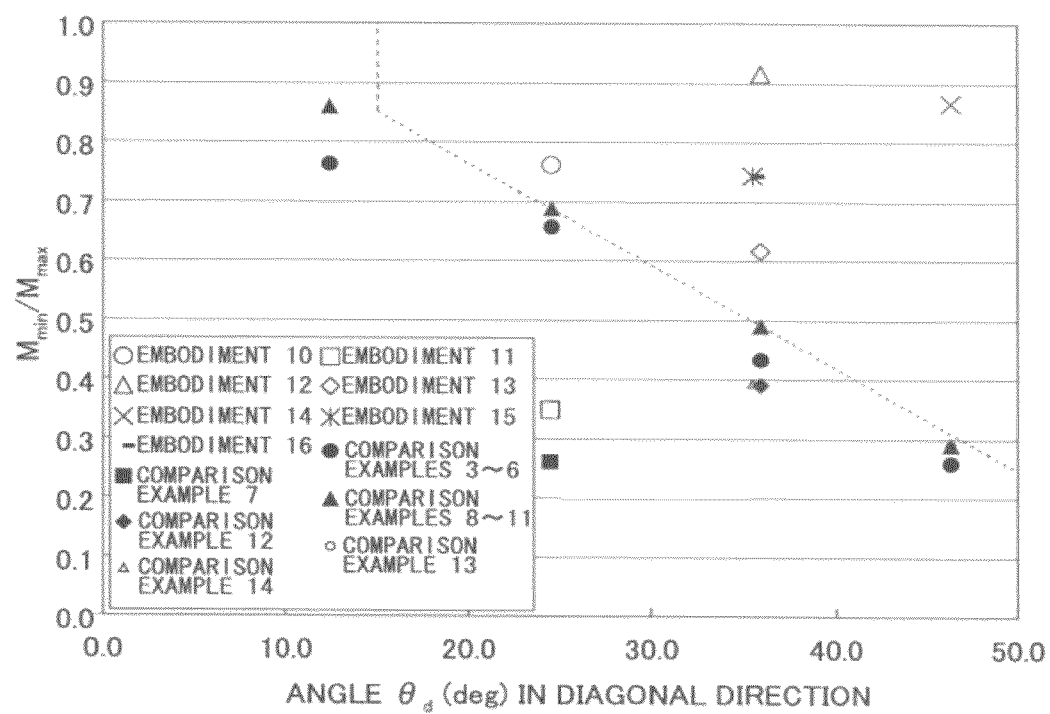
FIG. 58 is a correlation diagram of the angle $\theta_d$ in the diagonal direction and a value $M_{min}/M_{max}$.

FIG. 57 illustrates the relationship of the angle $\theta_d$ in the diagonal direction and the value $M_o/M_c$, and FIG. 58 illustrates the relationship of the angle $\theta_d$ in the diagonal direction and the value $M_{min}/M_{max}$, for each of the embodiments 10 through 16 and the comparison examples 3 through 14.

A dotted line in FIG. 57 represents the following formulas (26), and the relationship (10) may be derived from the formulas (26).

$$15° = \theta_d \quad (26)$$
$$M_o/M_c = -0.02173\,\theta_d + 1.314$$

In addition, a dotted line in FIG. 58 represents the following formulas (27), and the relationship (12) may be derived from the formulas (27).

$$15° = \theta_d \quad (27)$$
$$M_{min}/M_{max} = -0.01729\,\theta_d + 1.108$$

In addition, when the light intensity of the center region in the projection range is 1, the light intensity in the peripheral region was 0.23 in the diffractive optical element of the comparison example 14, while the light intensity in the peripheral region was 0.43 in the diffractive optical element of the embodiment 15, and the light intensity in the peripheral region was 0.48 in the embodiment 16. The angle in the diagonal direction is 35.5° for the diffractive optical elements of the comparison example 14, the embodiment 15, and the embodiment 16, and thus, the peripheral region is the region having the diffraction angle of 15° or greater. Hence, in the region having the diffraction angle of 15° or greater, the light intensity in the peripheral region with respect to that in the center region is preferably 0.4 or greater, and more preferably 0.45 or greater. On the other hand, the angle in the diagonal direction is 35.5° for the diffractive optical elements of the comparison example 14, the embodiment 15, and the embodiment 16, and thus, the peripheral region is the region having the diffraction angle of 30° or greater. Hence, in the region having the diffraction angle of 30° or greater, the light intensity in the peripheral region with respect to that in the center region is preferably 0.4 or greater, and more preferably 0.45 or greater.

According to the embodiments and example embodiments, it is possible to provide a diffractive optical element that may make the density of light spots of the diffracted light in a projection region approximately uniform, and to provide a measuring apparatus that may perform an accurate measurement.

By using the diffractive optical element that diffracts at least a portion of incident light, irradiating light having a predetermined projection pattern onto a measuring target, and acquiring an image of the measuring target irradiated by the projection pattern, an apparatus that performs a three-dimensional measurement and the like may be realized.

The present invention is described above in detail with reference to specific embodiments, however, it may be apparent to those skilled in the art that various variations and modifications may be made without departing from the spirit and scope of the present invention.

What is claimed is:

1. A diffractive optical element comprising:
   a first diffractive optical part configured to generate diffracted lights two-dimensionally with respect to incident light; and
   a second diffractive optical part configured to generate diffracted lights two-dimensionally with respect to incident light;
   wherein the diffracted lights generated by inputting the incident light to the first diffractive optical part are input to the second diffractive optical part in order to generate the diffracted lights from the second diffractive optical part, and
   wherein $\theta_1 \geq \theta_2$ and $k_1 \geq k_2$ stand or, $\theta_1 \leq \theta_2$ and $k_1 \leq k_2$ stand, where $\theta_1$ denotes a diffraction angle of the first diffractive optical part, $k_1$ denotes a number of light spots of the diffracted lights generated by the first diffractive optical part, $\theta_2$ denotes a diffraction angle of the second diffractive optical part, and $k_2$ denotes a number of light spots of the diffracted lights generated by the second diffractive optical part.

2. The diffractive optical element as claimed in claim 1, wherein
   a projection region of the diffractive optical element is formed by overlapping a projection region of the light spots of the diffracted lights generated by the first diffractive optical part with the second diffractive optical part, or
   the projection region of the diffractive optical element is formed by overlapping a projection region of the light spots of the diffracted lights generated by the second diffractive optical part with the first diffractive optical part.

3. The diffractive optical element as claimed in claim 1, wherein at least one of the first diffractive optical part and the second diffractive optical part includes a plurality of basic units that are arranged two-dimensionally.

4. The diffractive optical element as claimed in claim 1, further comprising:
   a first transparent substrate on which the first diffractive optical part is formed; and
   a second transparent substrate on which the second diffractive optical part is formed.

5. The diffractive optical element as claimed in claim 4, wherein the first transparent substrate and the second transparent substrate are bonded together.

6. The diffractive optical element as claimed in claim 1, further comprising:
   a transparent substrate having a first surface on which the first diffractive optical part is formed, and a second surface, opposite to the first surface, on which the second diffractive optical part is formed.

7. A diffractive optical element comprising:
   a plurality of basic units arranged two-dimensionally, and configured to generate diffracted lights two-dimensionally with respect to incident light,
   wherein the diffracted lights are projected on a plane in order to generate a plurality of light spots within a predetermined range on the plane, and
   wherein the predetermined range has a rectangular shape and relationships $$15° \leq \theta_d$$
   $$M_o / M_c > -0.02173\, \theta_d + 1.314$$

stand, where $M_c$ denotes a number of light spots in a center region amongst $N_x \times N_y$ or more regions having approximately same shapes and equally dividing the predetermined range, $M_o$ denotes an average number of light spots in four corner regions of the predetermined range, $\theta_d$ denotes a maximum diffraction angle at which the predetermined range is irradiated, and $N_x$ and $N_y$ are both odd numbers greater than or equal to 3.

8. A diffractive optical element comprising:
   a plurality of basic units arranged two-dimensionally, and configured to generate diffracted lights two-dimensionally with respect to incident light,
   wherein the diffracted lights are projected on a plane in order to generate a plurality of light spots within a predetermined range on the plane, and
   wherein the predetermined range has a rectangular shape and relationships $$15° \leq \theta_d$$
   $$0.8 \leq M_o / M_c \leq 1.2$$

stand, where $M_c$ denotes a number of light spots in a center region amongst $N_x \times N_y$ or more regions having approximately same shapes and equally dividing the predetermined range, $M_o$ denotes an average number of light spots in four corner regions of the predetermined range, $\theta_d$ denotes a maximum diffraction angle at which the predetermined range is irradiated, and $N_x$ and $N_y$ are both odd numbers greater than or equal to 3.

9. A diffractive optical element comprising:
a plurality of basic units arranged two-dimensionally, and configured to generate diffracted lights two-dimensionally with respect to incident light,
wherein the diffracted lights are projected on a plane in order to generate a plurality of light spots within a predetermined range on the plane, and
wherein the predetermined range has a rectangular shape and relationships $$15° \leq \theta_d$$
$$M_{min}/M_{max} > -0.01729\,\theta_d + 1.108$$

stand, where $M_{max}$ denotes a maximum number of light spots in $N_x \times N_y$ or more regions having approximately same shapes and equally dividing the predetermined range, $M_{min}$ denotes a minimum number of light spots in the $N_x \times N_y$ or more regions, $\theta_d$ denotes a maximum diffraction angle at which the predetermined range is irradiated, and $N_x$ and $N_y$ are both odd numbers greater than or equal to 3.

10. A diffractive optical element comprising:
a plurality of basic units arranged two-dimensionally, and configured to generate diffracted lights two-dimensionally with respect to incident light,
wherein the diffracted lights are projected on a plane in order to generate a plurality of light spots within a predetermined range on the plane, and
wherein the predetermined range has a rectangular shape and relationships $$30° \leq \theta_d$$
$$0.6 \leq M_{min}/M_{max} \leq 1.4$$

stand, where $M_{max}$ denotes a maximum number of light spots in $N_x \times N_y$ or more regions having approximately same shapes and equally dividing the predetermined range, $M_{min}$ denotes a minimum number of light spots in the $N_x \times N_y$ or more regions, $\theta_d$ denotes a maximum diffraction angle at which the predetermined range is irradiated, and $N_x$ and $N_y$ are both odd numbers greater than or equal to 3.

11. A diffractive optical element comprising:
a plurality of basic units arranged two-dimensionally, and configured to generate diffracted lights two-dimensionally with respect to incident light,
wherein the diffracted lights are projected on a plane in order to generate a plurality of light spots within a predetermined range on the plane, and
wherein the predetermined range has a rectangular shape and relationships $$15° \leq \theta_d$$
$$0.7 \leq M_{min}/M_{max} \leq 1.3$$

stand, where $M_{max}$ denotes a maximum number of light spots in $N_x \times N_y$ or more regions having approximately same shapes and equally dividing the predetermined range, $M_{min}$ denotes a minimum number of light spots in the $N_x \times N_y$ or more regions, $\theta_d$ denotes a maximum diffraction angle at which the predetermined range is irradiated, and $N_x$ and $N_y$ are both odd numbers greater than or equal to 3.

12. A diffractive optical element comprising:
a plurality of basic units arranged two-dimensionally, and configured to generate diffracted lights two-dimensionally with respect to incident light,
wherein the plurality of basic units are formed by performing a Fourier transform or an inverse Fourier transform of a predetermined pattern of the diffracted lights generated by design, and
wherein the predetermined pattern of the diffracted lights generated by design has a light intensity higher in a peripheral region compared to a center region thereof.

13. A diffractive optical element comprising:
a plurality of basic units arranged two-dimensionally, and configured to generate diffracted lights two-dimensionally with respect to incident light,
wherein a plurality of light spots are generated within a predetermined region on a plane by projecting the diffracted lights on the plane, and
wherein the predetermined range has a rectangular shape, $N_x \times N_y$ or more regions having approximately same shapes and equally dividing the predetermined range include a peripheral region in which the diffracted light has a diffraction angle of 15° or greater, and a light intensity in the peripheral region is 0.4 or greater with respect to a light intensity 1 in a center region of the predetermined range amongst the $N_x \times N_y$ or more regions.

14. A measuring apparatus comprising:
a light source configured to emit light;
a diffractive optical element recited in any one of claims 1, 2, 7, 8, 9, 10, 11, 12 and 13 and configured to emit diffracted lights with respect to the light from the light source; and
an imaging device configured to pick up an image of a measuring target that is irradiated with the diffracted lights.

* * * * *